(12) United States Patent
Aoki et al.

(10) Patent No.: US 6,407,982 B1
(45) Date of Patent: *Jun. 18, 2002

(54) DISK TRAY, DISK STORING APPARATUS AND DISK DRIVE

(75) Inventors: Sunao Aoki; Nobuhiko Tsukahara; Toshiharu Okanishi, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,132

(22) PCT Filed: Jul. 11, 1997

(86) PCT No.: PCT/JP97/02424

§ 371 (c)(1),
(2), (4) Date: Oct. 14, 1998

(87) PCT Pub. No.: WO98/02883

PCT Pub. Date: Jan. 22, 1998

(30) Foreign Application Priority Data

| Jul. 12, 1996 | (JP) | P8-183881 |
| Sep. 24, 1996 | (JP) | P8-252072 |
| Jun. 20, 1997 | (JP) | P9-164187 |

(51) Int. Cl.[7] .............................. G11B 3/70; G11B 23/03
(52) U.S. Cl. ....................................... 369/291; 360/133
(58) Field of Search ........................... 360/133; 369/291

(56) References Cited

U.S. PATENT DOCUMENTS 4,722,439 A * 2/1988 Grobecker et al. ......... 206/309

FOREIGN PATENT DOCUMENTS

| JP | 6-236648 | * 8/1994 |
| JP | 7-240061 | * 9/1995 |
| JP | 10-125026 | * 5/1998 |

* cited by examiner

Primary Examiner—David Davis
(74) Attorney, Agent, or Firm—Oblon, Spivak, McClelland, Maier & Neustadt, P.C.

(57) ABSTRACT

A disc tray for holding a disc on which an information signal is recorded and which can be loaded into a disc drive apparatus in a state where the disc tray holds the disc, the disc tray having an overall body formed into a thin plate-like shape and including a disc-receiving recess having an inner diameter larger than the diameter of a recording and/or reproducing disc and a depth larger than the thickness of the disc and arranged to removably hold the disc while having gaps in a direction in parallel with the surfaces of the disc and in a direction of the thickness of the disc, a bottom opening formed along the widthwise directional center of the disc tray in a range from substantially the central portion of the bottom portion of the disc-receiving recess to an end of the bottom portion and having a shape that the end of the bottom is opened, and a plurality of disc-separation-preventive portions formed to project into the disc-receiving recess from outside of the disc-receiving recess in such a manner that gaps at least permitting insertion of the disc are formed from the bottom portion of the disc-receiving recess.

6 Claims, 71 Drawing Sheets

FIG.3B
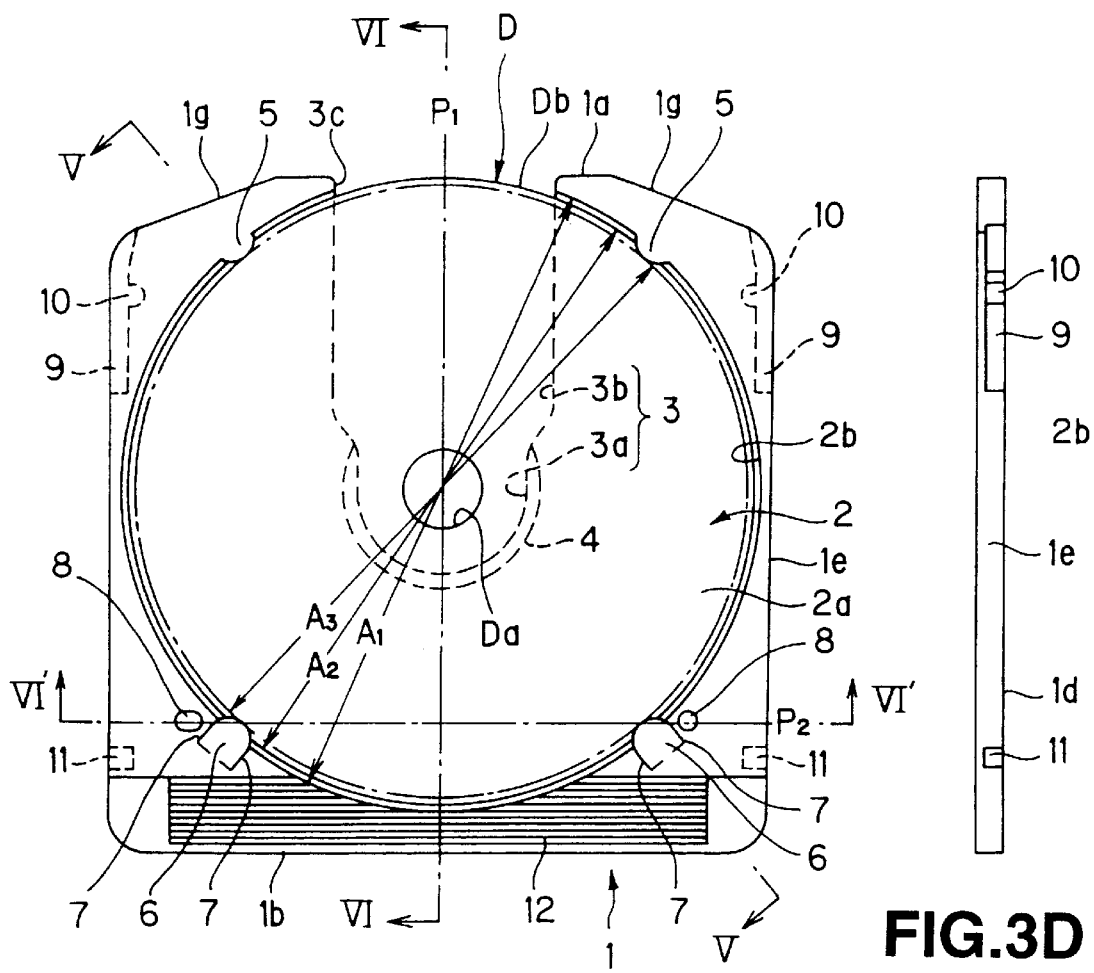
FIG.3D
FIG.3A
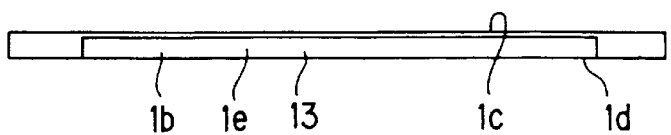
FIG.3C

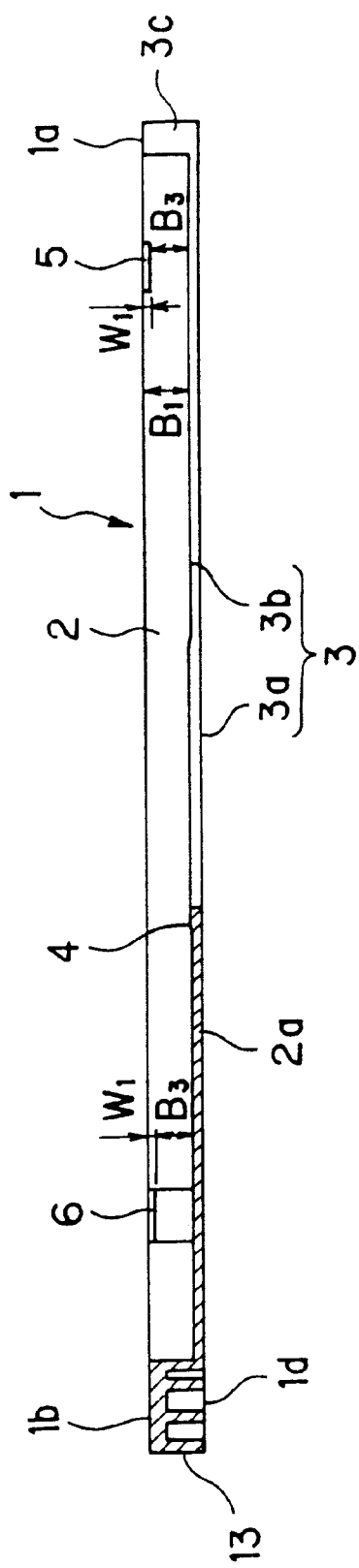
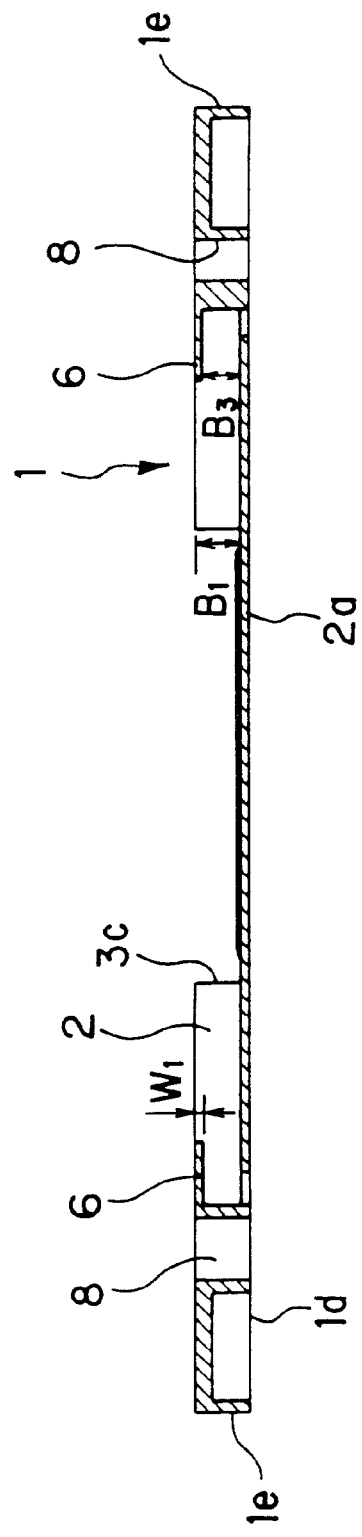

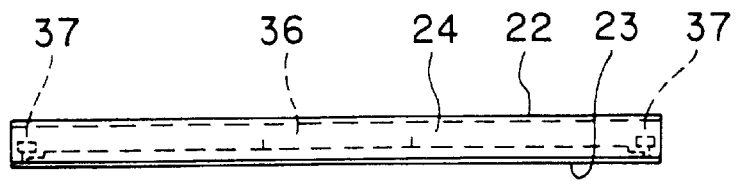
FIG.12B
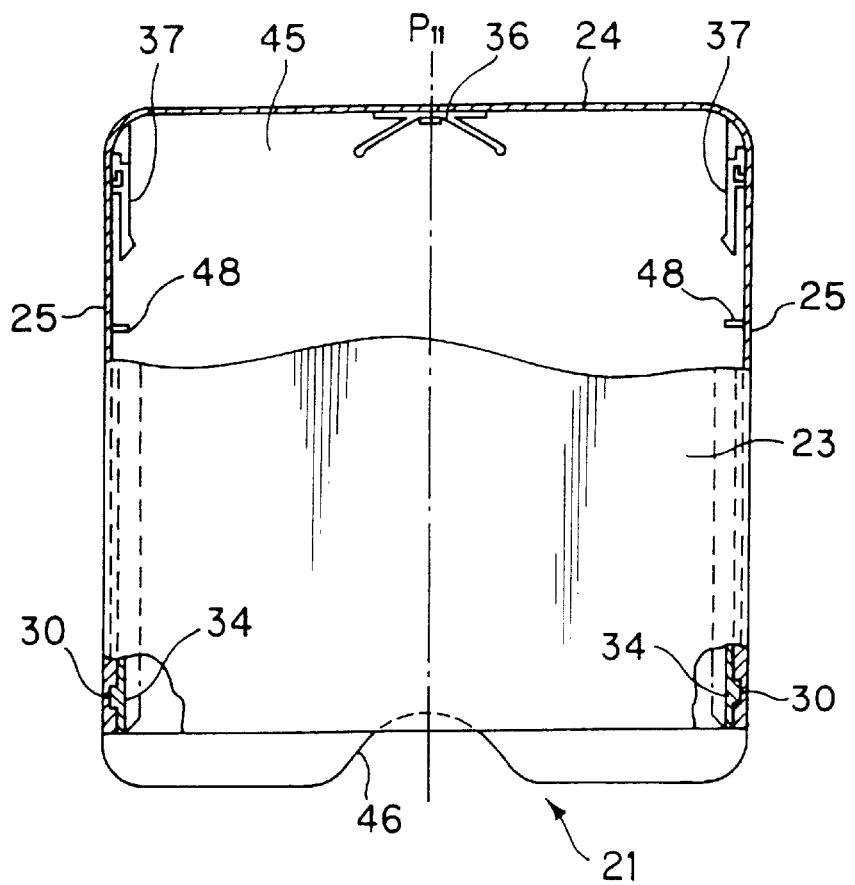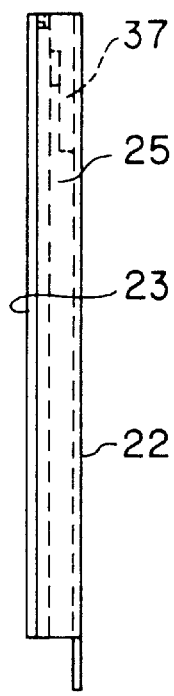
FIG.12A  FIG.12D
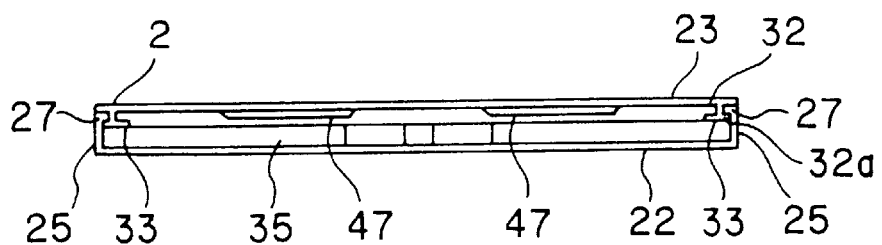
FIG.12C

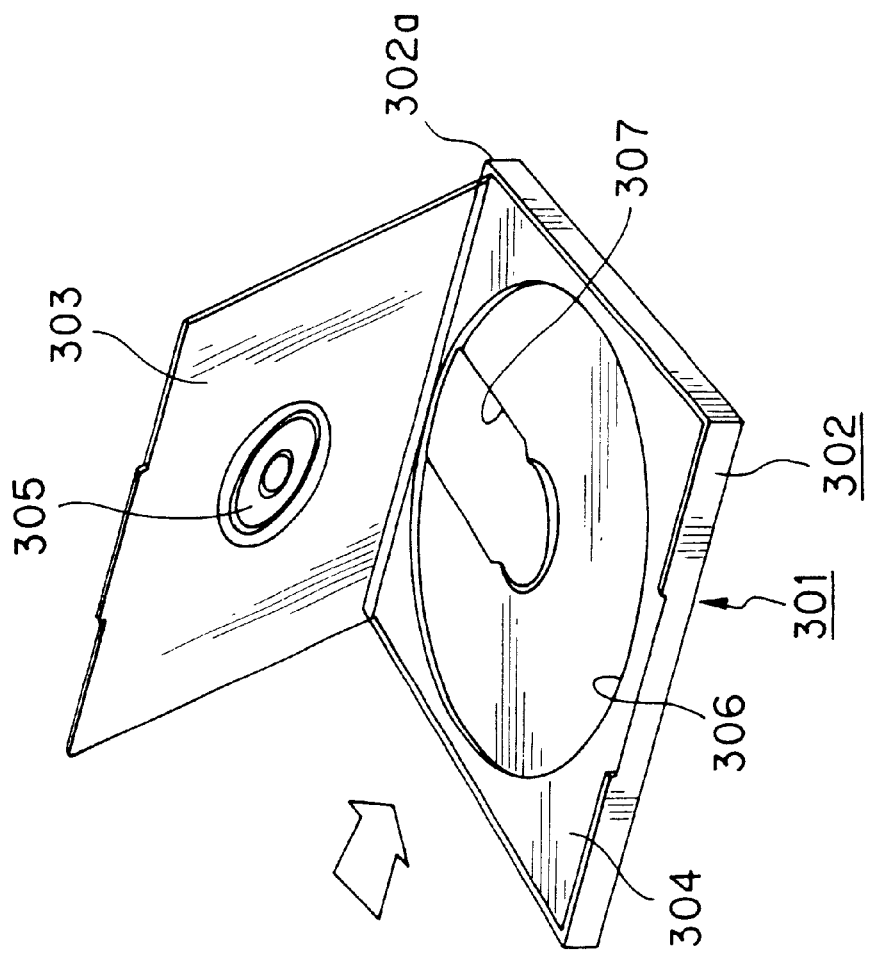
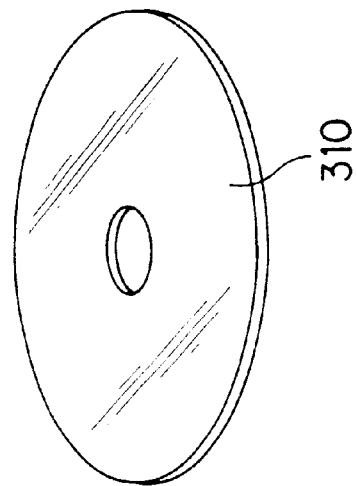
FIG.71
PRIOR ART

DISK TRAY, DISK STORING APPARATUS AND DISK DRIVE

TECHNICAL FIELD

The present invention relates to a disc tray which is capable of loading a recording and/or reproducing disc, such as an optical disc or a magneto-optical disc, serving as a recording medium for information signals in a state in which the disc is held in the disc tray, a disc accommodating apparatus for use when the disc tray is preserved or carried and a disc drive apparatus.

BACKGROUND ART

Hitherto, discs, such as optical discs and magneto-optical discs, have been known to serve as recording mediums for recording information signals, such as music signals, video signals, information signals which must be processed by an information processing apparatus, such as a computer, or information signals, such as program information or the like for controlling the operation of a computer.

Discs of the foregoing type include a CD (Compact Disc), a CD-ROM (Compact Disc Read Only Memory), a CD-R (Compact Disc Recordable), a DVD (Digital Video Disc) and a DVD-ROM (Digital Video Disc Read Only Memory).

There is apprehension that an information signal cannot be recorded and/or reproduced if dust adheres to the signal recording surface of a disc, such as an optical disc or a magneto-optical disc, or if the signal recording surface is damaged.

Therefore, a disc of the foregoing type is accommodated and preserved in a disc accommodating apparatus. Since the disc is accommodated in the disc accommodating apparatus when the disc is carried, the signal recording surface can be protected.

Hitherto, the disc accommodating apparatus has been composed of three elements including a case body formed by molding transparent synthetic resin and having a rectangular shape; a cover rotatively joined to the case body through hinge portions so as to open/close an opened portion formed on the upper surface of the case body; and a disc tray made of thin and transparent synthetic resin sheet or a synthetic resin plate and arranged to be placed in the case body.

The disc tray arranged to be placed in the case body is able to hold the disc which is accommodated in the disc accommodating apparatus. The disc tray has a disc-receiving recess formed into a circular shape substantially corresponding to the outer shape of the disc which is accommodated in the disc accommodating apparatus. The recess has, in the central portion thereof, a disc holding projection to which a center hole formed in the central portion of the disc is engaged. The center hole of the disc is engaged to the disc holding projection so as to be placed horizontally in the disc-receiving recess so that the disc is held in the disc tray.

The disc accommodated in the disc accommodating apparatus is removed from the disc tray so as to be removed from the case body. Then, the disc is held by the fingers so as to be loaded into the disc drive apparatus.

The disc accommodating apparatus arranged in such a manner that the disc is removed from the case body and only the disc is loaded into the disc drive apparatus causes a complicated operation to be performed when the disc is loaded into the disc drive apparatus. Since the disc is held directly by the fingers, there is apprehension that the signal recording surface of the disc is damaged and contamination, such as fingerprints, is allowed to adhere to the signal recording surface. If the signal recording surface is damaged or dust is allowed to adhere to the same, there is apprehension that recording and/or reproducing of an information signal information signal cannot completely be performed.

As a disc accommodating apparatus which is capable of solving the above-mentioned problem, a structure has been disclosed in Japanese Utility-Model Publication No. 5-31724.

A disc accommodating apparatus 301 disclosed as described above, as shown in FIG. 71, has a rectangular shape and composed of four elements including a case body 302 formed into a box shape having an opened upper surface and a small depth; a cover 303 rotatively joined to the case body 302 through a hinge portion 302*a* and formed into a flat plate for opening/closing the upper portion of the case body 302; a disc tray 304 detachably loaded into the case body 302; and a disc pressing member 305 rotatively joined to the central portion of the inner surface of the cover 303. The disc tray 304 has a circular disc-receiving recess 306 formed therein. The disc-receiving recess 306 has a U-shape bottom opening 307 formed from substantially the central portion of the disc-receiving recess 306 toward an end of the disc tray 304. The disc 310 is placed within the disc-receiving recess 306 in such a manner that a slight gap is maintained between the end of the disc 310 and the disc-receiving recess 306. When the cover 303 is closed, the disc 310 is supported by the disc pressing member 305 from an upper position so as to be held within the disc-receiving recess 306.

When the disc 310 accommodated in the disc accommodating apparatus 301 is loaded into the disc drive apparatus, the cover 303 is rotated about the hinge portion 302a to remove the disc pressing member 305 to a position above the disc 310. Then, the disc tray 304 is removed from the case body 302. Then, the disc tray 304 having the disc 310 placed on the disc-receiving recess 306 thereof is inserted into the disc drive apparatus so that the disc 310 is loaded.

When the disc tray 304 has been loaded into the disc drive apparatus, the disc table disposed in the body of the apparatus through the bottom opening 307 is inserted into the disc tray 304.

Since the foregoing disc accommodating apparatus 301 is composed of four elements, the number of the elements is too large and a large number of man-hour is required. Thus, the cost cannot be reduced. What is worse, the disc pressing function of the disc pressing member 305 is suspended at the instant when the cover 303 has been opened. Then, the disc 310 is brought to a state in which the disc 310 can easily be separated from the inside portion of the disc tray 304.

Moreover, an operation for removing the disc tray 304 from the case body 302 having a surrounding peripheral wall cannot easily be performed. Thus, there is a risk that the disc 310 is dropped and damaged when the case body 302 and the disc tray 304 are carelessly inclined during the operation for removing the disc tray 304. Whenever the disc tray 304 removed from the case body 302 is loaded into the disc drive apparatus, the disc tray 304 must be held by another hand to easily insert the disc tray 304 into the disc drive apparatus. Also during the foregoing operation for changing the hand for holding the disc tray 304, there is apprehension that the disc tray 304 is carelessly inclined and dropped.

Therefore, the necessity of preventing careless inclination of the case body 302 and the disc tray 304 when the disc 310 is loaded into the disc drive apparatus raises a difficulty of the operation for loading the disc 310 into the disc drive apparatus.

Moreover, the disc tray 304 arranged in such a manner that the disc 310 is placed within the disc-receiving recess 306 cannot be used in a so-called stand-up disc drive apparatus which is stood erect.

DISCLOSURE OF THE INVENTION

An object of the present invention is to provide a novel disc tray and a disc accommodating apparatus capable of solving the problems experienced with the conventional disc tray or the disc accommodating apparatus.

A further object of the present invention is to provide a disc tray and a disc accommodating apparatus capable of reliably projecting an optical disc or a magneto-optical disc for use to serve as a recording medium for an information signal.

A still further object of the present invention is to provide a disc tray and a disc accommodating apparatus with which the operation for loading/unloading a disc can easily be performed.

Another object of the present invention is to provide a disc tray and a disc accommodating apparatus with which the operation for loading a disc into a disc drive apparatus can easily and reliably be performed.

Another object of the present invention is to provide a disc tray which can be used in a disc drive apparatus which is disposed vertically when it is used.

Another object of the present invention is to provide a disc tray and a disc accommodating apparatus which is capable of reducing the number of elements and which can easily be manufactured.

Another object of the present invention is to provide a disc drive apparatus which is capable of protecting a disc and which enables a loading operation to be performed reliably.

To achieve the above-mentioned objects, a disc tray according to the present invention has an overall body formed into a thin plate-like shape, the disc tray comprising: a disc-receiving recess having an inner diameter larger than the diameter of a recording and/or reproducing disc and a depth larger than the thickness of the disc and arranged to removably hold the disc while having gaps in a direction in parallel with the surfaces of the disc and in a direction of the thickness of the disc; a bottom opening formed along the widthwise directional center of the disc tray in a range from substantially the central portion of the bottom portion of the disc-receiving recess to an end of the bottom portion and having a shape that the end of the bottom is opened; and at least one elastic support portion formed to project into the disc-receiving recess from outside of the disc-receiving recess and arranged to press at least a portion of the outer periphery of the disc held in the disc-receiving recess so as to support the disc in the disc-receiving recess.

A pair of the elastic support portions are formed on the two sides of the opened portion of the disc-receiving recess so as to press the disc placed in the disc-receiving recess against the vertical surfaces of the disc-receiving recess in order to prevent looseness.

A plurality of disc-separation-preventive portions are formed to project into the disc-receiving recess from outside of the disc-receiving recess in such a manner that gaps at least permitting insertion of the disc are formed from. the bottom portion of the disc-receiving recess. Thus, the disc can reliably be held in the disc-receiving recess.

Moreover, the disc tray has a plurality of disc-separation-preventive portions formed to project into the disc-receiving recess from outside of the disc-receiving recess in such a manner that gaps at least permitting insertion of the disc are formed from the bottom portion of the disc-receiving recess.

Since the disc tray has the elastic support portions and the disc-separation-preventive portions, portions of the disc are engaged to the disc-separation-preventive portions and the elastic displacement portions are thus displaced. As a result, the disc can easily be loaded/unloaded to and from the disc-receiving recess.

Since a disc support portion for supporting a non-signal-recording region in the inner portion of the disc held in the disc-receiving recess is formed in the bottom portion of the disc-receiving recess, the disc can be held in such a manner that contact of the signal recording surface with the disc-receiving recess can be prevented.

A tray accommodating case comprises: a tray accommodating portion closed by opposite upper and lower surfaces, opposite side surface perpendicular to the upper and lower surfaces and a rear surface perpendicular to the side surfaces and having a tray insertion/removal opening formed in the front surface opposite to the rear surface; and a tray engagement portion formed in the tray accommodating portion and arranged to removably be engaged to an engagement portion provided for a disc tray which is inserted through the disc tray insertion/removal opening so as to engage the disc tray to an accommodating position.

The tray accommodating case has a disc pressing portion formed in substantially the central portion in the direction of the rear surface opposite to the tray insertion/removal opening so as to elastically press a disc held in the tray accommodating portion. Thus, a disc held on the disc tray can be accommodated in the disc accommodating apparatus without looseness.

A disc accommodating apparatus according to the present invention comprises the disc tray and the tray accommodating case for accommodating the disc tray.

A disc drive apparatus into which the disc tray having a disc on which an information signal is recorded comprises: a tray receiving portion for receiving the disc tray; a disc rotating mechanism for rotating the disc held on the disc tray loaded into the tray receiving portion; and recording and/or reproducing means for recording and/or reproducing an information signal to and from the disc which is rotated by the disc rotating mechanism.

The disc drive apparatus has a chucking member arranged to chuck the disc held on the disc tray to the disc rotating mechanism and disposed opposite to the disc rotating mechanism. Thus, the disc is chucked by the chucking member so that the disc is rotated integrally with the disc rotating mechanism.

The tray receiving portion is provided with disc-receiving-recess enlarging means which is engaged to the opened end of the disc-receiving recess provided for the disc tray when the disc tray is loaded in the tray receiving portion to enlarge the disc-receiving recess so as to permit the disc held in the disc-receiving recess to freely rotate in the disc-receiving recess.

Other objects, features and advantages of the invention will be evident from the following detailed description of the preferred embodiments

BRIEF DESCRIPTION OF THE DRAWINGS

FIGS. 3A to 3D are a plan view, a rear view, a front view and a side view showing the disc tray shown in FIG. 2;

FIGS. 6A to 6B are cross sectional views each of which showing the disc tray shown in FIG. 3 and which are taken along lines VI—VI and VI'—VI', respectively;

FIGS. 12A to 12D are a partially-cut plan view, a rear view, a front view and a side view showing the disc accommodating case shown in FIG. 8;

FIG. 71 is a perspective view showing a conventional tray accommodating case.

BEST MODE FOR CARRYING OUT THE INVENTION

A disc tray and a disc accommodating apparatus arranged to use the disc tray according to the present invention will now be described with reference to the drawings.

A first embodiment of the disc tray and the disc accommodating apparatus according to the present invention will now be described with reference to FIGS. 1 to 17.

Figure 1:
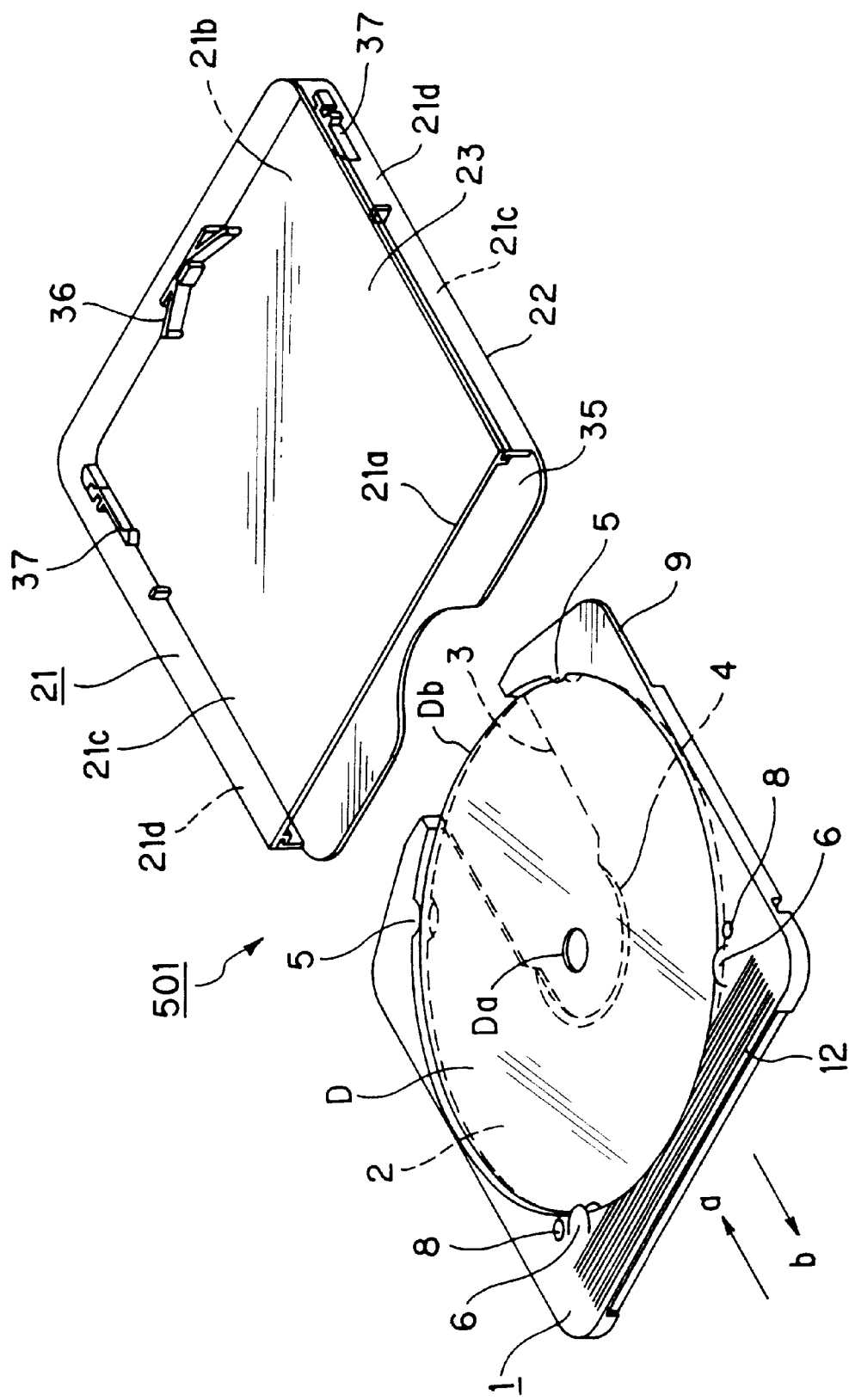
FIG. 1 is a perspective view showing a first embodiment of a disc tray and a tray accommodating case according to the present invention.
Figure 5:
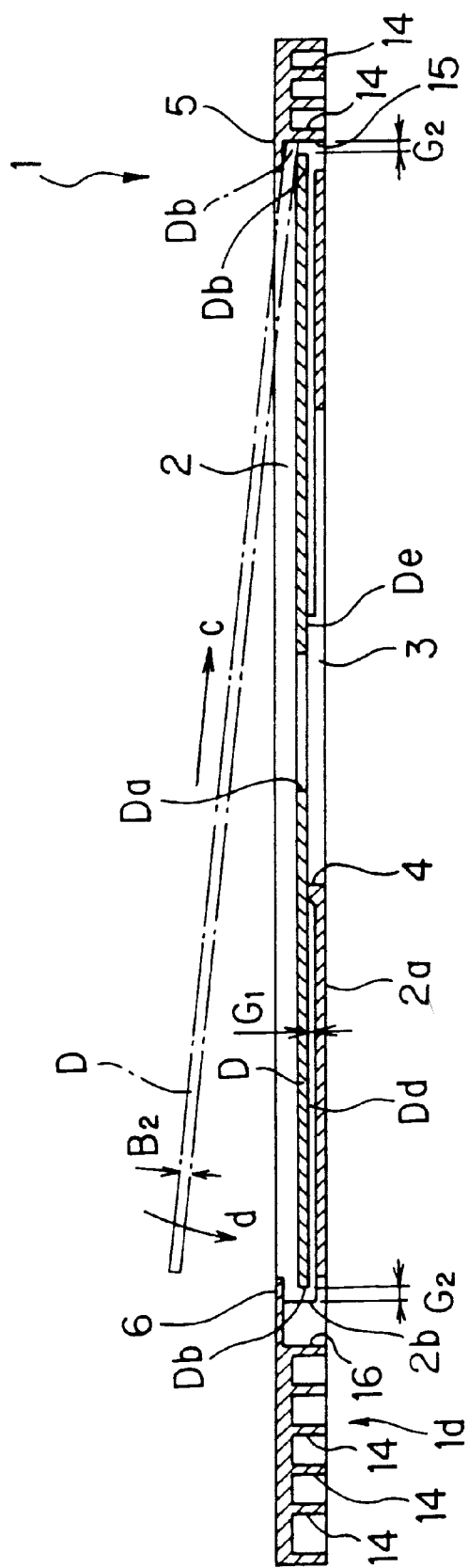
FIG. 5 is a cross sectional view showing the disc tray shown in FIG. 3 and taken along line V—V.

A disc accommodating apparatus 501 according to a first embodiment of the present invention, as shown in FIG. 1, is composed of a disc tray 1 formed into a thin-plate-like shape and a tray accommodating case 21 for accommodating the disc tray 1. The disc accommodating apparatus 501 is arranged to accommodate a disc, such as an optical disc or a magneto-optical disc, serving as a recording medium for recording a music signal, a video signal, an information signal which is processed by an information processing apparatus, such as a computer, and another information signal indicating program information or the like for controlling the operation of the computer. Specifically, a disc D, such as an optical disc or a magneto-optical disc exemplified by a CD, a CD-ROM, a CD-R, a DVD and a DVD-ROM, having a diameter of about 120 mm and a thickness of about 1.2 mm is accommodated. The disc D has a central hole Da having a diameter of about 15 mm and formed in the central portion thereof. As shown in FIG. 5, a lower surface of the disc D when the disc D is viewed in FIG. 5 is made to be a signal recording surface. The signal recording surface has a non-signal recording region De formed on the inside of a signal recording region Dd and on the outside of the central hole Da.

The disc tray 1 for holding the disc D is manufactured by molding a non-transparent synthetic resin, such as ABS resin or polyacetal resin. The disc tray 1 is formed into a substantially rectangular shape having a width $W_1$ of about 124 mm in the lateral direction of FIG. 2, a length $L_1$ of about 131 mm in the lengthwise direction of FIG. 2 and a thickness $T_1$ of about 5 mm in the vertical direction of FIG. 2. A circular disc-receiving recess 2 having an opened upper portion is formed in substantially the central portion of the upper surface of the disc tray 1. The disc-receiving recess 2 has a diameter $A_1$ shown in FIG. 3 which is about 121.6 mm and a depth $B_1$ shown in FIGS. 6A and 6B which is about 3.6 mm. That is, the diameter $A_1$ and depth $B_1$ of the disc-receiving recess 2 and the diameter $A_2$ and thickness $B_2$ of the disc D satisfy $A_1 > A_2$ and $B_1 > B_2$.

Figure 2:
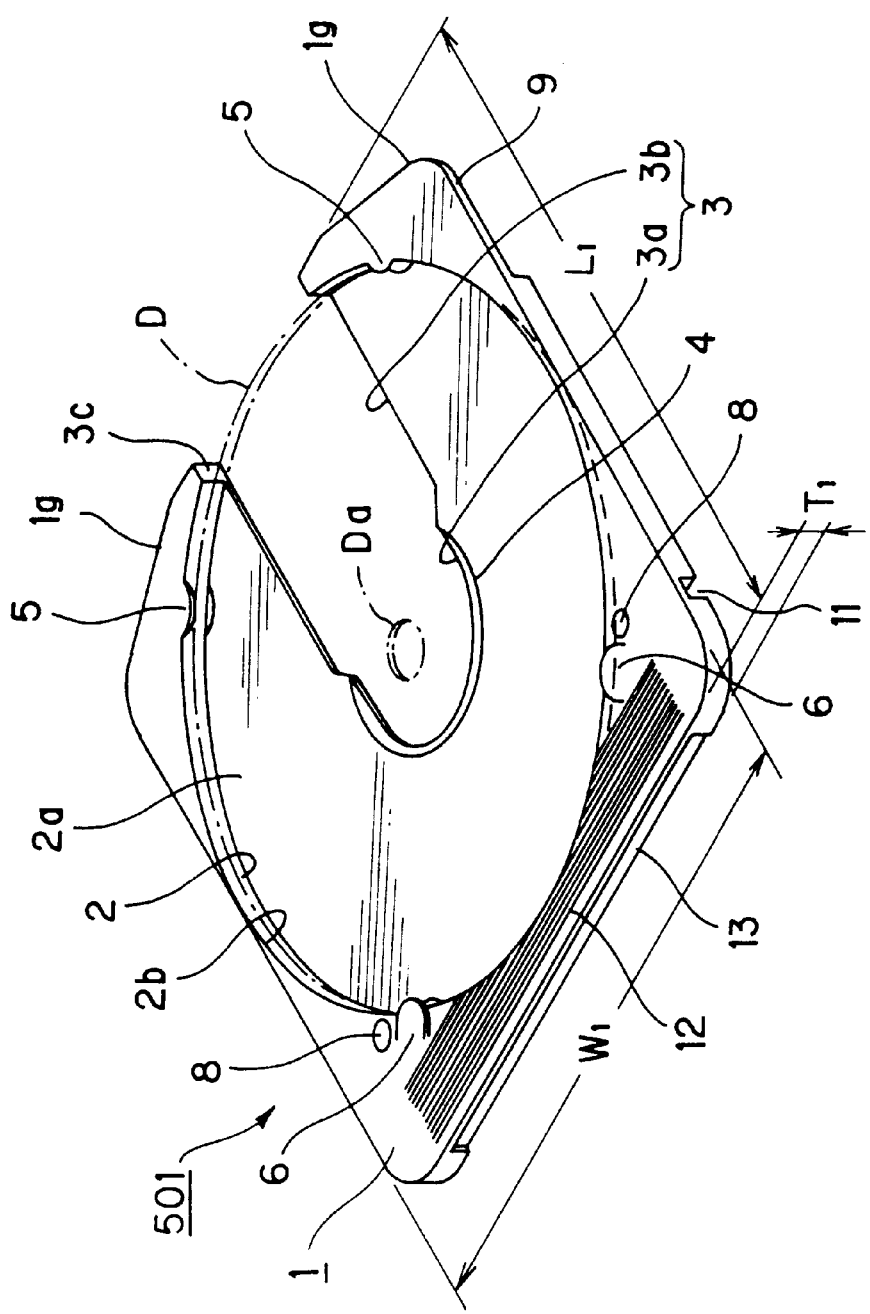
FIG. 2 is a perspective view showing the disc tray according to the first embodiment.
Figure 4:
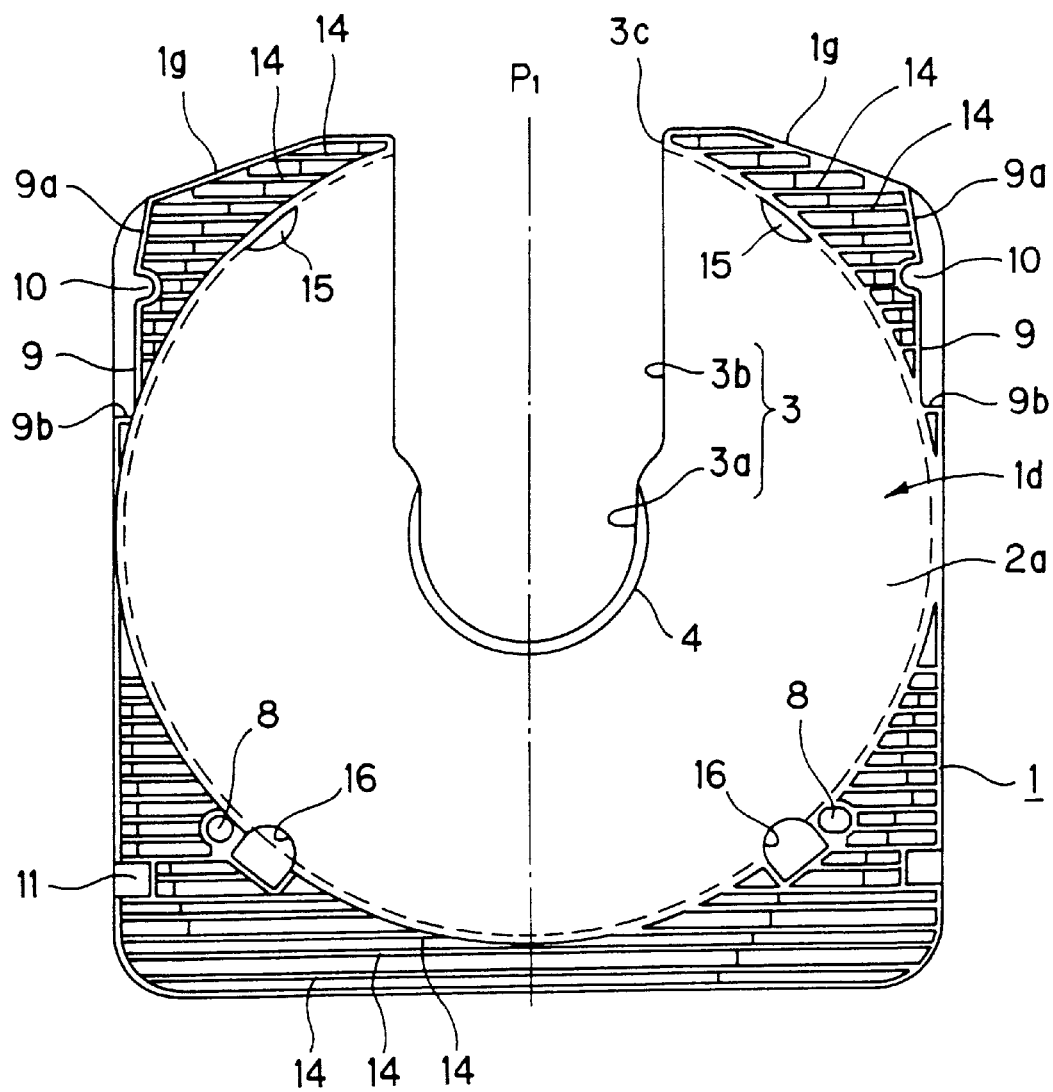
FIG. 4 is a bottom view showing the disc tray shown in FIG. 2.

A bottom portion 2a of the disc-receiving recess 2, as shown in FIGS. 2 and 4, has a U-shape bottom opening 3 formed by cutting in a range from the substantially central portion to the front end of the disc tray 1 along a central line $P_1$ of the disc tray 1, the bottom opening 3 being positioned in the central portion in the lateral direction of the disc tray 1. The bottom opening 3 is formed into a substantially U-shape composed of a semi-circular hole 3a formed at substantially the central portion of the disc tray 1 and a rectangular hole 3b continued from the semi-circular hole 3a and formed to face the front end 1a. A disc support portion 4 formed into a semi circular arc, having an outer diameter of about 38 mm and also serving as a reinforcing rib, is integrally formed with the upper portion of a central portion of a bottom portion 2a of the disc-receiving recess 2, the disc support portion 4 being formed along the semi-circular hole 3a.

As shown in FIGS. 2 and 3A, engagement projections 5 and 6 for preventing separation of the disc are formed at the outer ends of the opened side of the disc-receiving recess 2 in such a manner that the engagement projections 5 and 6 project to face the inside portion of the disc-receiving recess 2. A pair of right-hand and left-hand engagement projections 5 and 6 are formed adjacent to the front end 1a of the disc tray 1 which is the insertion portion into the tray accommodating case 21. On the other hand, another pair of right-hand and left-hand engagement projections 5 and 6 are formed adjacent to the rear end 1b of the disc tray 1. Thus, four engagement projections 5 and 6 are formed. Each of the engagement projections 5 and 6 has, as shown in FIGS. 6A and 6B, a thickness $W_1$ of about 0.2 mm so that they are flush with the upper surface of the disc tray 1. As shown in FIG. 3A, the engagement projections 5 and 6 are formed symmetrically with respect to the central line $P_1$ of the disc tray 1. A gap $B_3$ between the lower surfaces of the four engagement projections 5 and 6 and the bottom portion 2a of the disc-receiving recess 2 is about 3.4 mm. The diameter $A_3$ of an inscribing circle which is in contact with the inner ends of the four engagement projections 5 and 6 is about 117.6 mm, as shown in FIG. 3A. That is, the gap $B_3$, the diameter $A_3$ of the inscribing circle, the thickness $B_2$ of the disc D and the diameter $A_2$ have the relationship satisfying $B_3 > B_2$ and $A_3 < A_2$.

Figure 7A:
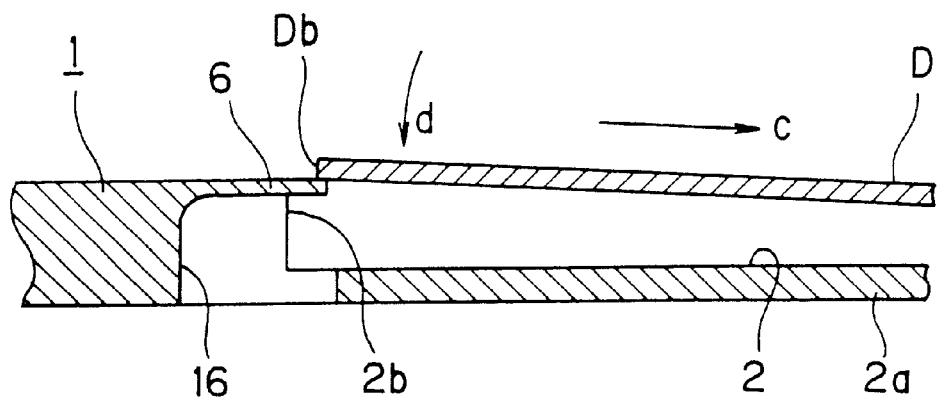
FIGS. 7A to 7C are enlarged views showing an essential portion of the cross sectional view shown in FIG. 5 for illustrating the operation for loading/unloading a disc to and from the disc tray.
Figure 7B:
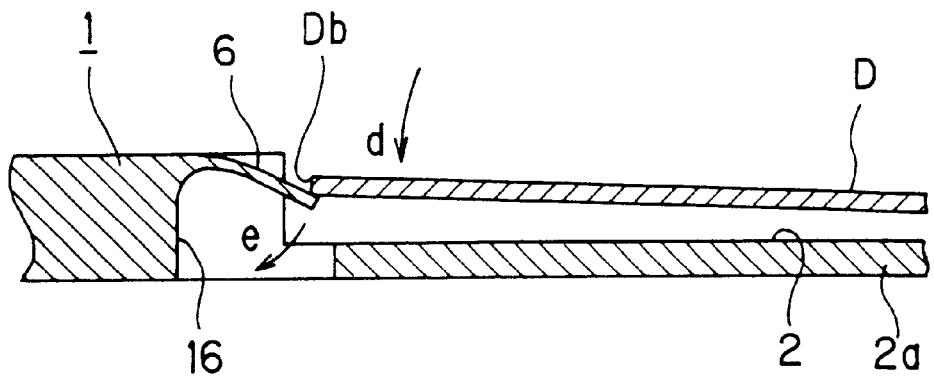
Figure 7C:
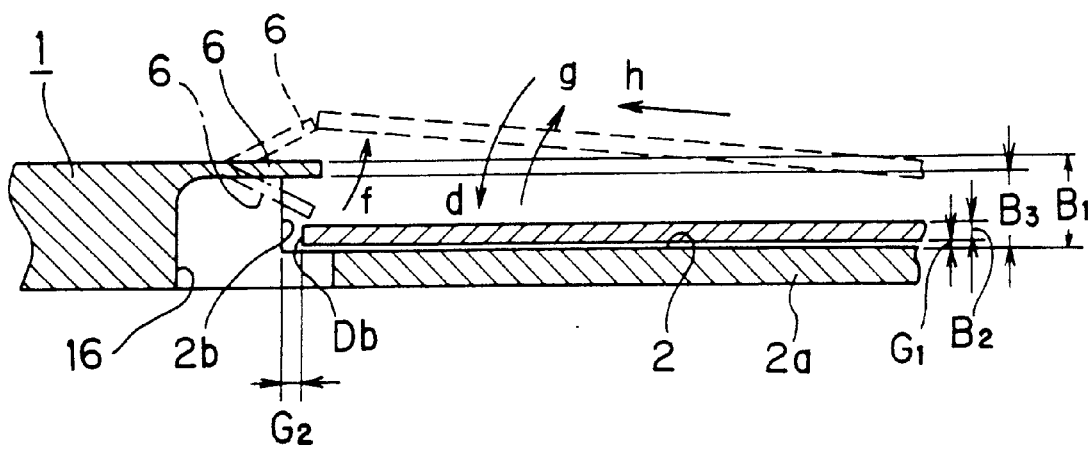

As shown in FIG. 3A, two cut lines 7 which are in parallel with the central line of the disc-receiving recess 2 are formed on the two sides adjacent to the base portions of the pair of the right and left engagement projections 5 and 6 formed adjacent to the rear end 1b of the disc tray 1. The pair of the right and left engagement projections 6, as shown in FIG. 7A, 7B and 7C, can be elastically deformed in a direction from the horizontal position at which the engagement projections 6 are flush with the upper surface of the disc tray 1 in the direction of the depth of the disc-receiving recess 2.

Note that similar cut lines may be formed on the two sides adjacent to the base portions of the pair of the right and left engagement projections 5 formed adjacent to the front end 1a of the disc tray 1 so that elastic displacement of the engagement projections 5 is permitted.

Right and left reference holes 8 are formed on the outside of the disc-receiving recess 2 of the disc tray 1 at a position deviated to the rear end 1b of the disc tray 1, the reference holes 8 being formed on a reference line $P_2$ which is perpendicular to the central line $P_1$ of the disc tray 1. The reference holes 8 penetrate the disc tray 1, as shown in FIGS. 3A, 4 and 6B. The two reference holes 8 are formed symmetrically with respect to the central line $P_1$ of the disc tray 1. Either of the reference holes 8 formed in the right-hand portion of FIG. 3A is formed into a complete round, while another reference hole 8 formed in the left-hand portion of FIG. 3A is formed into an elongated hole having the major axis arranged in a direction of the reference line $P_2$.

As shown in FIGS. 3B and 3D, a pair of right and left cut recesses 9 are formed on the right and left corners in the front portion of the disc tray 1. The cut recesses 9 are formed substantially in parallel with the central line $P_1$ of the disc tray 1 and symmetrically. As shown in FIGS. 3A and 4, a semicircular engagement recess 10 serving as an engagement portion which must be engaged to the tray accommodating case 21 is formed in each of the cut recesses 9. Portions from the engagement recesses 10 formed in the cut recesses 9 to the front portion of the disc tray 1 have inclined surfaces 9a, as shown in FIG. 4. As shown in FIGS. 3A and 4, a pair of right and left rectangular cut recesses 11 are formed on the right-hand and left-hand sides of the bottom surface of the disc tray 1, the cut recess 11 being formed at a position deviated toward the rear end of the disc tray 1.

As shown in FIGS. 2 and 3A, a grip 12 formed by a plurality of parallel non-slip projections is formed on the upper surface of the disc tray 1 at a position adjacent to the rear end of the disc tray 1. Moreover, a horizontal label application area 13 is formed on the rear end of the disc tray 1, as shown in FIG. 3C. Moreover, a multiplicity of reinforcing ribs 14 are formed on the bottom surface of the disc tray 1 at positions on the outside of the disc-receiving recess 2, as shown in FIG. 4. Moreover, inclined portions 1g are formed on the front corners of the disc tray 1, as shown in FIGS. 3A and 4.

The four engagement projections 5 and 6 projecting into the disc-receiving recess 2 as described above are formed by an under-cut molding method, in which the mold is forcibly is released, when the disc tray 1 is molded by using a molding apparatus. The under-cut molding method simplifies the structure of the mold for manufacturing the disc tray 1 in such a way that the mold has a two-piece structure permitting vertical separation. Moreover, recesses 15 and 16 are formed at the lower positions on the rear end of the disc tray 1 corresponding to the engagement projections 5 and 6, the recesses 15 and 16 being formed when the under-cut process is performed.

Figure 8:
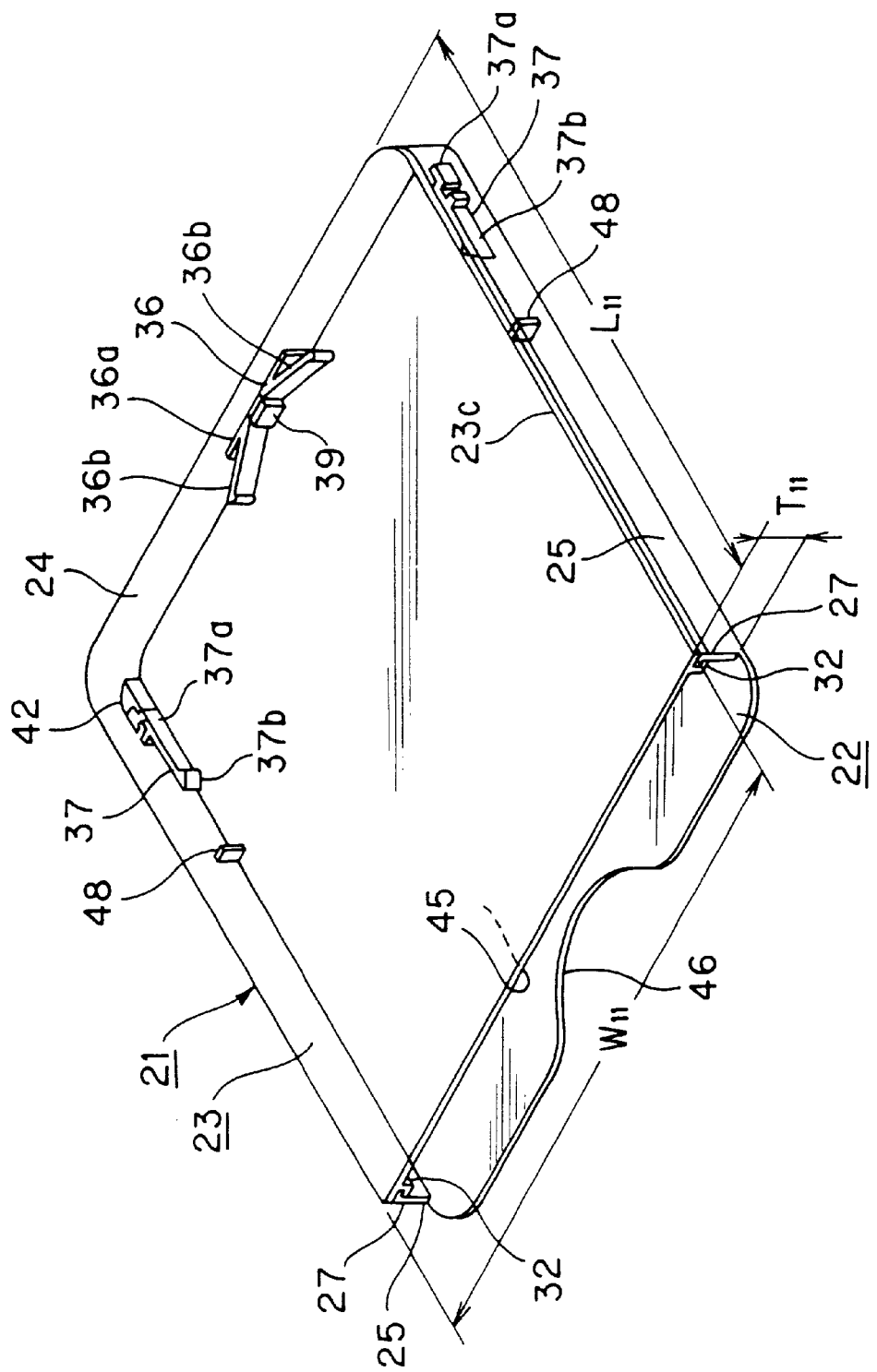
FIG. 8 is a perspective view showing the tray accommodating case according to the first embodiment.
Figure 9:
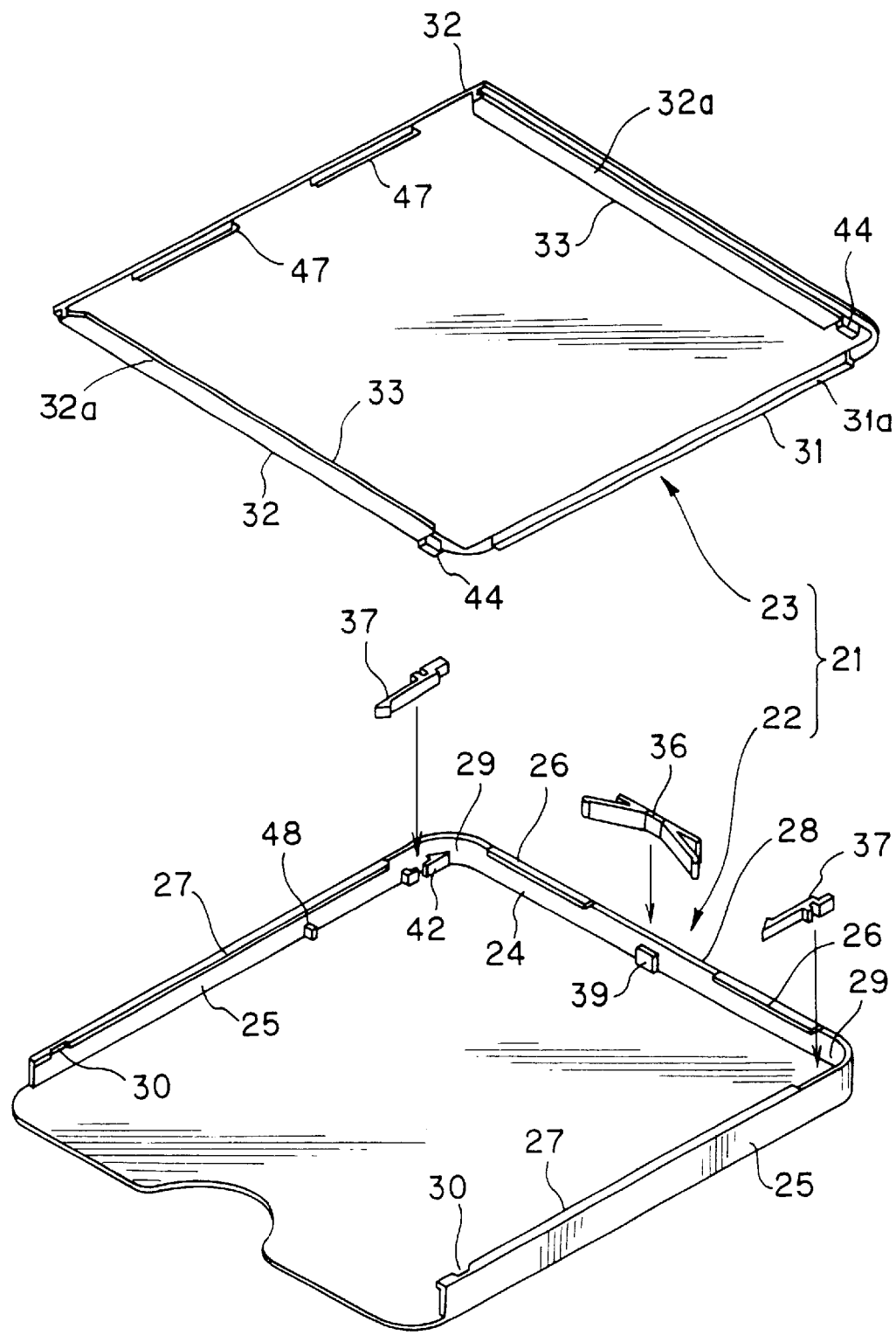
FIG. 9 is an exploded perspective view showing the tray accommodating case shown in FIG. 8.

As shown in FIGS. 1, 8 and 9, the tray accommodating case 21, in which the disc tray 1 having the above-mentioned structure is accommodated, is manufactured by molding transparent or semi-transparent synthetic resin, such as ABS resin or polyacetal resin. The tray accommodating case 21 is composed of a rectangular case body 22 and a cover plate 23 for closing the flat-surface portion of the case body 22.

The case body 22 which constitutes the tray accommodating case 21 has right and left opposite side walls 25, as shown in FIG. 9. Moreover, a rear wall 24 perpendicular to the side walls 25 is formed. The two side walls 25 and the rear wall 24 are formed integrally and continuously. Engagement projections 26 and 27 projecting toward the inside portion of the case body 22 are formed at the top ends of the rear wall 24 and the side walls 25. Cut portions 29 are formed in the corners in which the engagement members 27 of the side walls 25 and the engagement members 26 of the rear wall 24 are joined to one another. The cut portions 29 serve as insertion portions when tray engagement members 37 to be described later are joined to the case body 22.

Also a cut portion 28 is formed in the central portion of the engagement members 26 of the rear wall 24. The cut portion 28 serves as an insertion portion when a disc pressing and supporting member 36 to be described later is joined to the case body 22. Moreover, engagement recesses 30 are formed in the portions of the engagement members 27 provided for the side walls 25, the engagement recesses 30 being formed adjacent to the front surface of the case body 22.

As shown in FIG. 9, received portions 32 and 31 arranged to be engaged to the engagement members 27 and 26 of the case body 22 are provided for the two opposite sides and the rear portion of the cover plate 23. Each of the received portions 32 and 31 has an L-shape cross sectional shape, as shown in FIGS. 9 and 12C. Received members 32a and 31a formed at the leading ends of the received portions 32 and 31 are formed integrally with the cover plate 23 in such a manner as to project to the outside portion of the cover plate 23.

A tray-insertion guide member 33 for guiding insertion of the disc tray 1 which is accommodated in the tray accommodating case 21 and restraining the position of accommodation is formed in each of the leading ends of the received portions 32 formed on the two sides of the cover plate 23. The tray-insertion guide members 33 are formed integrally with the received members 32a.

As shown in FIG. 12A, engagement projections 34 arranged to be engaged to the engagement recesses 30 provided for the case body 22 are formed on the two sides of the cover plate 23 at positions adjacent to the front end of the cover plate 23. The engagement projections 34 are formed integrally with the outer surfaces of the received portions 32, as shown in FIG. 12A.

Figure 13:
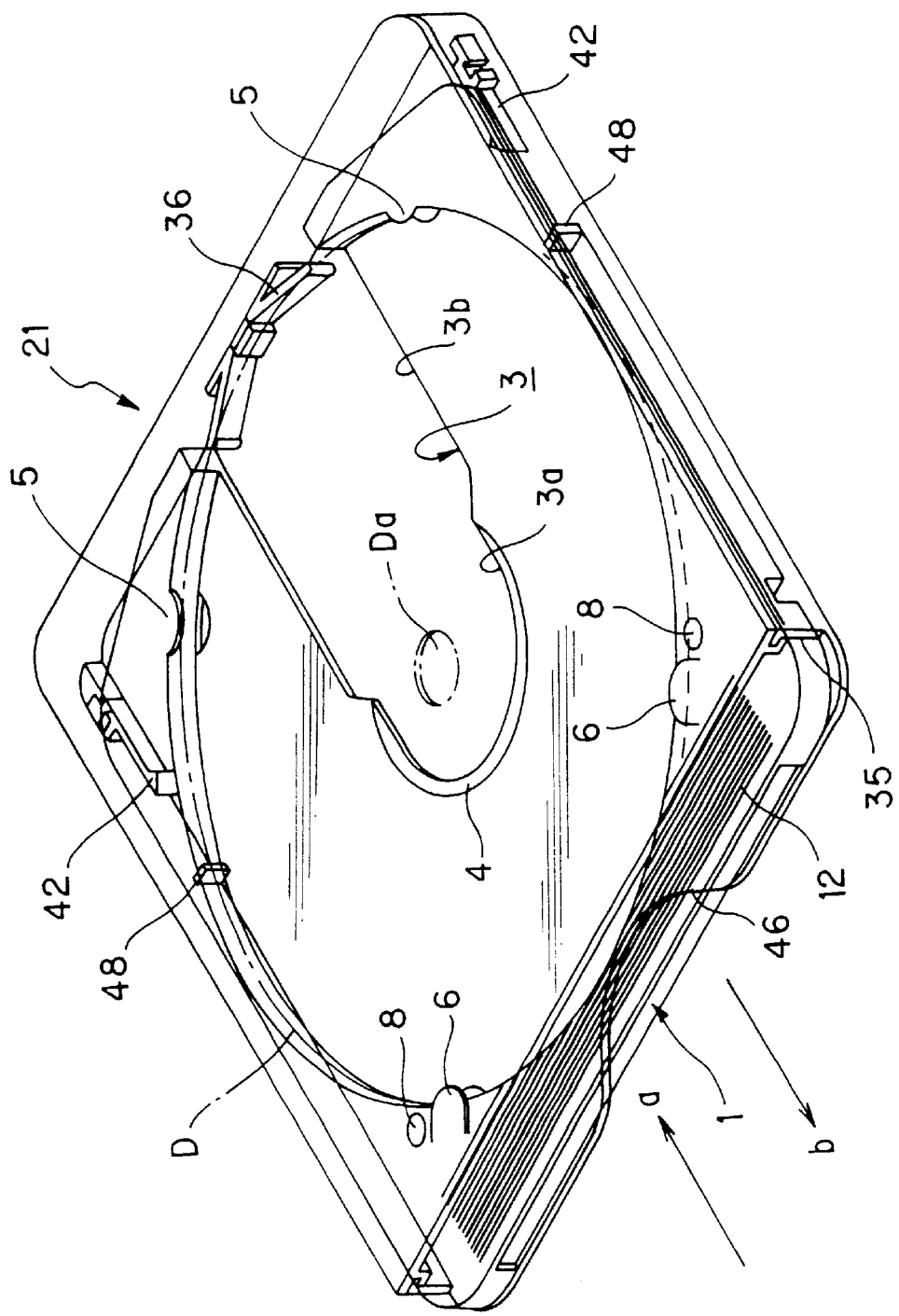
FIG. 13 is a perspective view showing a state in which the disc tray is accommodated in the tray accommodating case according to the first embodiment.
Figure 14:
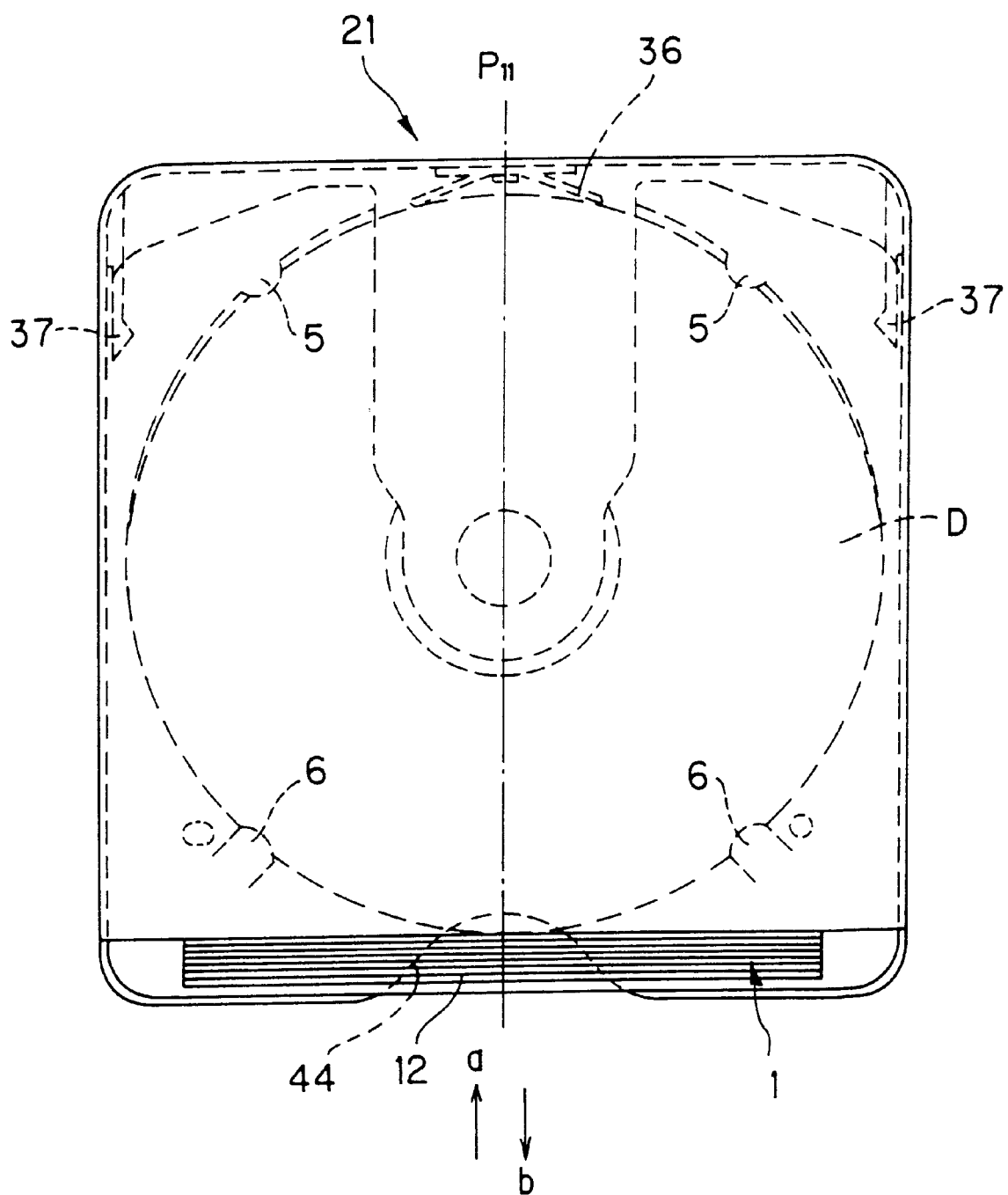
FIG. 14 is a plan view showing the disc accommodating case in which the disc tray shown in FIG. 13 is accommodated.

As shown in FIGS. 13 and 14, when the cover plate 23 is horizontally inserted into the case body 22 from a direction indicated by an arrow a shown in FIG. 13 in such a manner that the right and left received portions 32 are engaged to the right and left engagement members 27 of the case body 22, the received portion 31 adjacent to the rear surface is engaged to the rear engagement members 26 of the case body 22. Moreover, the pair of the right and left locating engagement projections 34 are elastically displaced by the pair of the right and left engagement recesses 30 and engaged within the engagement recesses 30. Thus, the cover plate 23 is located and joined to the case body 22.

As described above, the case body 22 and the cover plate 23 are combined with each other so that a horizontally-elongated tray inserting/removing opening 35 for inserting/removing the disc tray 1 is formed as shown in FIGS. 1 and 13. Thus, a thin and rectangular tray accommodating case 21 having closed top and bottom surfaces, rear surface and right and left surfaces is assembled.

Figure 10:
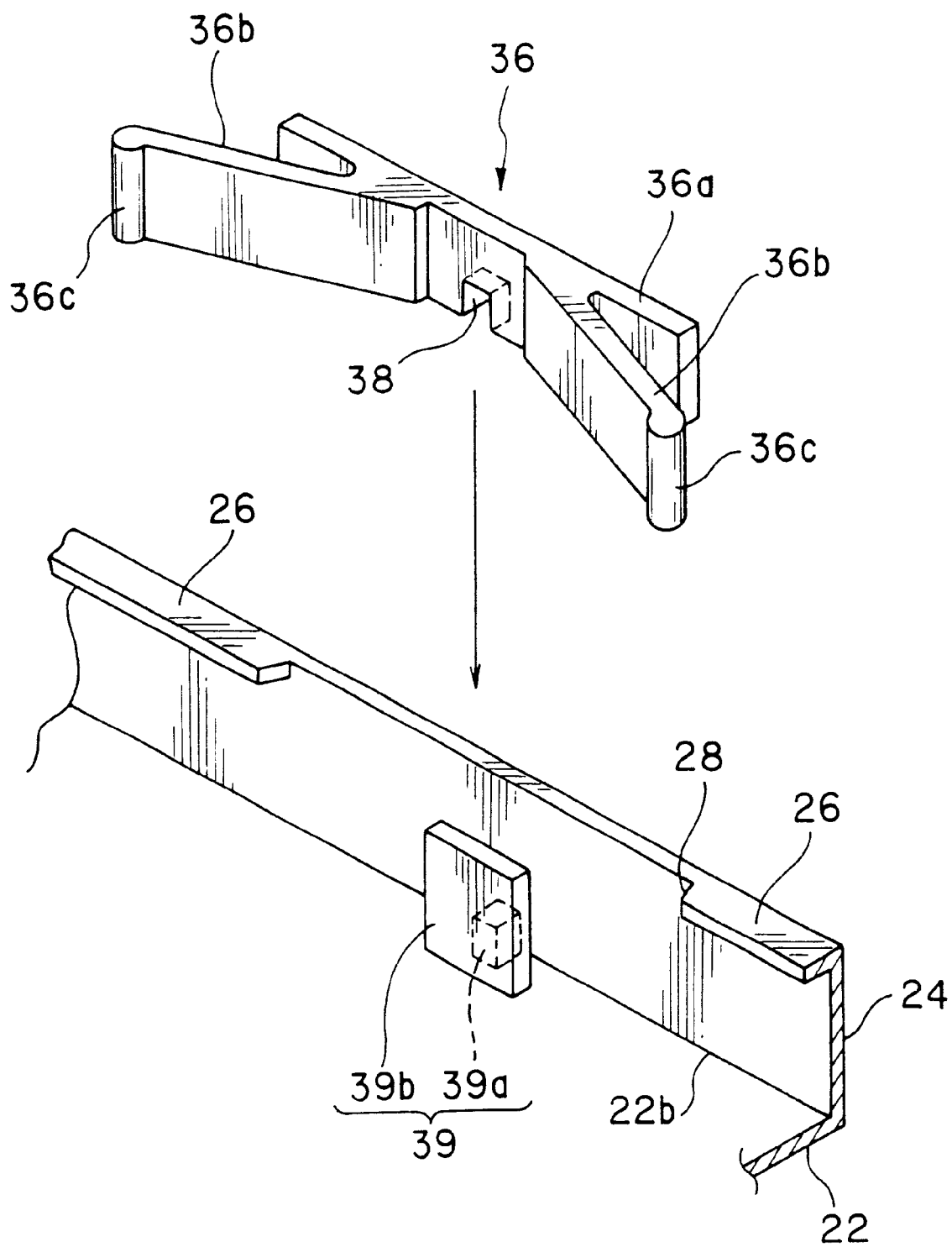
FIG. 10 is an enlarged, exploded and perspective view showing a disc pressing member in the tray accommodating case shown in FIG. 8.
Figure 11:
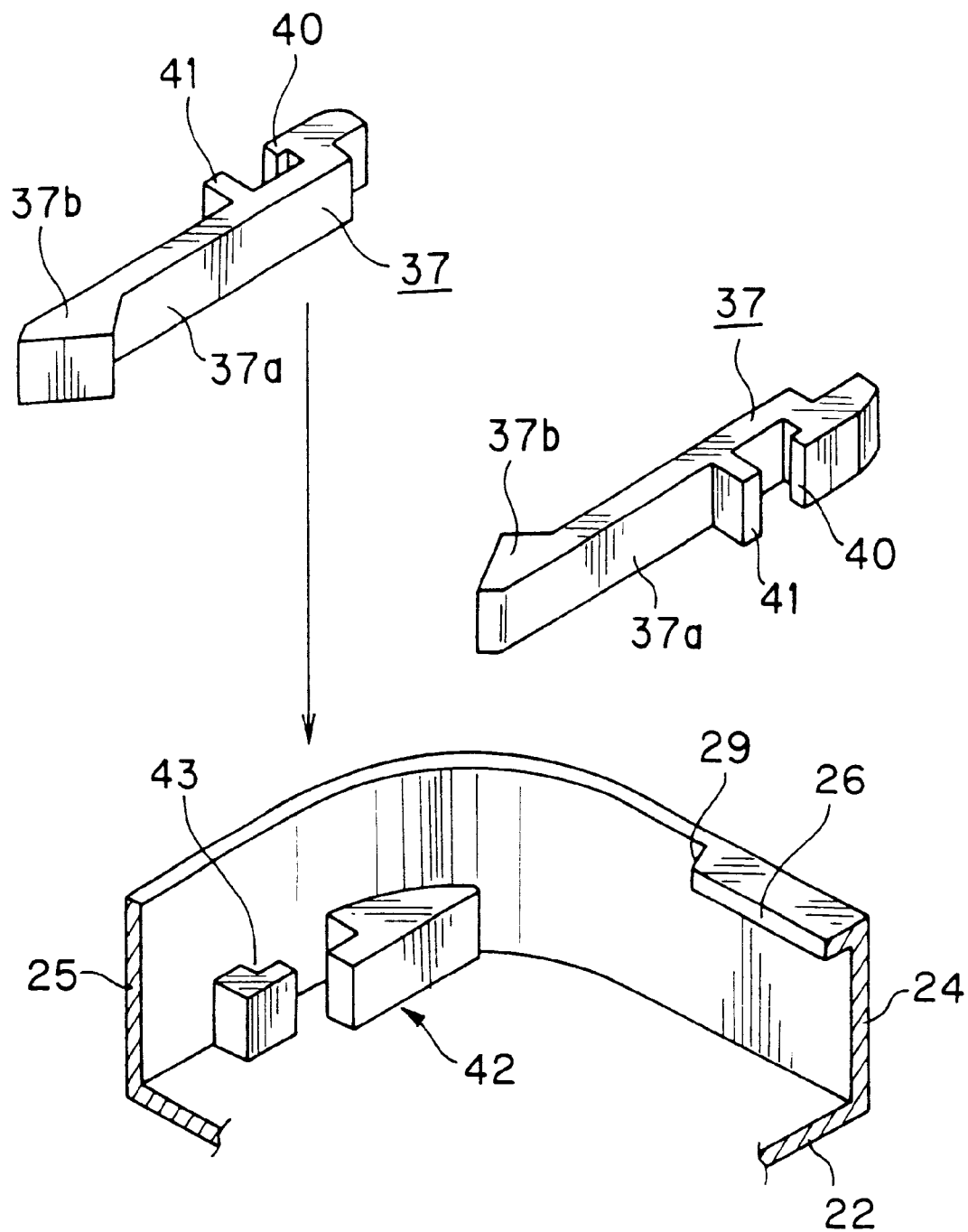
FIG. 11 is an enlarged, exploded and perspective view showing a tray engagement member in the tray accommodating case shown in FIG. 8.

As shown in FIGS. 12A to 12D, the disc pressing and supporting member 36 made of the same synthetic resin as the synthetic resin for making the tray accommodating case 21 is detachably mounted on a position on a central line $P_{11}$ in the lateral direction of the tray accommodating case 21 which is the central portion of the rear end of the tray accommodating case 21. The disc pressing and supporting member 36 is, as shown in FIG. 10, composed of a flat base 36a and a pair of disc pressing and supporting members 36b projecting over either side of the disc pressing and supporting members 36b and inclined forwards, the disc pressing and supporting members 36b being arranged to be elastically displaced. An expanded portion 36c having a circular-arc cross sectional shape is formed integrally with each of the leading ends of the disc pressing and supporting members 36b. An engagement recess 38 formed by cutting from a lower position is formed in the central portion of the base 36a, as shown in FIG. 10. A pair of right and left symmetrical tray engagement members 37 made of the same synthetic resin as the synthetic resin for making the tray accommodating case 21 are detachably disposed in the right-hand and left-hand portions of the rear end of the tray accommodating case 21, as shown in FIGS. 8 and 9. Each of the tray engagement members 37 has an elastically displacement portion 37a having an engagement claw 37b at the leading end thereof, as shown in FIG. 11. A pair of engagement members 40 and 41 are formed to project over the outer surface of the base opposite to the surface on which the projecting engagement claw 37b is formed, as shown in FIG. 11. The engagement member 40 is formed to project in parallel with the elastically displacement portion 37a, while the other engagement member 41 is formed to project perpendicular to the elastically displacement portion 37a.

The rear wall 24 of the case body 22 has a joining portion 39 for joining the disc pressing and supporting member 36. The joining portion 39 has an engagement member 39b formed integrally with the leading end of an engagement member 39a stood erect over the rear wall 24 so that the flat shape of the joining portion 39 is formed into a T-shape. As shown in FIG. 10, the disc pressing and supporting member 36 is joined in such a manner that the base 36a is inserted between the rear wall 24 and the engagement member 39b of the joining portion 39 through the cut portion 28 formed by cutting a portion of the engagement members 26 formed at the top end of the rear wall 24 of the case body 22. Thus, the engagement recess 38 is engaged to the engagement member 39a so that the base 36a is held between the rear wall 24 and the engagement member 39b. As a result, the position of the disc pressing and supporting member 36 with respect to the case body 22 is determined and the disc pressing and supporting member 36 is joined. At this time, the pair of the disc pressing and supporting members 36b are allowed to project into the case body 22, as shown in FIGS. 8 and 12A.

Moreover, joining portions 42 for joining the tray engagement members 37 are provided for the case body 22 at positions adjacent to the rear wall 24 of the side walls 25, as shown in FIGS. 9 and 11. Each of the joining portions 42 forms an engagement groove 43 having a T planar shape. The joining portions 42 are formed symmetrically. The tray engagement members 37 are inserted into the case body 22 through the cut portions 29 formed on the corners in which the two side walls 25 and the rear wall 24 of the case body 22 intersect with each other. At this time, each of the tray engagement members 37 is joined to the joining portions 42 in such a manner that the base having the engagement member 40 is engaged to the engagement groove 43 to hold a portion of the joining portions 42 by the engagement members 40 and 41. Thus, the tray engagement members 37 are attached to the case body 22.

Thus, the disc pressing and supporting member 36 and the pair of the tray engagement members 37 are joined to the case body 22, Then, the cover plate 23 is inserted into the case body 22 in the direction indicated by the arrow a shown in FIG. 13 so that the cover plate 23 is joined to the case body 22. As a result, the base 36a of the disc pressing and supporting member 36 is supported from an upper position by the received portion 31 of the cover plate 23 at the position adjacent to the rear portion of the cover plate 23 so that the disc pressing and supporting member 36 is secured to the case body 22. Also the tray engagement members 37 are secured to the case body 22 because the base portions of the tray engagement members 37 engaged to the joining portions 42 are supported from upper positions by engagement-portion holding projections 44 formed on the two sides of the rear portion of the cover plate 23, as shown in FIG. 9.

The disc pressing and supporting member 36 and the pair of the tray engagement members 37 are simply engaged to the joining portion 39 and the joining portions 42 to permit removal from the case body 22 when the cover plate 23 is removed from the case body 22.

The tray accommodating case 21 for the disc tray 1 having the above-mentioned structure has a tray accommodating space 45 formed on the case body 22 and between the pair of the right and left tray-insertion guide members 33 of the cover plate 23. The width $W_{11}$ of the tray accommodating space 45 in the horizontal direction in FIG. 8, the longitudinal length $L_{11}$ and the vertical depth $T_{11}$ are determined with respect to the width $W_1$, the length $L_1$ and the thickness $T_1$ of the disc tray 1 satisfy the relationships $W_{11} \geq W_1$, $L_{11} > L_1$ and $T_{11} \geq T_1$.

Moreover, the front end portion of the case body 22 having the tray inserting/removing opening 35 is allowed to forwards project over the front end of the cover plate 23. In addition, a finger holding portion 46 for holding the disc tray 1 when the disc tray 1 is loaded/unloaded to and from the tray accommodating case 21 is formed in the portion of the case body 22 forwards projecting over the front end of the cover plate 23. The finger holding portion 46 is formed into a semi-circular cut portion.

When the disc D is accommodated in the disc accommodating apparatus 501 having the disc tray 1 and the tray accommodating case 21 having the above-mentioned structures, the signal recording surface is caused to face the bottom portion 2a of the disc-receiving recess 2. Then, a portion of the outer portion Db of the disc D is diagonally inserted into a portion below the pair of the right and left engagement projections 5 adjacent to the front end of the disc tray 1 in a direction indicated by an arrow c shown in FIG. 5. Then, the outer portion Db of the disc D engaged to a portion above the pair of the right and left engagement projections 6 in the rear portion of the disc tray 1 is pressed against the engagement projections 6 in a direction indicated by an arrow d shown in FIGS. 5 and 7B. Thus, the engagement projections 6 are, as shown in FIGS. 7B and 7C, elastically deformed in a direction indicated by an arrow e shown in FIG. 7B. Thus, the outer portion Db of the cut lines 7 is pushed inwards to a position below the lower surface of each of the engagement projections 6 so as to be accommodated within the disc-receiving recess 2. After the disc D has been accommodated within the disc-receiving recess 2, the engagement projections 6 pressed by the disc D are released so that the engagement projections 6 are elastically restored in a direction indicated by an arrow f shown in FIG. 7C. As a result, a horizontal state is realized in which the engagement projections 6 is flush with the upper surface of the disc tray 1.

As described above, the disc D can be mounted on a portion within the disc-receiving recess 2 by using the elastic deformation of the engagement projections 6. Thus, the disc D can easily be inserted and mounted on the disc tray 1. Since the disc D can be placed within the disc-receiving recess 2 by simply pushing the two portions of the outer portion Db of the disc D from an upper position, the necessity of contact of the fingers with the signal recording surface can be eliminated. Thus, adhesion of fingerprints, contamination and the like with the signal recording surface can be prevented.

When the disc D mounted on the disc-receiving recess 2 is removed, the finger is inserted into the central hole Da of the disc D and another finger is used to press the outer portion Db of the disc D so as to raise the disc D in a direction indicated by an arrow g shown in FIG. 7C. The elastic deformation of the disc D and the elastic deformation of the engagement projections 6 in the direction indicated by the arrow f shown in FIG. 7C results in the engagement of the outer portion Db of the disc D to the engagement projections 6 being suspended. Thus, the disc D is permitted to be turned in the direction indicated by the arrow g shown in FIG. 7C at a position above the disc-receiving recess 2. As a result, the disc D can be removed in a direction indicated by an arrow h shown in FIG. 7C. Thus, the disc D is removed from the disc-receiving recess 2. Also when the operation for removing the disc D is performed, the fingers are not required to be brought into contact with the signal recording surface. Therefore, adhesion of fingerprints, contamination to the signal recording surface can be prevented.

As shown in FIG. 5, the disc D is mounted on the disc tray 1 in such a manner that the non-signal-recording region De in the periphery of the central hole Da is supported on the disc support portion 4. Therefore, a gap $G_1$ corresponding to the height of the disc support portion 4 is maintained between the signal recording region Dd of the signal recording surface and the bottom portion 2a of the disc-receiving recess 2. Also a gap $G_2$ having a size of about 0.8 mm is maintained between the outer portion Db of the disc D and a rising periphery 2b in the outer portion of the disc-receiving recess 2. Therefore, the disc D is mounted on the disc tray 1 in a state in which a predetermined gap is maintained in the disc-receiving recess 2 in a direction in parallel with the signal recording surface and in the direction of the thickness perpendicular to the signal recording surface. As a result, contact of the signal recording surface of the disc D with the bottom portion 2a can be prevented even if the disc D is moved in the disc-receiving recess 2 in the horizontal direction and/or the direction of the thickness of the disc D. As a result, the signal recording surface can reliably be protected from being damaged.

The disc D is engaged by the four engagement projections 5 and 6 and mounted on the disc-receiving recess 2 as described above. The engagement projections 5 and 6 overlap the outer portion Db of the disc D because of the difference ($A_2 - A_3$=about 2.4 mm) from the diameter $A_2$ of the disc D and the diameter $A_3$ of the inscribing circle connecting the leading ends of the four engagement projections 5 and 6. As a result, separation of the disc D from the disc-receiving recess 2 can be prevented by dint of the engagement projections 5 and 6. That is, even if the disc tray 1 is considerably inclined from the horizontal state or the disc tray 1 is vertically turned, separation of the disc D from the disc-receiving recess 2 can reliably be prevented.

Figure 15:
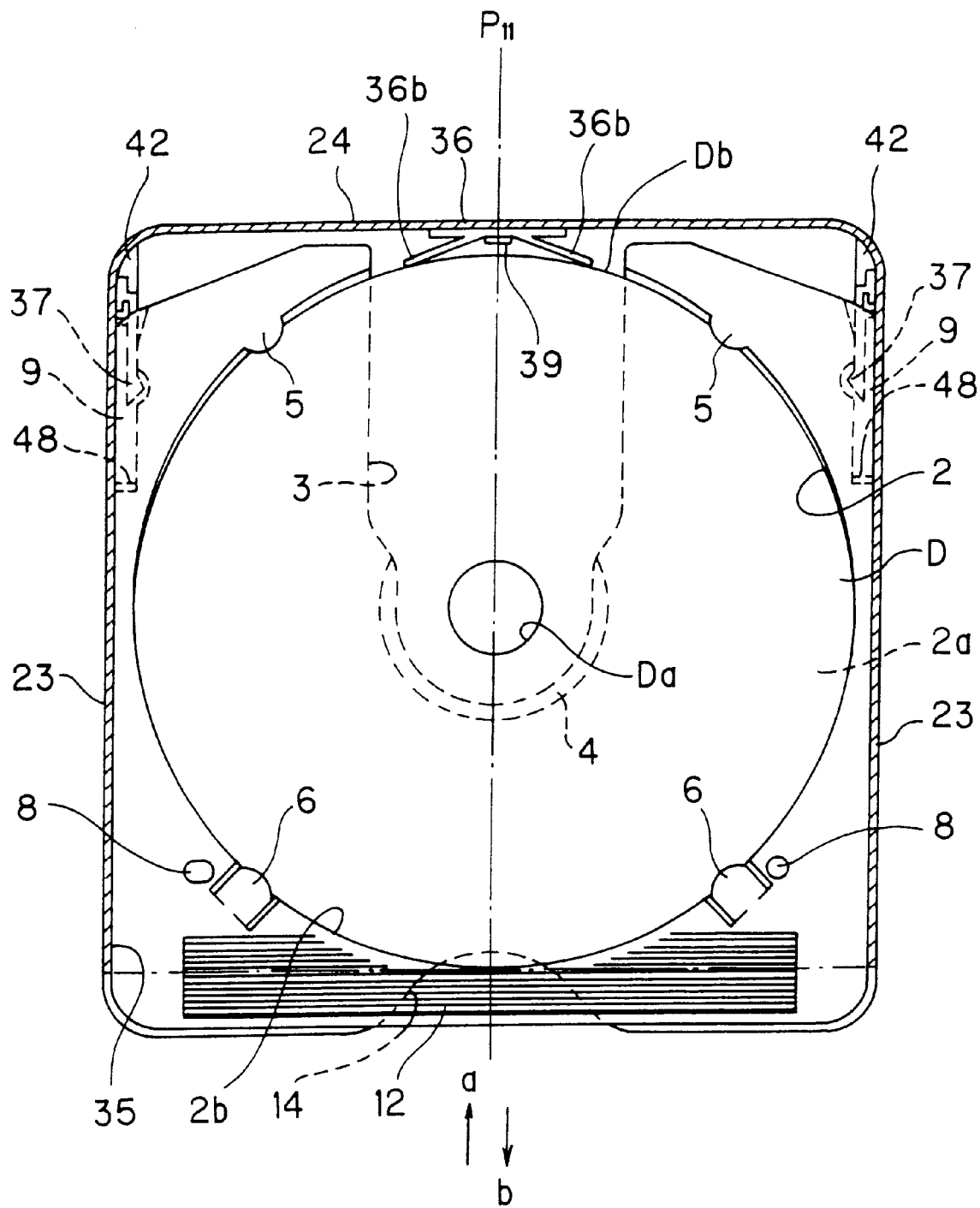
FIG. 15 is a partially-cut plan view showing the disc accommodating case in which the disc tray shown in FIG. 13 is accommodated.
Figure 16:
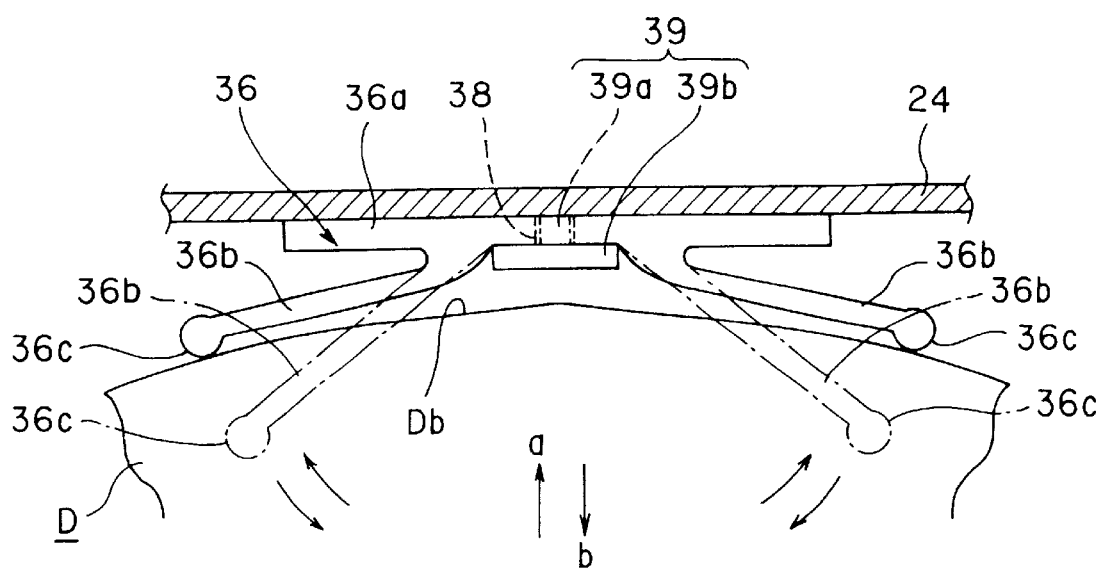
FIG. 16 is an enlarged and partially-cut plan view showing a portion of the disc which is pressed by the disc pressing member shown in FIG. 13.

Therefore, when the disc tray 1 on which the disc D has been mounted is inserted or removed to and from the tray accommodating case 21 through the tray inserting/removing opening 35 as shown in FIGS. 13 to 15, careless separation of the disc D from the disc tray 1 can be prevented. As a result, damage of the signal recording surface and adhesion of contamination to the signal recording surface can be prevented. As a result, the disc D can reliably be protected.

Figure 17:
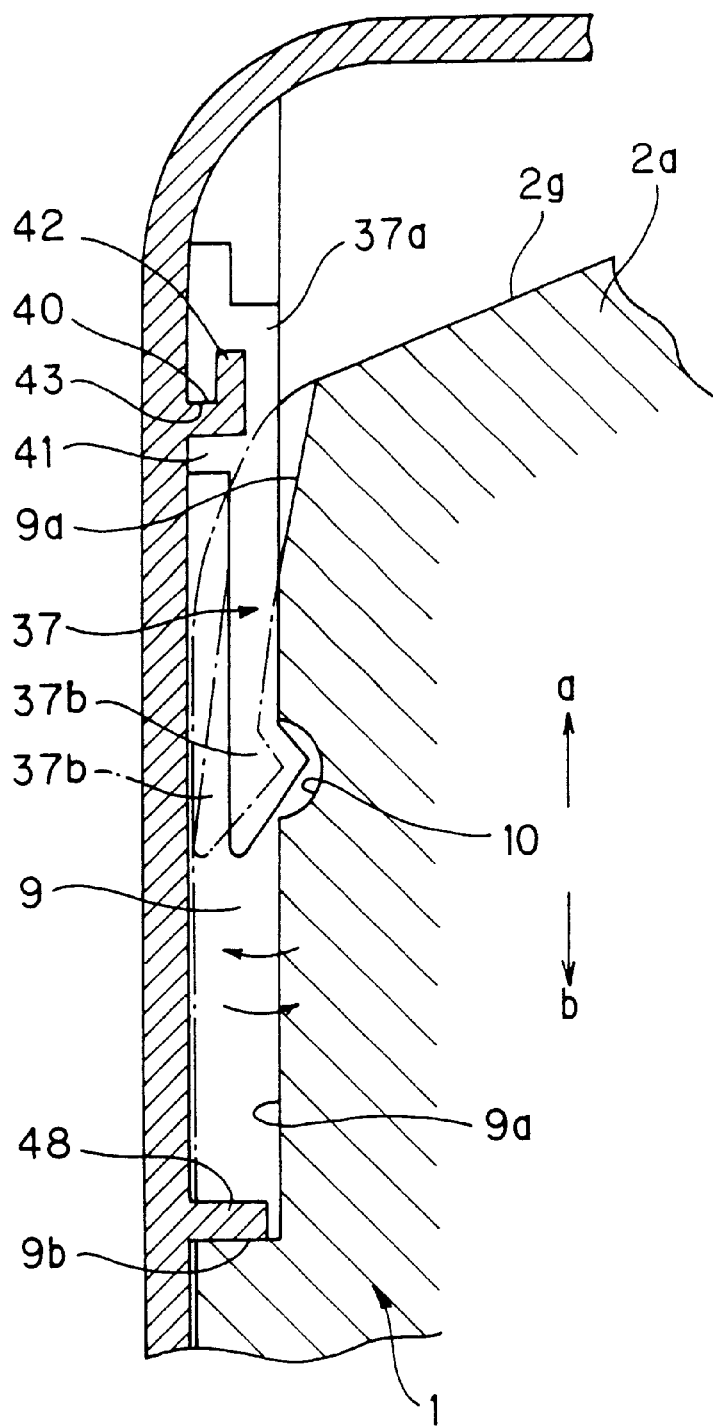
FIG. 17 is an enlarged and partially-cut plan view showing a portion of the disc tray engaged by the tray engagement member shown in FIG. 13.

When the disc tray 1 is accommodated in the tray accommodating case 21, substantially the central portion of the grip 12 adjacent to the rear portion of the disc tray 1 is held by the fingers from upper and lower positions to insert the front portion of the disc tray 1 into the tray inserting/removing opening 35 of the tray accommodating case 21 in the direction indicated by the arrow a shown in FIG. 13. As a result, the disc tray 1 is guided by the tray-insertion guide members 33 and horizontally inserted into the tray accommodating space 45. Thus, the tray engagement members 37 and tray engagement members 48 are introduced into the pair of the right and left cut recesses 9 of the disc tray 1, as shown in FIGS. 15 and 17. When the disc tray 1 has been inserted into the case body 22, the engagement claw 37b of each of the pair of the right and left tray engagement members 37 is pressed by the inclined surface 9a of each of the cut recesses 9 of the disc tray 1. As a result, the elastically displacement portion 37a is engaged to the engagement recess 10 formed on the bottom surface of the cut recesses 9 while the elastically displacement portion 37a is elastically displaced. At this time, the pair of the right and left tray engagement members 48 are brought into contact with the rising surfaces 9b of the pair of the right and left cut recesses 9. Thus, the position of insertion of the disc tray 1 into the tray accommodating case 21 is determined.

Immediately before the disc tray 1 inserted into the tray accommodating case 21 in a direction indicated by an arrow a shown in FIG. 15 is engaged by the pair of the right and left tray engagement members 37, the disc pressing and supporting member 36 disposed in the central portion of the tray accommodating case 21 adjacent to the rear portion is introduced into the bottom opening 3 in a direction indicated by an arrow b shown in FIG. 15 through the opened portion formed in the insertion portion.

When the disc pressing and supporting member 36 has been inserted into the bottom opening 3, the pair of the right and left disc pressing and supporting members 36b are pressed by the disc D at the two outer portions of the disc D held in the disc tray 1 in the direction indicated by the arrow a shown in FIG. 15. Thus, the disc pressing and supporting members 36b are elastically deformed in the direction indicated by the arrow a from an initial position indicated by an alternate long and short dash line shown in FIG. 16 to a deformation position indicated by a solid line shown in FIG. 16. Thus, the disc pressing and supporting members 36b presses the disc D in a direction indicated by an arrow b shown in FIG. 16 by dint of the elastic restoring force in the direction indicated by the arrow b shown in FIG. 16. The disc D held on the disc tray 1 pressed by the pair of the disc pressing and supporting members 36b is pressed and urged in the direction indicated by the arrow b shown in FIG. 15. Thus, the disc D can be mounted in the disc-receiving recess 2 without a rattle in a state in which the disc D is pressed against the rising periphery 2b of the disc-receiving recess 2.

As described above, the free movement of the disc D within the disc-receiving recess 2 is restrained and held in the disc-receiving recess 2. Thus, the position at the disc tray 1 into which the disc D has been loaded is accommodated in the tray accommodating case 21 is restrained. Therefore, damage of the signal recording surface and the like of the disc D can reliably be prevented attributable to movement of the disc D when the tray accommodating case 21 is carried or preserved. As a result, the disc D can reliably be protected.

When the disc tray 1 is removed from the tray accommodating case 21, the fingers are inserted to the finger holding portion 46 of the tray accommodating case 21 shown in FIG. 13 so that the central portion of the grip 12 of the disc tray 1 is held. Then, the disc tray 1 is pulled out from the tray accommodating case 21 in a direction indicated by an arrow b shown in FIG. 13. As a result of the foregoing simple operation, the disc tray 1 can easily be separated from the pair of the right and left tray engagement members 37. Therefore, also the disc tray 1 can easily be removed.

The inserting/removing finger holding portion 46 is formed in substantially the central portion of the front surface of the tray accommodating case 21 in which the tray inserting/removing opening 35 is formed. Therefore, the disc tray 1 can easily be inserted into the position at which the disc tray 1 is accommodated in the tray accommodating case 21 by, as it is, introducing the fingers holding the substantially the central portion of the grip 12 of the disc tray 1 into the finger holding portion 46.

When the disc tray 1 is unloaded from the tray accommodating case 21, the fingers are introduced into the finger holding portion 46. Thus, the grip 12 can reliably be held, and then the disc tray 1 can be pulled out. As a result, the operation for removing the disc tray 1 can easily be performed.

The inclined surface 9a is formed in the leading end portion of each of the pair of the right and left cut recesses 9 of the disc tray 1 as shown in FIG. 1. Moreover, the tapered surfaces in the forward and rearward directions are formed at the leading ends of the engagement claws 37b of the pair of the right and left tray engagement members 37. Therefore, when the operation for inserting the disc tray 1 into the tray accommodating case 21 in the direction indicated by the arrow a shown in FIG. 15 or the operation for unloading the disc tray 1 accommodated in the tray accommodating case 21 in s direction indicated by an arrow b shown in FIG. 15b is performed, the engagement claws 37b can smoothly be engaged and separated to and from the cut recesses 9 and the engagement recess 10. Thus, the operation for mounting/removing the disc tray 1 can smoothly be performed. Since the pair of the right and left tray engagement members 37 can be engaged and separated to and from the engagement recess 10 in the pair of the right and left cut recesses 9 of the disc tray 1, the pair of the right and left tray engagement members 37 can completely be accommodated in the right and left sides 21d of the tray accommodating case 21. As a result, a satisfactory dustproof characteristic can be obtained.

A second embodiment of a disc tray and a disc accommodating apparatus according to the present invention will now be described with reference to FIG. 18.

The disc tray 1 has a pair of right and left symmetrical disc pressing portions 17 which can elastically displace and which are formed integrally with the central portion of the rear portion of the disc tray 1, the disc pressing portions 17 being disposed on the outside of the disc-receiving recess 2. The first disc pressing and supporting member 36 disposed in the tray accommodating case 21 is made of an elastic material, such as sponge or rubber.

Figure 18:
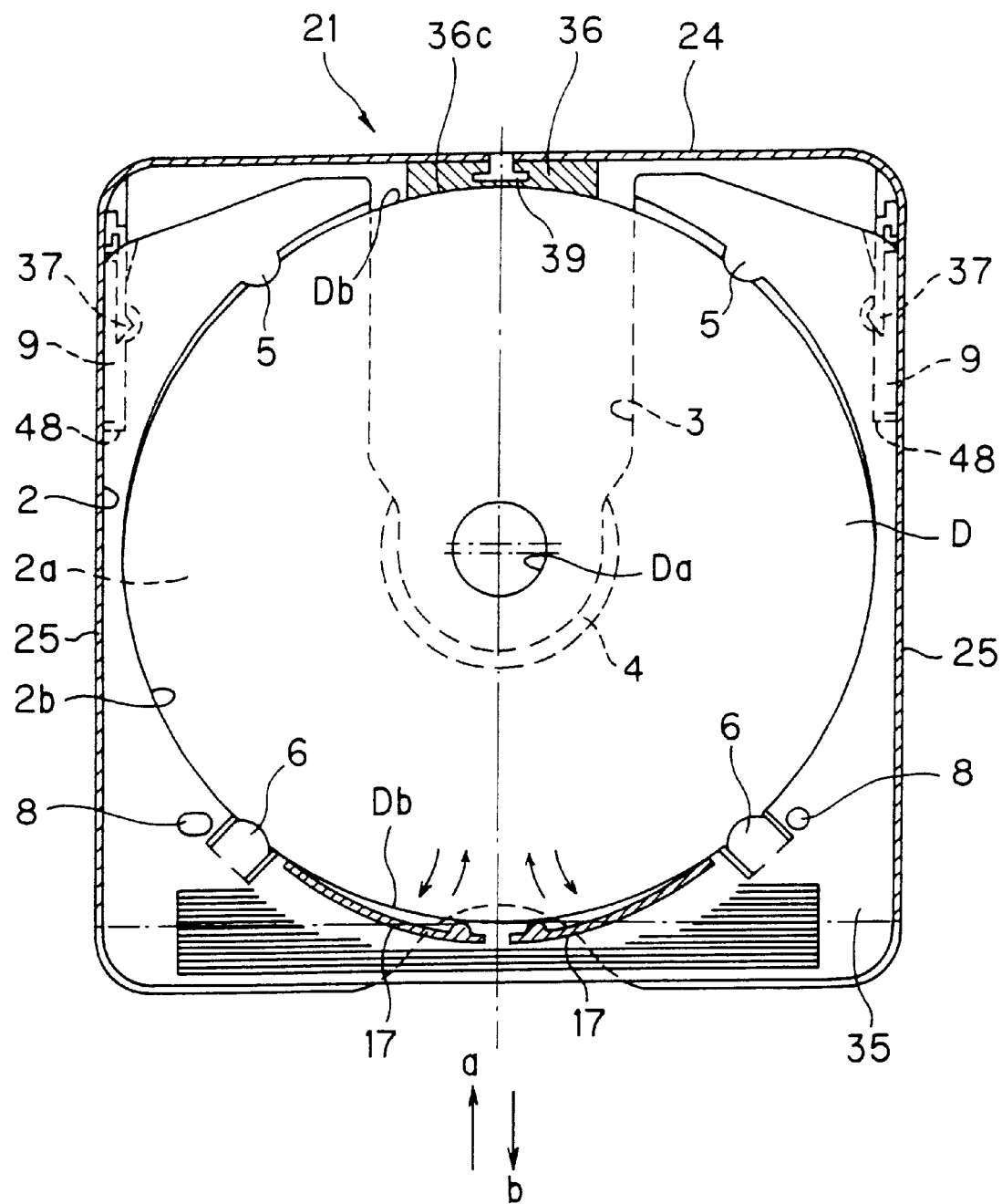
FIG. 18 is a partially-cut plan view showing a second embodiment of a disc tray and a tray accommodating case according to the present invention.

When the disc tray 1 is accommodated in the tray accommodating case 21 through the tray inserting/removing opening 35 after the disc D has been placed on the disc-receiving recess 2, the outer portion Db of the disc D is brought into contact with the first disc pressing and supporting member 36 from a direction indicated by an arrow a shown in FIG. 18. Thus, the disc D is urged by the first disc pressing and supporting member 36 so that the disc D is pressed in a direction indicated by an arrow b shown in FIG. 18. Then, the disc D is supported by a pair of second disc pressing portions 17 disposed opposite to the first disc pressing and supporting member 36. At this time, the pair of the second disc pressing portions 17 are elastically displaced in the direction indicated by the arrow b shown in FIG. 18 so as to press the outer portion Db of the disc D against the first disc pressing and supporting member 36 by dint of the urging force in the direction indicated by the arrow a shown in FIG. 18. Since the disc D is elastically held by the first disc pressing and supporting member 36 and the pair of the second disc pressing portions 17, free movement of the disc D placed on the disc-receiving recess 2 is restrained.

If the second disc pressing portions 17 can elastically be displaced, the first disc pressing and supporting member 36 may be made of a non-elastic material.

A third embodiment of a disc tray and a disc accommodating apparatus according to the present invention will now be described with reference to FIG. 19.

The disc tray 1 has disc engagement members 18 for preventing separation of the disc D placed on the disc-receiving recess 2, the disc engagement members 18 being made of rubber or soft synthetic resin which can elastically be deformed. Each disc engagement member 18 is formed into a disc-like shape and provided with a support pin 18a disposed at a position deviated from the center of rotation. The disc engagement member 18 is rotatively joined to the disc tray 1 through the support pin 18a.

Figure 19:
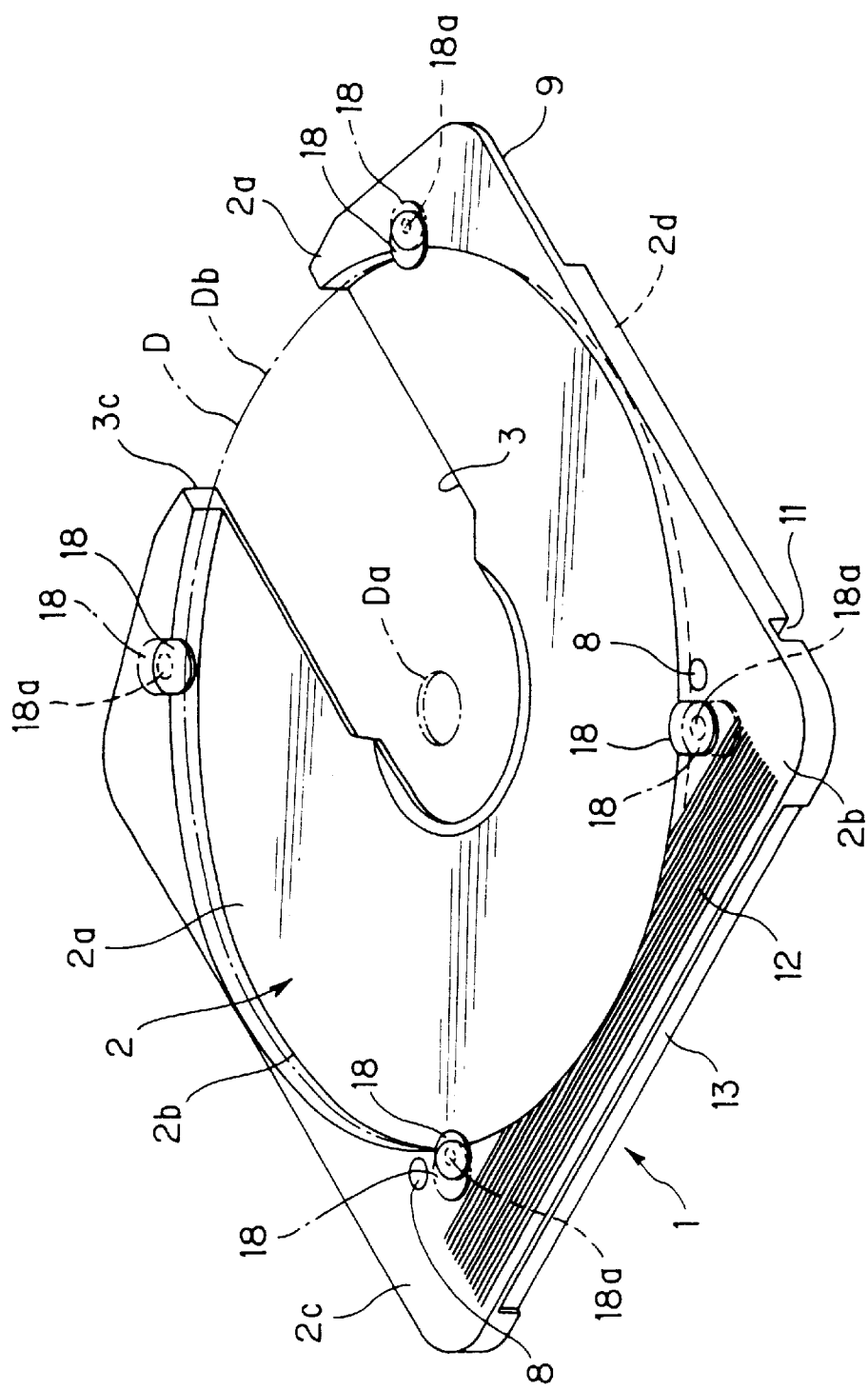
FIG. 19 is a perspective view showing a third embodiment of a disc tray according to the present invention.

Note that four disc engagement member 18 are disposed as shown in FIG. 19 on the outside of the disc-receiving recess 2.

As indicated by alternate long and short dash lines shown in FIG. 19, each disc engagement member 18 is rotated about the support pin 18a toward the outside portion of the disc-receiving recess 2 in such a manner as to open the disc-receiving recess 2. Thus, the disc D can smoothly be mounted. After the disc D has been mounted on the disc-receiving recess 2, the disc engagement members 18 are rotated about the support pins 18a to the positions projecting into the disc-receiving recess 2 so as to support the disc D in order to prevent separation of the disc D from the disc-receiving recess 2.

A locating means which is engaged to the disc engagement members 18 with moderation touch when the disc engagement members 18 is rotated to the position projecting into the disc-receiving recess 2 as indicated by the solid line shown in FIG. 19 is provided for the disc tray 1. Thus, the disc engagement members 18 can be rotated with the moderation touch so as to be reliably located at the position at which the separation of the disc D can be prevented.

A disc drive apparatus 51 into which a disc, such as an optical disc or a magneto-optical disc, is loaded by the disc tray 1 according to any one of the first, second and third embodiments will now be described.

Figure 20:
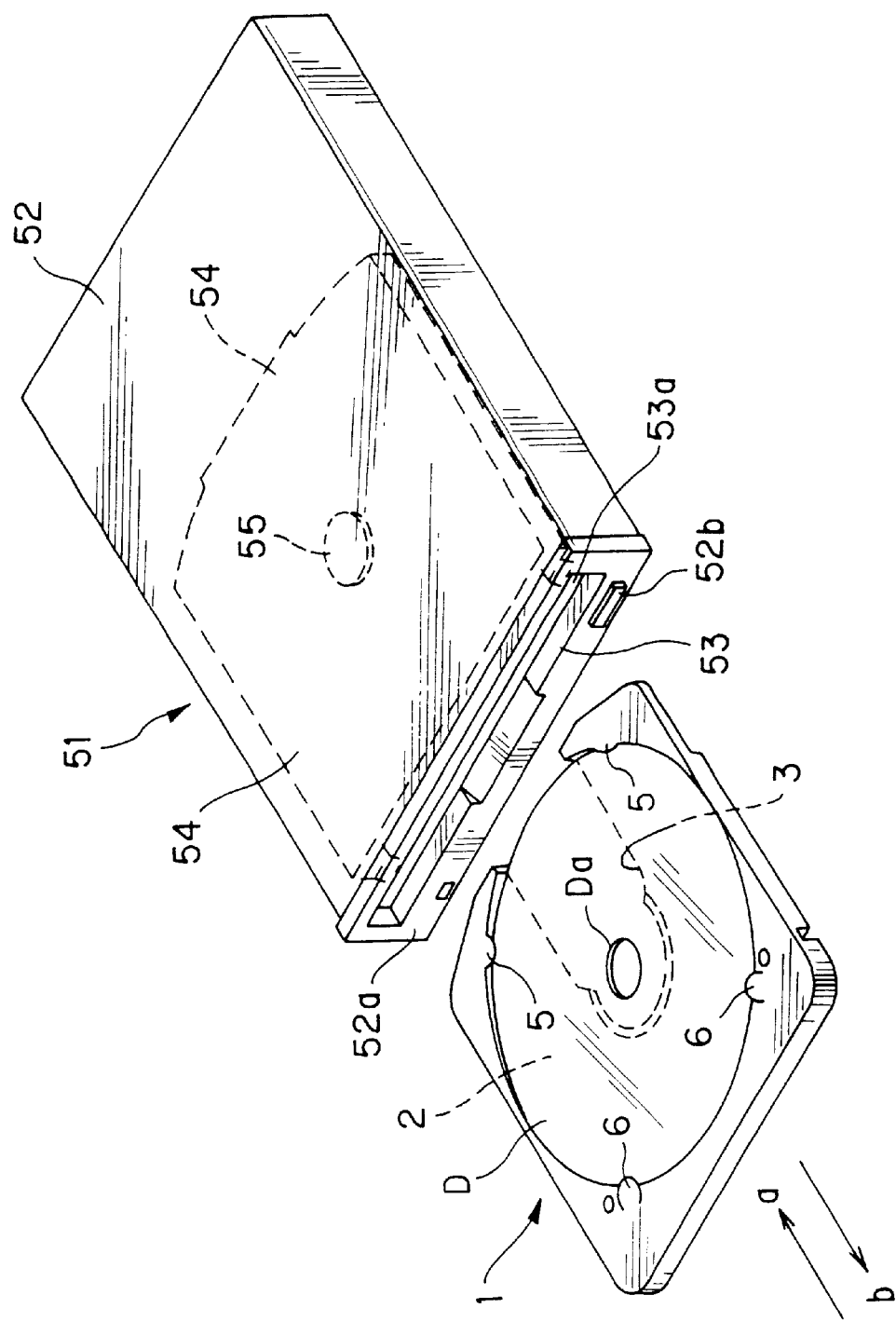
FIG. 20 is a perspective view showing a disc drive apparatus adaptable to the disc trays according to any one of the first, second and third embodiments.

As shown in FIG. 20, the disc drive apparatus 51 has a front panel 52a, which is disposed on the front surface of a apparatus body 52 and which is provided with a tray loading/unloading opening 53 formed into a horizontally elongated opening. The tray loading/unloading opening 53 is closed by an opening/closing cover 53a rotatively supported in the apparatus body 52. When the opening/closing cover 53a is rotated toward the inside portion of the apparatus body 52, the opening/closing cover 53a opens the tray loading/unloading opening 53.

Figure 21:
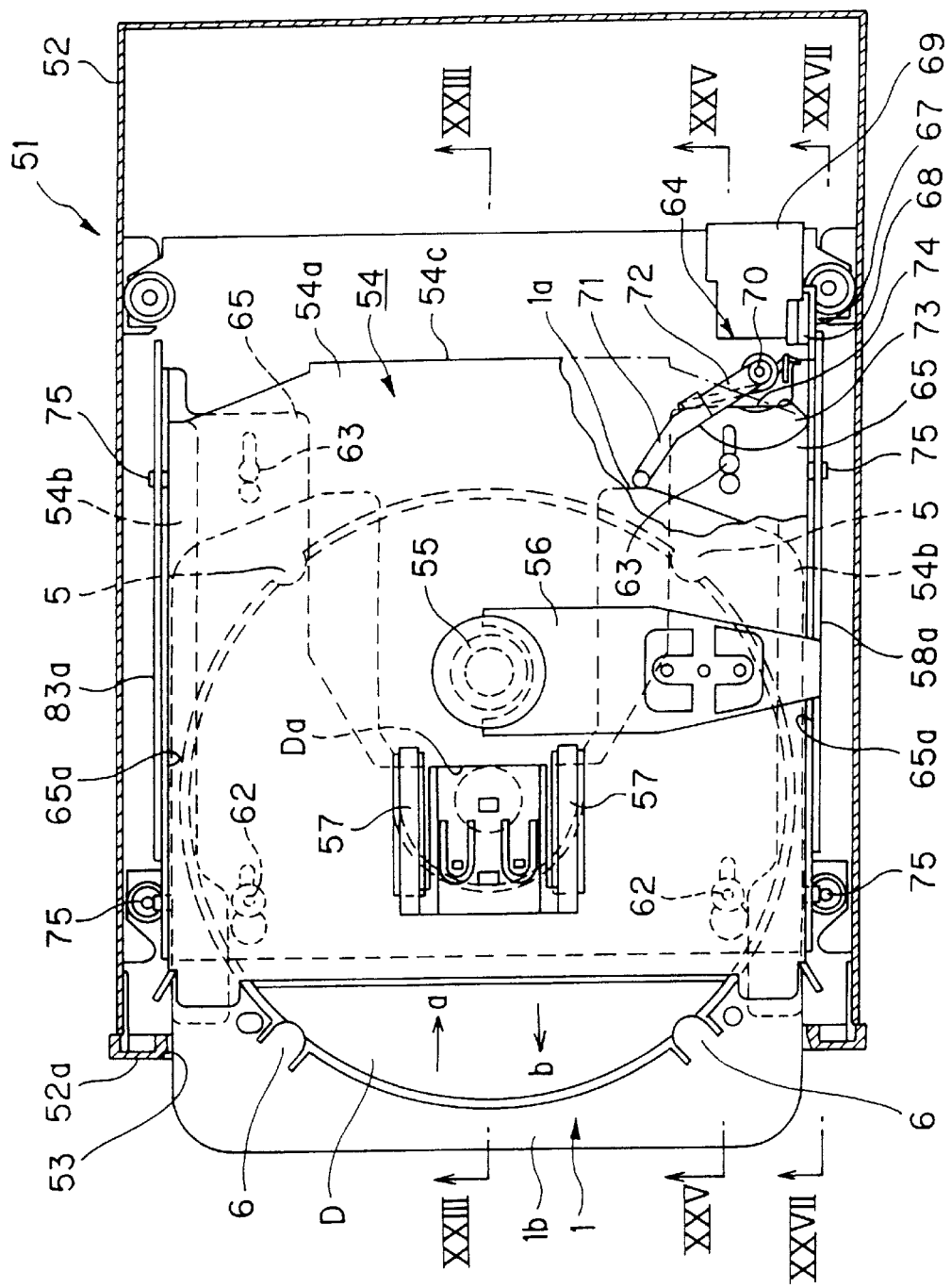
FIG. 21 is a partially-cut plan view showing a state in which the operation for loading the disc into the disc drive apparatus shown in FIG. 20 has been started and a state in which the disc is removed.
Figure 23:
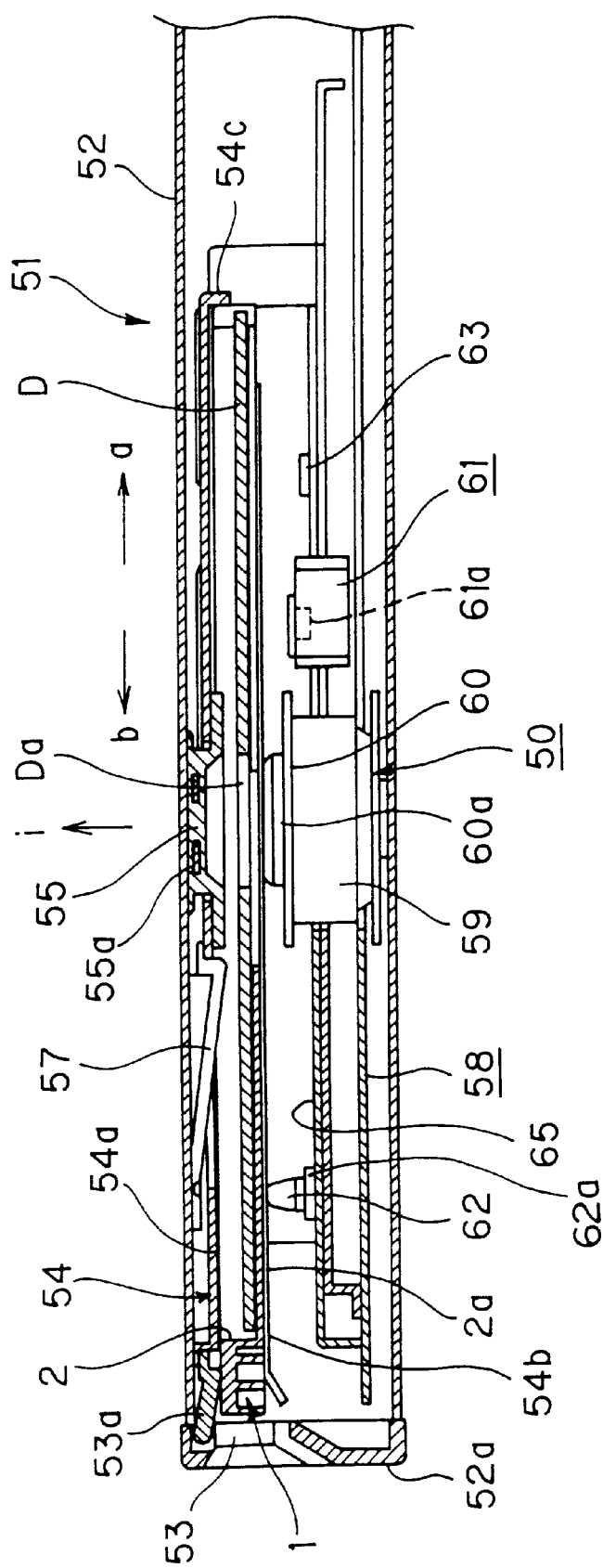
FIG. 23 is a cross sectional view showing the disc drive apparatus shown in FIG. 21 and taken along line XXIII—XXIII.

The apparatus body 52 includes a tray holder 54 disposed horizontally at a position opposite to the tray loading/unloading opening 53. The tray holder 54 is manufactured by press-working a thin metal plate or the like. The tray holder 54 has opposite tray holding portions 54b formed downwards from two side portions of a ceiling-plate portion 54a, as shown in FIGS. 21 and 23. Each of the tray holding portions 54b has an L-shape cross sectional shape having a portion bent formed in parallel with the ceiling-plate portion 54a. A tray engagement member 54c bent downwards as shown in FIG. 23 is provided for the rear portion of the ceiling-plate portion 54a on the inside of the apparatus body 52. Moreover, a disc-shape disc damper 55 is disposed in the central portion of the ceiling-plate portion 54a, as shown in FIG. 21. The disc damper 55 is rotatively supported at the leading end of a damper support member 56 extending in a direction in which the disc tray 1 is loaded/unloaded and provided for the ceiling-plate portion 54a. Moreover, a tray guide member 57 for guiding the operation for loading/unloading the disc tray 1 to and from the tray holder 54 is joined to a portion of the ceiling-plate portion 54a adjacent to the tray loading/unloading opening 53.

As shown in FIG. 23, a base 58 manufactured by press-working a metal plate is disposed at a lower position in the apparatus body 52 opposite to the tray holder 54. A spindle motor 59 which constitutes a disc-rotation drive mechanism 50 is disposed in a portion of the base 58 opposite to the disc damper 55 provided for the tray holder 54. The spindle motor 59 is joined to the base 58 in such a manner that the spindle shaft of the spindle motor 59 projects toward the disc damper 55. A disc table 60 arranged to integrally rotate with the spindle shaft is joined to the leading end of the spindle shaft.

An optical pickup 61 is disposed on the inside portion of the base 58. The optical pickup 61 is supported in such a manner as to move in the radial direction of the disc D placed on the disc table 60 through a guide mechanism joined to the base 58. Moreover, a forward-moving mechanism having a forward-moving motor forwards moves the optical pickup 61 in a radial direction of the disc D.

The optical pickup 61 has an objective lens 61a disposed opposite to the disc D placed on the disc table 60 so that light beams emitted from a light source are converged by the objective lens 61a to irradiate the signal recording surface of the disc D with the light beams.

Figure 22:
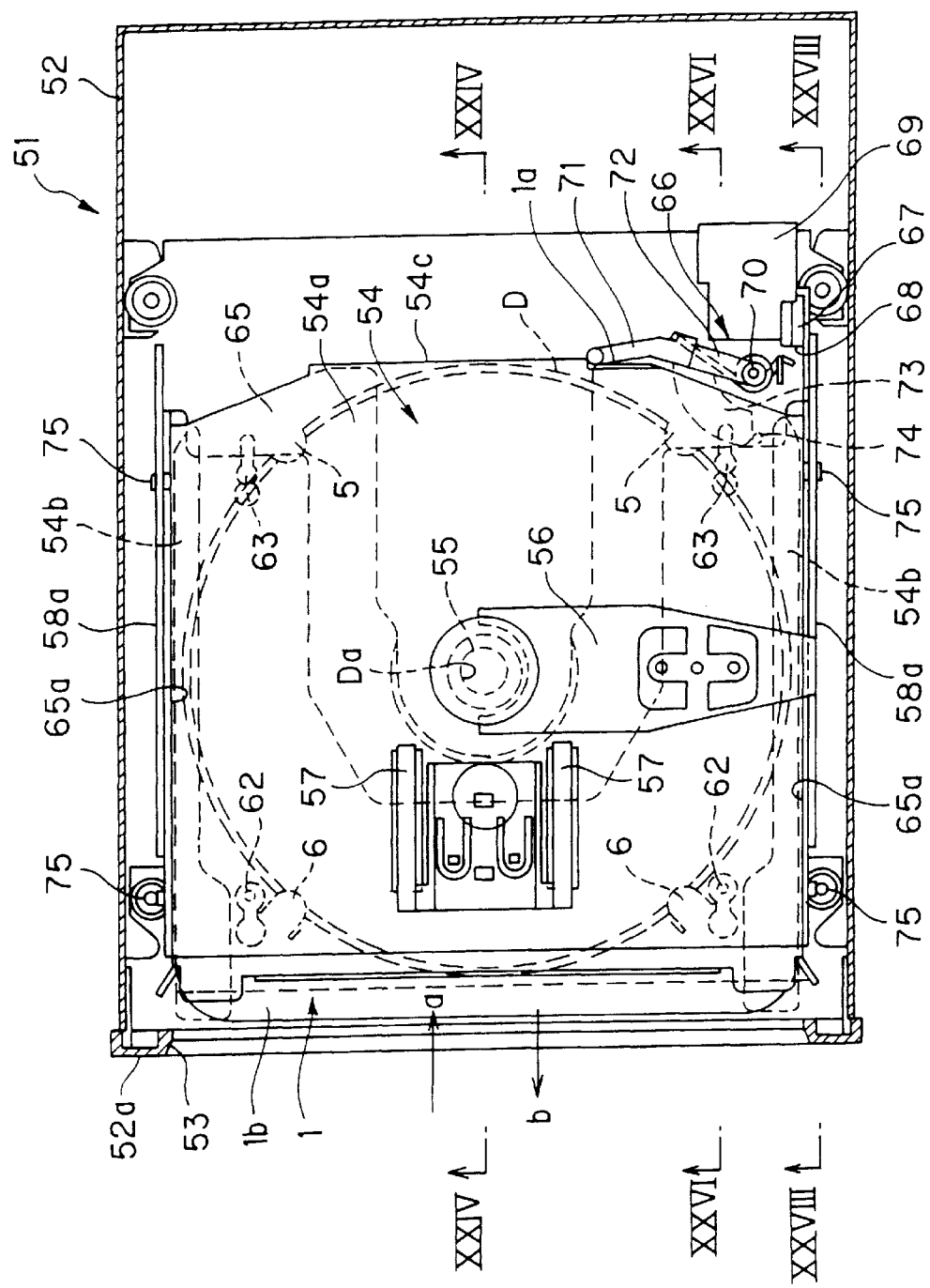
FIG. 22 is a partially-cut plan view showing a state in which the operation for loading the disc into the disc drive apparatus shown in FIG. 20 has been completed.

Moreover, a tray receiving portion is formed on the upper surface of the base 58 opposite to the tray holder 54, as shown in FIGS. 22 and 23. The tray receiving portion has a pair of right and left locating pins 62 for locating the disc tray 1 and a pair of right and left height-restraining pins 63 for restraining the height of the disc tray 1. The locating pins 62 are provided for the base 58 to stand erect at positions adjacent to the tray loading/unloading opening 53. The height-restraining pins 63 are provided for the base 58 at positions on the inside of the apparatus body 52. Each of the reference pins 62 having a conical top end has a lower end provided with a height-restraining stepped portion 62a for restraining the height of the disc tray 1.

Figure 27:
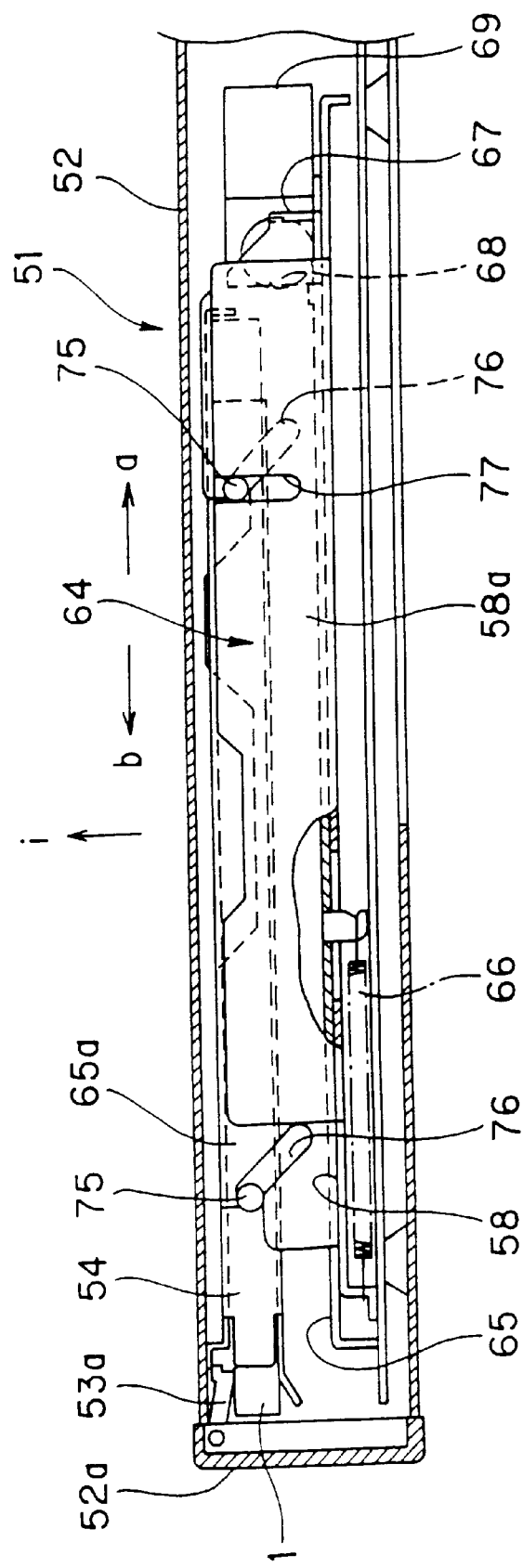
FIG. 27 is a cross sectional view showing the disc drive apparatus shown in FIG. 21 and taken along line XXVII—XXVII.
Figure 28:
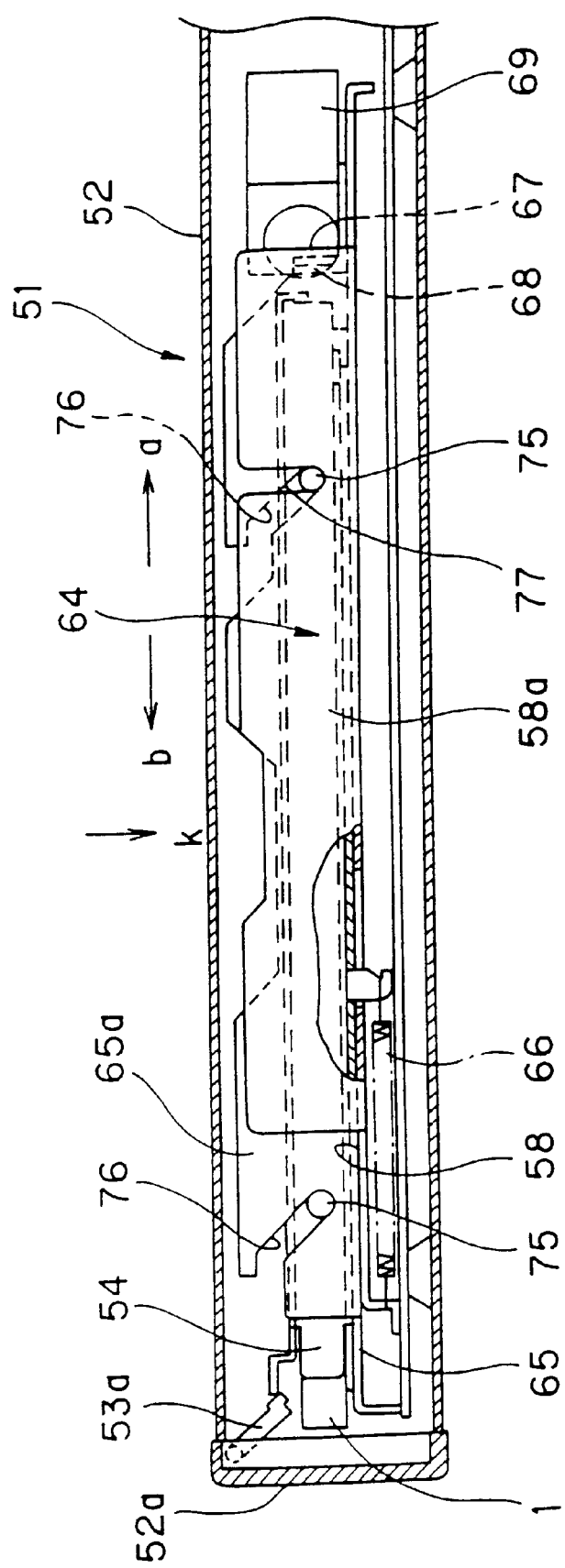
FIG. 28 is a cross sectional view showing the disc drive apparatus shown in FIG. 22 and taken along line XXVIII—XXVIII.

A holder elevation mechanism 64 is joined to the upper surface of the base 58, the holder elevation mechanism 64 being arranged to elevate/lower the tray holder 54 in directions indicated by arrows i and k shown in FIGS. 27 and 28 which are a vertical direction with respect to the base 58. The holder elevation mechanism 64 comprises a slide plate 65 manufactured by press-working a metal plate, horizontally disposed on the base 58 and guided by the base portions of four reference pins 62 and height-restraining pins 63 so as to be slid in directions indicated by arrows a and b shown in FIGS. 27 and 28. Moreover, a pair of right and left tension springs 66 are provided which are means for sliding the slide plate 65 in the direction indicated by the arrow b. An eject motor 69 is provided which is, through an eccentric cam 68, engaged to an eject-motor engagement portion 67 rearward extending from a side portion of the slide plate 65. The eject motor 69 is mounted on a side portion of a rear portion on the base 58 so as to slide the slide plate 65 in a direction indicated by an arrow a shown in FIGS. 27 and 28 against the pair of the right and left tension springs 66. A trigger arm 71 is provided which is rotatively joined to a side portion in the rear portion on the base 58 through a support-point pin 70 in such a manner as to be capable of rotating in the directions indicated by the arrows a and b shown in FIG. 21. A trigger-arm spring 72 is provided which is a means for rotating the trigger arm 71 in the direction indicated by the arrow b shown in FIG. 21. A locking member 73 is provided which has a circular-arc shape formed integrally with the base portion of the trigger-arm spring 72. A locking pin 74 is provided which is joined to a side portion of the rear portion of the slide plate 65 and which is locked/unlocked by the locking member 73. Four guide pins 75 are provided which are horizontally secured to the right and left side of the pair of the right and left tray holding portions 54b of the tray holder 54 at positions adjacent to the front and rear ends. Four inclined guide grooves 76 are provided which are formed adjacent to front and rear ends of right and left side plates 65a formed by upwardly perpendicularly bending the slide plate 65 shown in FIGS. 27 and 28 so as to be in parallel with the direction in which the disc tray is inserted. The inclined guide grooves 76 are vertically inclined grooves for elevating the four guide pins 75. Moreover, vertical guide grooves 77 are provided which are formed adjacent to the rear ends of the right and left side plates 58a formed in parallel with the direction in which the disc tray is inserted. The vertical guide grooves 77 vertically guide the pair of the right and left guide pins 75 at the positions adjacent to the rear end of the tray holder 54.

In an initial state of the disc drive apparatus 51 having the above-mentioned structure in which insertion of the disc tray 1 is permitted, the slide plate 65 is slid in the direction indicated by the arrow a shown in FIG. 21 against the tension springs 66 so that the slide plate 65 is locked by the trigger arm 71. As a result, the tray holder 54 is moved upwards in parallel with s direction indicated by an arrow i shown in FIG. 23 to an uppermost position which is the same height as that of the tray loading/unloading opening 53. As described above, the disc tray 1 is pulled out of the inside portion of the tray accommodating case 21, and then the disc D is placed within the disc-receiving recess 2 of the disc tray 1. Then, the disc tray 1 in the foregoing state is horizontally inserted into the tray loading/unloading opening 53 of the disc drive apparatus 51 from the direction indicated by the arrow a shown in FIG. 20 in such a manner that the front end 1a of the disc tray 1 is first inserted and the opening/closing cover 53a is opened inwards.

The structure for preventing separation of the disc D placed within the disc-receiving recess 2 of the disc tray 1 by dint of the four engagement projections 5 and 6 is employed as described above. Therefore, the disc D can safely and smoothly be inserted into the disc drive apparatus 51 even if the disc drive apparatus 51 is a stand-up disc drive apparatus 51 arranged to be used in such a manner that the disc drive apparatus 51 is perpendicularly stood up without careless separation of the disc D. At this time, the tray guide member 57 guides the disc D in order to prevent collision of the disc D with the disc clamper 55.

Figure 25:
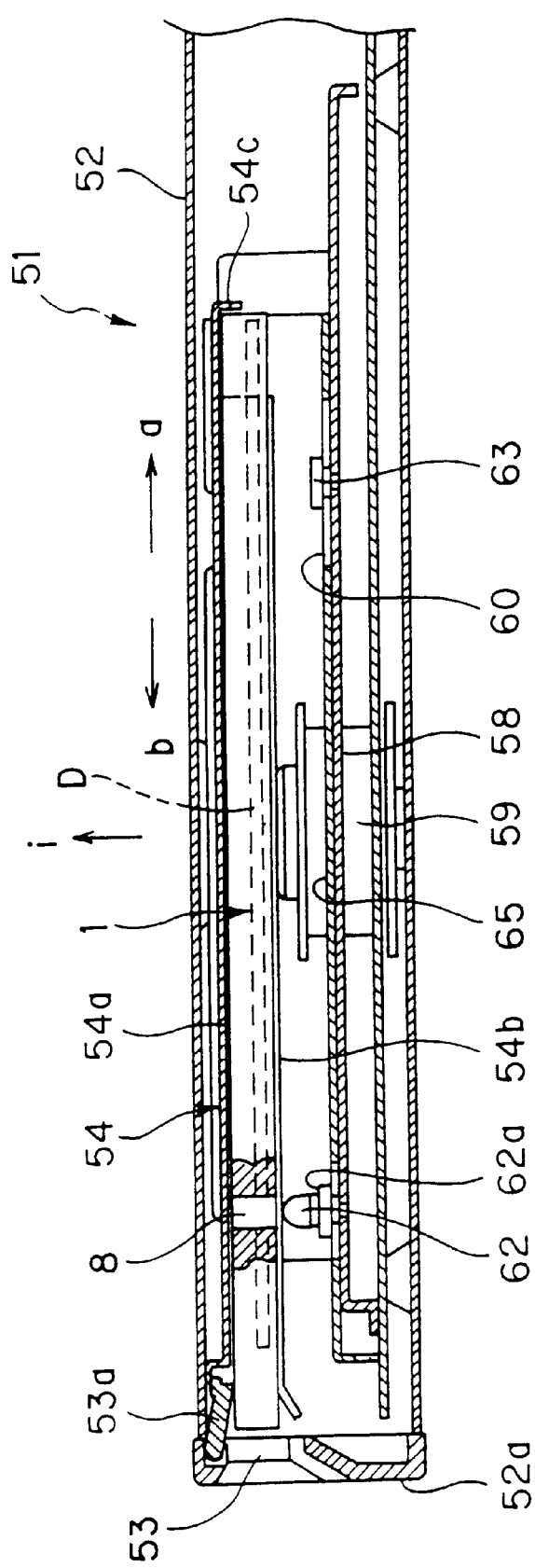
FIG. 25 is a cross sectional view showing the disc drive apparatus shown in FIG. 21 and taken along line XXV—XXV.

As shown in FIGS. 21, 23 and 25, the disc tray 1 horizontally inserted into the apparatus body 52 through the tray loading/unloading opening 53 in the direction indicated by the arrow a shown in FIGS. 21, 23 and 25 is as it is horizontally inserted between the pair of the right and left tray holding portions 54bbelow the ceiling-plate portion 54a in the tray holder 54 in the direction indicated by the arrow a shown in FIGS. 21, 23 and 25. Immediately before the overall surface of the inserted side of the disc tray 1 is brought into contact with the tray engagement member 54c, the side surface of the overall surface of the disc tray 1 is brought into contact with the trigger arm 71. The trigger arm 71 is rotated in the direction indicated by the arrow a shown in FIG. 21 against the trigger-arm spring 72.

Thus, as shown in FIG. 22, the locking member 73 of the trigger arm 71 is separated from the locking pin 74 of the slide plate 65 into a sideward direction. Thus, the locked slide plate 65 is suspended. At the foregoing moment, the slide plate 65 is slid by the pair of the right and left tension springs 66 from a position shown in FIG. 21 to a position shown in FIG. 22 in the direction indicated by the arrow a shown in FIGS. 21 and 22.

As a result, as shown in FIG. 28, while the pair of the right and left guide pins 75 adjacent to the rear end of the tray holder 54 are vertically guided by the pair of the right and left vertical guide grooves 77, the four inclined guide grooves 76 of the slide plate 65 are displaced in the direction indicated by the arrow b shown in FIG. 28 with respect to the four guide pins 75 of the tray holder 54. As a result, the guide pins 75 are simultaneously moved downwards in a direction indicated by an arrow k shown in FIG. 28 by the inclined guide grooves 76. As a result, the disc tray 1 is, together with the tray holder 54, moved downwards in parallel with the direction indicated by the arrow k from the uppermost position shown in FIGS. 23 and 25 to the lowermost position shown in FIGS. 24 and 26.

Figure 24:
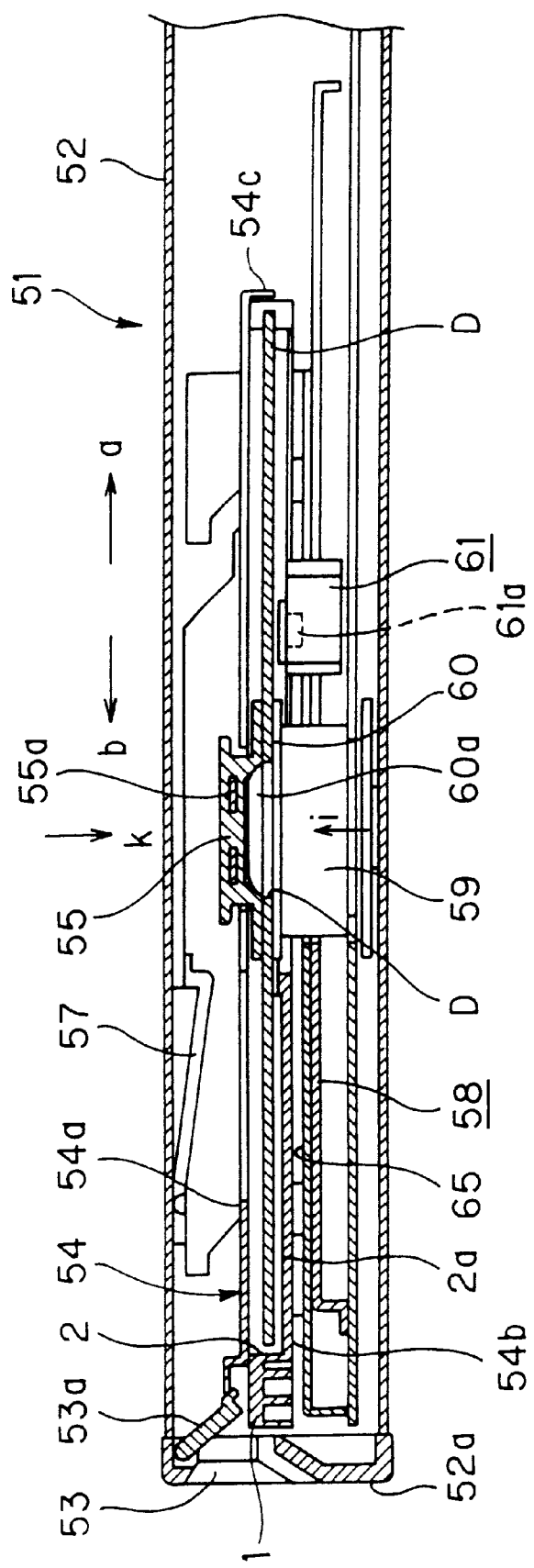
FIG. 24 is a cross sectional view showing the disc drive apparatus shown in FIG. 22 and taken along line XXIV—XXIV.
Figure 26:
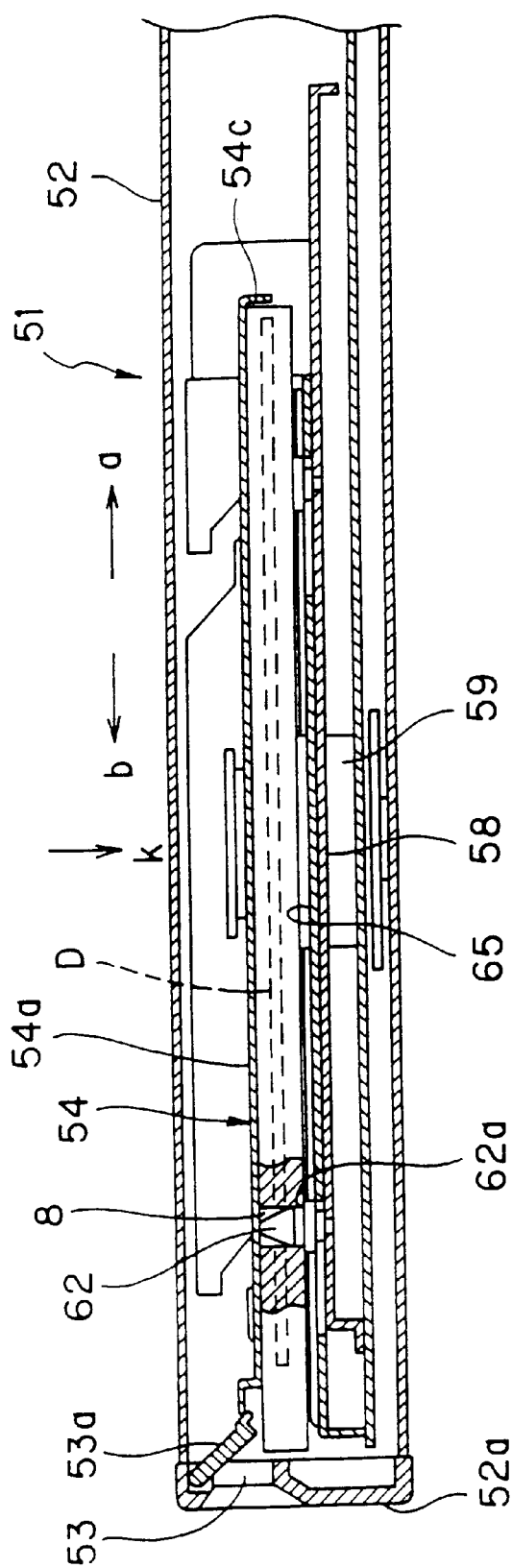
FIG. 26 is a cross sectional view showing the disc drive apparatus shown in FIG. 22 and taken along line XXVI—XXVI.

As a result, the pair of the right and left reference holes 8 of the disc tray 1 are, from an upper position, joined to the pair of the right and left reference pins 62 on the base 58, as shown in FIG. 26. Moreover, the four portions on the bottom surface 1d of the disc tray 1 are horizontally placed on the height-restraining stepped portions 62a of the pair of the right and left reference pins 62 and on the pair of the right and left height-restraining pins 63. Thus, the disc tray 1 can accurately be located on the base 58. Substantially simultaneously with this, the disc table 60 is, as shown in FIG. 24, relatively inserted from a lower position into the semi-circular hole 3a of the bottom opening 3 of the disc tray 1 in a direction indicated by the arrow i shown in FIG. 24. As a result, a centering portion 60a formed in the central portion of the upper surface of the disc table 60 is received in the central hole Da of the disc D from a lower position. Moreover, the disc D is, by the disc table 60, relatively moved upwards to an intermediate position between the bottom portion 2a in the disc-receiving recess 2 of the disc tray 1 and the four clamper support member 56 in the direction indicated by the arrow i shown in FIGS. 23 and 25.

At this time, magnetic attracting force of a damper magnet 55a horizontally embedded in the central portion of the upper portion of the disc damper 55 acts on the disc table 60 made of a magnetic material. The magnetic attracting force causes the disc damper 55 to downwards press the outer portion of the central hole Da of the disc D. As a result, the central hole Da of the disc D is accurately received by the outer portion of the centering portion 60a. Simultaneously, the disc clamper 55 horizontally chucks the disc D on the disc table 60. At this time, the objective lens 61a of the optical pickup 61 is, as shown in FIG. 24, relatively inserted into the rectangular hole 3b of the bottom opening 3 of the disc tray 1 from a lower position so that the objective lens 61a is moved toward the signal recording surface of the disc D.

As a result of the above-mentioned operation, the disc D held on the disc tray 1 is loaded into the disc drive apparatus 51. When a command signal for performing a recording and/or reproducing operation has been supplied from a host computer which is an information processing apparatus to which the disc drive apparatus is connected, the spindle motor 59 of the disc-rotation drive mechanism 50 is rotated. As a result, the disc D is rotated at a predetermined number of revolutions together with the disc table 60. Moreover, the pickup forward-moving mechanism is operated so as to forward-move the optical pickup 61 into the radial direction of the disc D. The optical pickup 61 scans the signal recording surface of the disc D with light beams converged by the objective lens 61a so that information signals are recorded on the disc D and/or the same is reproduced from the disc D.

As described above, the disc D is held on the disc tray 1 when the disc D is mounted on the tray accommodating case 21 or removed from the same. Moreover, loading/unloading is performed in the foregoing state. Therefore, the signal recording surface of the disc D can be protected from being damaged and adhesion of fingerprints and other contamination to the reverse side during the operation for mounting the disc D on the tray accommodating case 21 or removing the same and an operation for loading the disc D into the disc drive apparatus. Thus, a satisfactory grade of the signal recording surface Dc of the disc D can always be maintained. As a result, information signals can completely be recorded and/or reproduced with an excellent recording/reproducing characteristic.

When the disc tray 1 loaded into the disc drive apparatus 51 is ejected, the eject motor 69 is rotated in accordance with an ejection signal supplied from the host computer or when an eject button 52*b* provided for a front panel 52*a* is depressed. When the eject motor has been rotated, the eccentric cam 68 pulls the eject-motor engagement portion 67 of the slide plate 65 in the direction indicated by the arrow a shown in FIGS. 22 and 28. Thus, the slide plate 65 is moved from the inward position of the apparatus body 52 shown in FIGS. 22 and 28 to the position moved to a position adjacent to the tray loading/unloading opening 53 shown in FIGS. 21 and 27.

As a result, an operation is performed in a retrograde order of the loading operation in such a manner that the four inclined guide grooves 76 of the slide plate 65 are displaced with respect to the four guide pins 75 of the tray holder 54 in the direction indicated by the arrow a, as shown in FIG. 27. Thus, the guide pins 75 are simultaneously pushed upwards by the inclined guide grooves 76 in the direction indicated by the arrow i shown in FIG. 27. As a result, the tray holder 54 is moved upwards in parallel with the direction indicated by the arrow i shown in FIG. 27 from the lower position shown in FIG. 26 to the upper position shown in FIGS. 23 and 25.

The disc tray 1 is moved upwards in parallel with the direction indicated by the arrow i shown in FIG. 27 together with the tray holder 54 so that the pair of the right and left reference holes 8 are removed from the pair of the right and left reference pins 62. Substantially simultaneously with this, disc chucking which has been performed by the disc damper 55 is suspended. Thus, the disc table 60 and the objective lens 61*a* of the optical pickup 61 are relatively pulled out from the bottom opening 3 of the disc tray 1 in the direction indicated by the arrow k shown in FIG. 28. Thus, the disc D is again horizontal placed on the disc support portion 4 of the disc-receiving recess 2 of the disc tray 1.

Then, the tray holder 54 is moved upwards to the upper position until the pair of the right and left reference holes 8 of the disc tray 1 are completely pulled out from the pair of the right and left reference pins 62. At this moment, the trigger arm 71 is in the direction indicated by the arrow b shown in FIG. 22 by the trigger-arm spring 72. Thus, the trigger arm 71 pushes the front end 1*a* of the disc tray 1 in the direction indicated by the arrow b shown in FIG. 22. As a result, the disc tray 1 is removed from the tray holder 54 to the outside portion of the tray loading/unloading opening 53 in the direction indicated by the arrow b shown in FIG. 21 by substantially a predetermined length. The locking member 73 of the trigger-arm spring 72 rotated in the direction indicated by the arrow b shown in FIG. 22 is again introduced into the portion in front of the locking pin 74 of the slide plate 65. Thus, the slide plate 65 is again locked at the position to which the slide plate 65 has been moved in the direction indicated by the arrow a shown in FIG. 21.

At this time, the eccentric cam 68 of the eject motor 69 is rotated one time. When the eccentric cam 68 has finally been returned to the original position, the eccentric cam 68 is separated from the eject-motor engagement portion 67 of the slide plate 65.

As a result, the operation for removing the disc tray 1 to the outside portion of the disc drive apparatus 51 is completed. Then, the disc tray 1 is extracted from the disc drive apparatus 51 in the direction indicated by the arrow b shown in FIG. 21, and then again inserted into the tray accommodating case 21 so as to be accommodated. Also at this time, the disc tray 1 can safely and smoothly be accommodated in the tray accommodating case 21 without careless separation of the disc D from the disc tray 1.

A fourth embodiment of the disc tray and the disc accommodating apparatus according to the present invention will now be described with reference to FIGS. 29 to 36.

Figure 29:
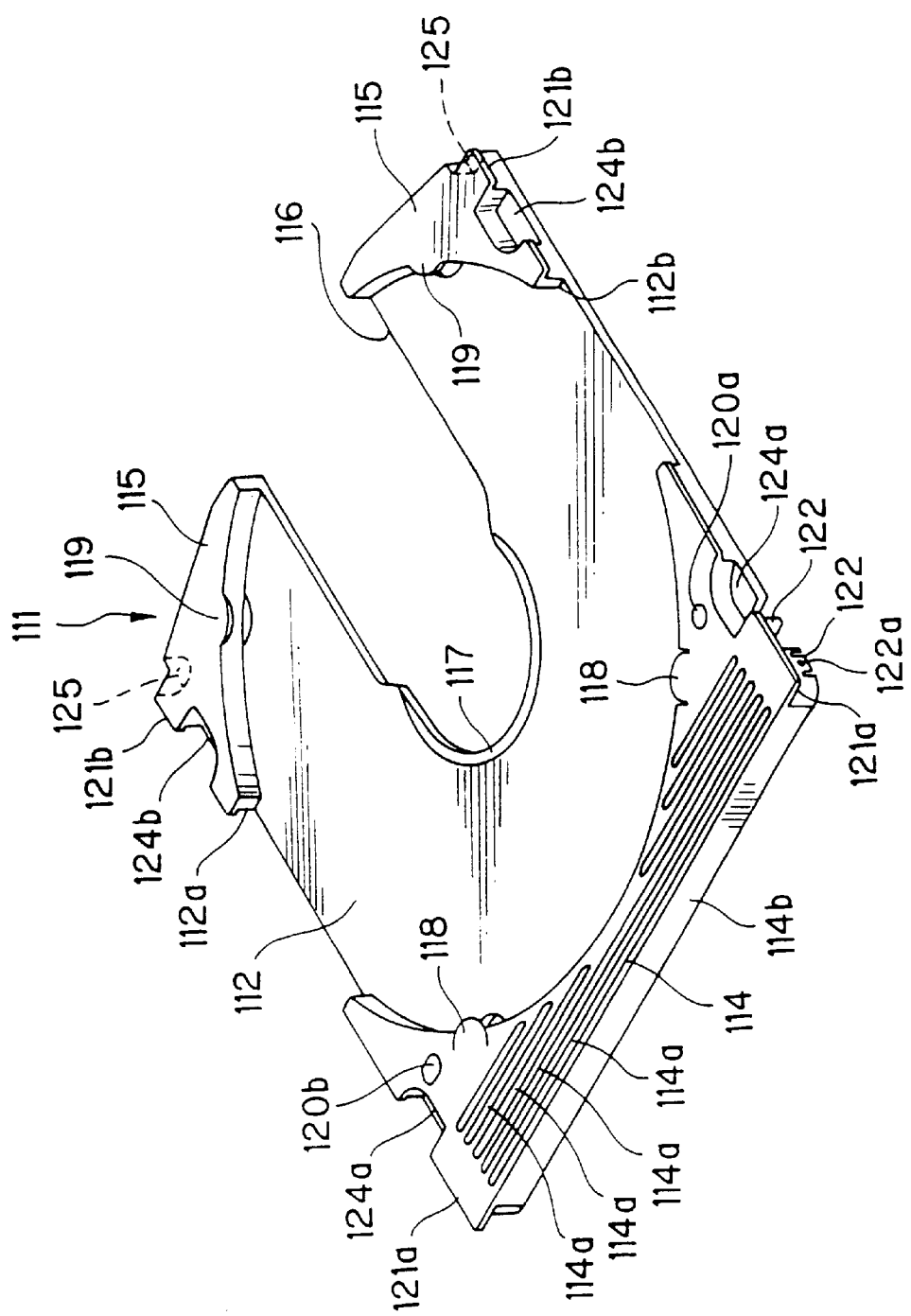
FIG. 29 is a perspective view showing a disc tray according to a fourth embodiment of the disc tray and the tray accommodating case according to the present invention.

A disc tray 111 according to this embodiment, as shown in FIG. 29, is formed by a flat and thin plate member elongated in a direction in which the disc tray 111 is inserted into the disc drive apparatus. A circular disc-receiving recess 112 capable of holding the disc D with an appropriate gap from the disc D in the radial direction of the disc D is opened in either side of the disc tray 111. The diameter C of the disc-receiving recess 112 is made to be larger than the diameter $D_1$ of the disc D ($C > D_1$), as shown in FIG. 30.

Figure 30:
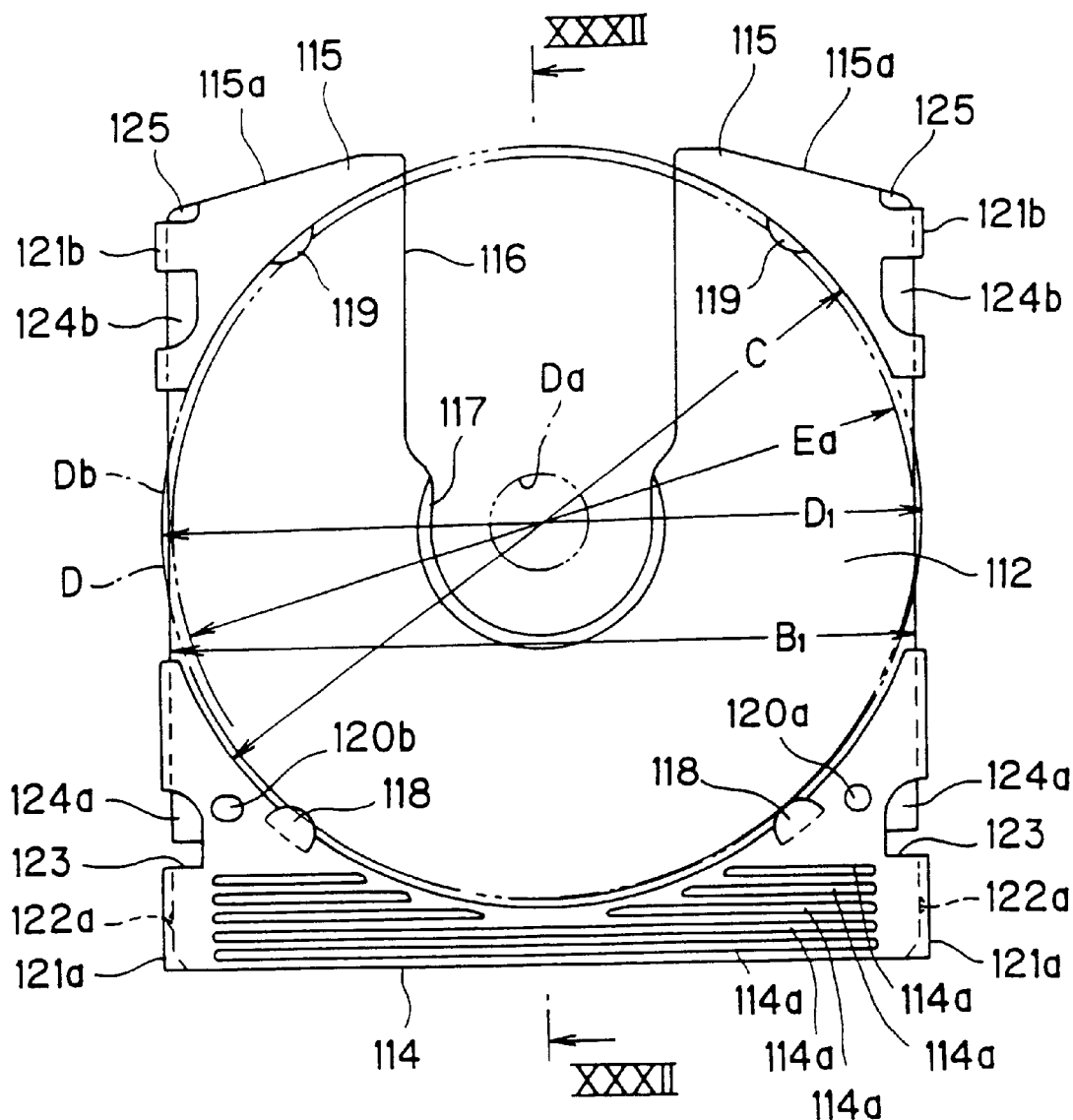
FIG. 30 is a front view showing the disc tray shown in FIG. 29.

The length $B_1$ of the disc-receiving recess 112 in the widthwise direction perpendicular to the direction in which the disc tray 111 is inserted into the disc drive apparatus is, as shown in FIG. 30, made to be smaller than the diameter $D_1$ of the disc D ($B_1 < D_1$).

Since the disc-receiving recess 112 is structured as described above, cut portions 112*a* and 112*b* for causing a portion of the disc D placed on the disc-receiving recess 112 toward the side portions of the disc tray 111 are formed on the opposite two sides of the disc tray 111 in a direction perpendicular to the direction in which the disc tray 111 is inserted into the disc drive apparatus.

A grip portion 114 for holding the disc tray 111 is formed in the base portion of the disc tray 111 opposite to the leading end of the disc tray 111 which is first inserted into the disc drive apparatus.

Moreover, a pair of right and left holding portions 115 for supporting the outer peripheries of the disc D placed on the disc-receiving recess 112 are formed on the two sides of the leading end of the disc tray 111 which is first inserted into the disc drive apparatus.

A bottom opening 116 is formed in the bottom portion of the disc-receiving recess 112. As shown in FIGS. 29 and 30, the bottom opening 116 is formed in the central portion of the disc-receiving recess 112 in the lateral direction, the bottom opening 116 being formed from the end of the disc tray 111 which is first inserted into the disc drive apparatus to the central portion of the disc-receiving recess 112. Since the bottom opening 116 is formed as described above, a pair of holding portions 115 are symmetrically formed on the two sides of the disc-receiving recess 112 adjacent to the end of the disc-receiving recess 112 which is first inserted into the disc drive apparatus. As described later with reference to FIG. 47 and so forth, a disc table 151 for rotating the disc D accommodated within the disc-receiving recess 112 and an optical pickup 152 for forming a recording and/or reproducing means for recording and/or reproducing information with respect to disc D which is rotated by the disc table 151 are inserted into the bottom opening 116.

A circular-arc disc support portion 117 corresponding to the central portion of the disc D is formed integrally with the bottom opening 116 at the central portion of the disc-receiving recess 112 to project upwards. The disc support portion 117 supports the non-signal recording region Dd formed in the central portion on the signal recording surface of the placed disc. As a result, undesirable contact of the signal recording region Dd with the disc receiving surface of the disc-receiving recess 112 is prevented so that the signal recording surface is protected.

A pair of disc-separation-preventive projections 118 are formed in the inner periphery of the grip portion 114 formed in the periphery of the disc-receiving recess 112. Moreover, a pair of disc-separation-preventive projections 119 are formed in each of the inner peripheries of the pair of the holding portions 115 formed in the periphery of the disc-receiving recess 112. The disc-separation-preventive projections 118 and 119 prevent separation of the disc D held within the disc-receiving recess 112. In order to permit somewhat movement of the disc D in the direction of the thickness of the disc D, the disc-separation-preventive projections 118 and 119 are formed to project to have appropriate gaps from the disc receiving surface.

The disc-separation-preventive projections 118 of the disc-separation-preventive projections 118 and 119 which is formed adjacent to the grip portion 114 have a base portion, two sides of which are cut, so that great elasticity is imparted to the disc-separation-preventive projections 118. As a result, the disc-separation-preventive projections 118 can elastically be deformed in the vertical direction, that is, in the direction of the depth of the disc-receiving recess 112. When the disc-separation-preventive projections 118 are pressed by the disc D, the disc-separation-preventive projections 118 are easily be deflected to permit the disc D to be extracted from the disc-receiving recess 112. On the other hand, the disc-separation-preventive projections 119 adjacent to the holding portions 115 are in the form of a solid body in this embodiment and substantially no elasticity is imparted to the disc-separation-preventive projections 118. However, the base portion of the disc-separation-preventive projections 119 may be cut similarly to the disc-separation-preventive projections 118 so as to have flexibility.

The disc-separation-preventive projections 118 and 119 are disposed substantially point-symmetrical with respect to the central portion of the disc-receiving recess 112. As shown in FIG. 30, the diameter Ea of a circumscribed circle common to the leading ends of the disc-separation-preventive projections 118 and 119 is made to be smaller than the diameter $D_1$ of the disc D (Ea<$D_1$). Therefore, when the disc D is accommodated within the disc-receiving recess 112, the disc-separation-preventive projections 118 are deflected and inserted. Since the disc-separation-preventive projections 118 are deflected, the disc D accommodated within the disc-receiving recess 112 can be extracted. In a state in which the disc-separation-preventive projections 118 are not deflected, introduction/extraction of the disc D is prevented.

A plurality of parallel grooves 114a extending in the widthwise direction are formed on the upper and lower surfaces of the grip portion 114 of the disc tray 111. The grooves 114a realize a slip preventive function. As shown in FIGS. 29 and 30, a pair of reference holes 120a and 120b for locating the disc tray 111 with respect to the receiving portion in the disc drive apparatus 150 are formed in each of the widthwise sides of the grip portion 114. As described later with reference to FIG. 46A, a pair of reference pins 153 provided for the disc drive apparatus 150 are engaged to the reference holes 120a and 120b. In order to accurately locate the reference pins 153, the reference hole 120a is formed into a complete round and the other reference hole 120b is formed into an oblong hole.

Moreover, flange portions 121a and 121b to be placed on the upper surface of a side plate 131d of a case body 131 of a tray accommodating case 130 are formed on the two sides of a portion of the disc tray 111 in which the grip portion 114 and the holding portions 115 are formed. The flange portions 121a and 121b, in particular, the flange portion 121a adjacent to the grip portion 114 is held from the widthwise direction so that the extraction from the case body 131 is easily performed.

Figure 31:
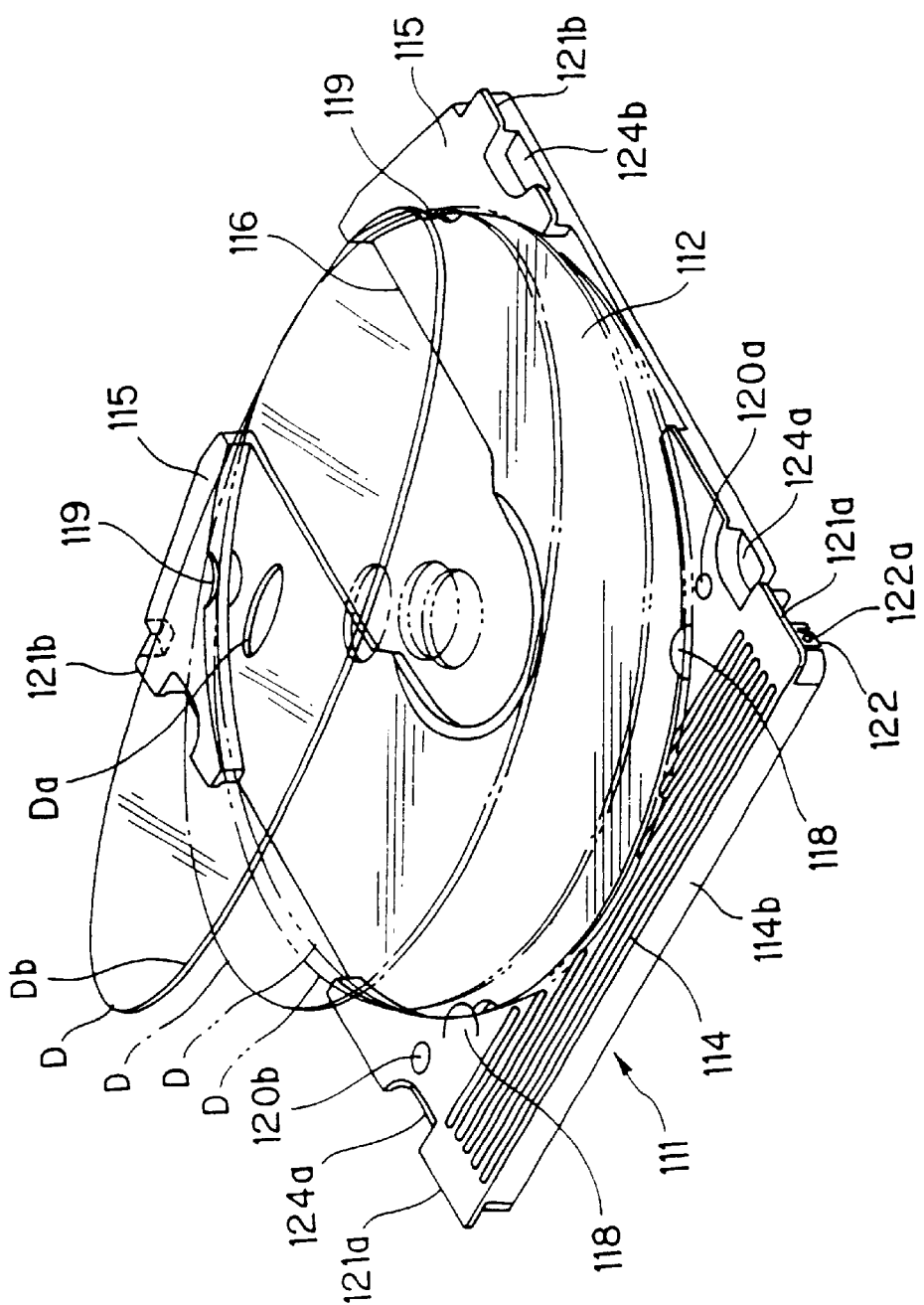
FIG. 31 is a perspective view showing an operation for loading/unloading the disc to and from the disc tray shown in FIG. 29.

As shown in FIGS. 29 and 31, an engagement projection 122a which can be engaged to an engagement hole formed in the side plate 131d of the case body 131 is formed below the flange portion 121a, the engagement projection 122a being formed in the side portion of the disc tray 111. As shown in FIG. 31, the engagement projection 122a is formed integrally with an elastic member 122 having slits on the vertical two sides thereof so as to have flexibility. The urging force of the elastic member 122 generates predetermined resistance when the disc tray 111 is loaded/unloaded to and from the case body 131.

Moreover, engagement recesses 123 to which a loading mechanism and a pulling-in means, such as an auto-changer, are engaged, are formed on the two widthwise sides of the grip portion 114 of the disc tray 111, as shown in FIG. 30. Moreover, recesses 124a and 124b for preventing interference with hook portions 135 of a closed cover 132 to be described later are formed adjacent to the engagement recesses 123 and on the side surfaces of the pair of the holding portions 115.

A tapered surface 115a facing outside is formed at each of the leading end of the pair of the holding portions 115. A cut portion 125 for preventing looseness from the cover 132 is formed at the outer corner of each of the tapered surfaces 115a. As shown in FIGS. 29 and 31, a label display region 114b on which a label capable of displaying required factors, such as the contents of the disc D, is formed on the rear side of the disc tray 111 provided with the grip portion 114.

Figure 33:
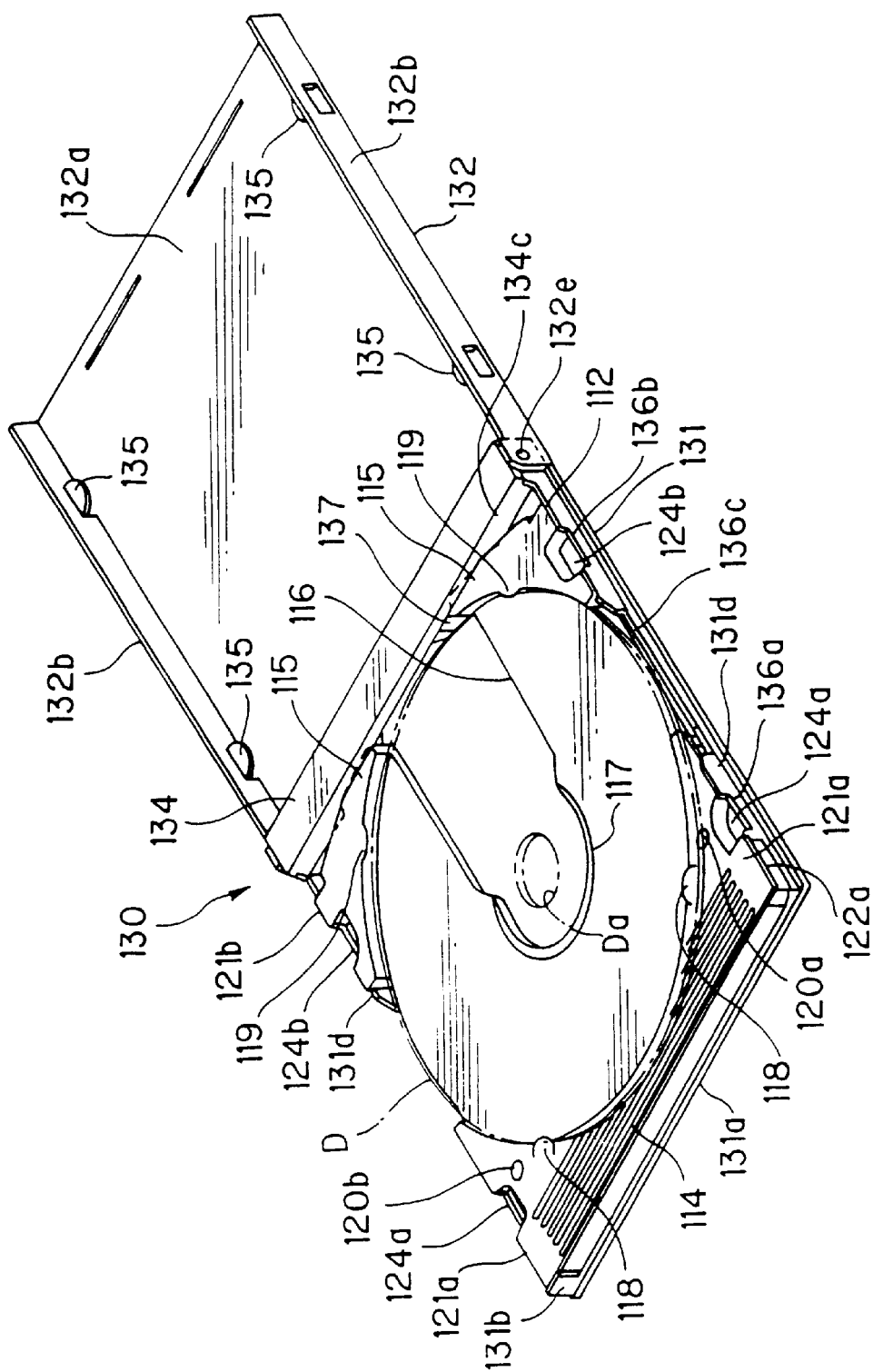
FIG. 33 is a perspective view showing a tray accommodating case according to a four embodiment of the disc tray and the tray accommodating case.
Figure 34:
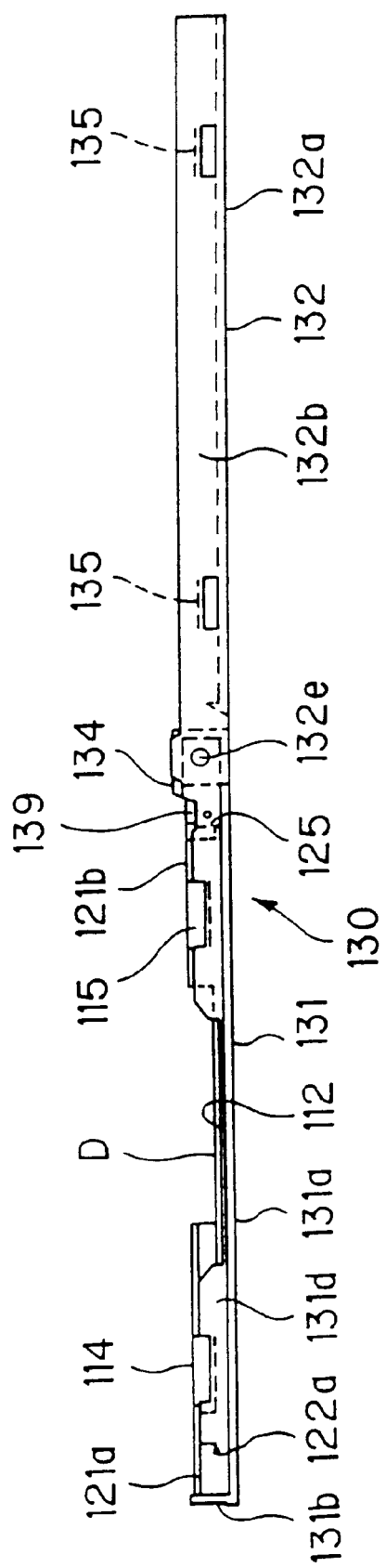
FIG. 34 is a side view showing the tray accommodating case shown in FIG. 33.

The tray accommodating case 130 is, as shown in FIGS. 33 to 36, composed of a case body 131 and a cover 132, which are joined to each other in such a manner that opening/closing is permitted by a hinge portion; and an intermediate case 134 accommodated in the case body 131. The case body 131 is formed by a rectangular box having an opened upper surface. A front plate 131b and a rear plate 131c are disposed in front of the lower plate 131a and in the rear of the same. Moreover, side plates 131d are disposed on the right and left sides of the lower plate 131a as shown in FIG. 34. Thus, the lower plate 131a is surrounded by the front, rear and right and left plates.

The cover 132 is composed of a top plate 132a for covering the overall surface of the case body 131 and right and left side plates 132b continued to the top plate 132a in the widthwise directions. The side plates 132b of the cover 132 have large widths to be capable of holding the two side plates 131d of the case body 131. A bearing hole for rotatively receiving a shaft portion 132e of the cover 132 is formed in the rear portion of each of the side plates 132b. When the cover 132 and the case body 131 are closed, side plates 132b of the cover 132 are received by the outer surfaces of the side plates 131d of the case body 131.

As shown in FIGS. 33 and 34, two semi-circular hook portions 135 for accommodating and holding printed matter, such as a lyrics card, are provided for the two side plates 132b of the cover 132. The recesses 124 corresponding to the hook portions 135 are provided for the disc tray 111. Moreover, cut portions 136a and 136b are formed in the two side plates 13 id of the case body 131. A central cut portion 136c for exposing a portion of the disc tray 111 is formed at a lengthwise-directional intermediate position of the side plates 131d.

Figure 35:
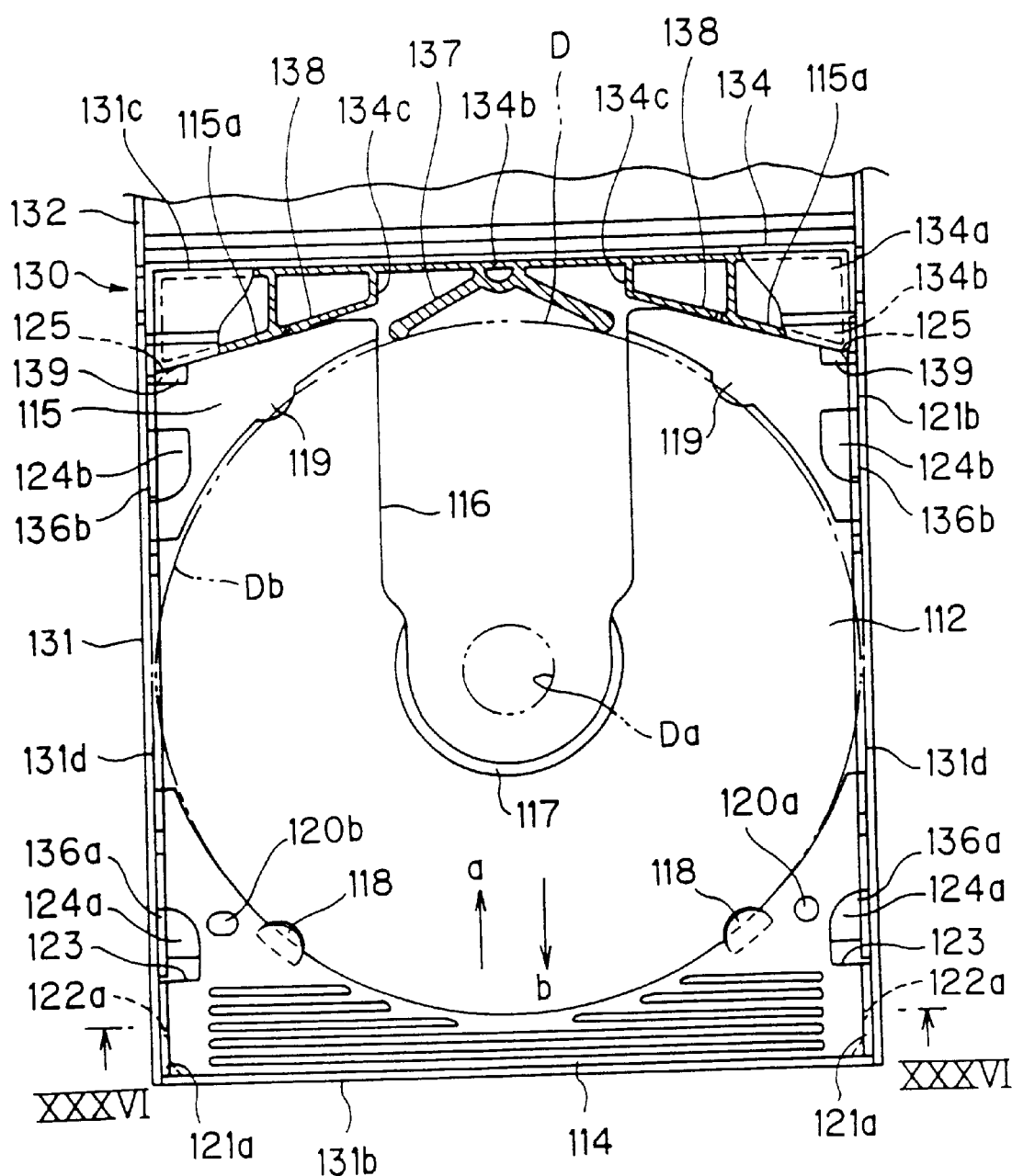
FIG. 35 is a partially-cut plan view showing an essential portion of the tray accommodating case shown in FIG. 33.
Figure 36:
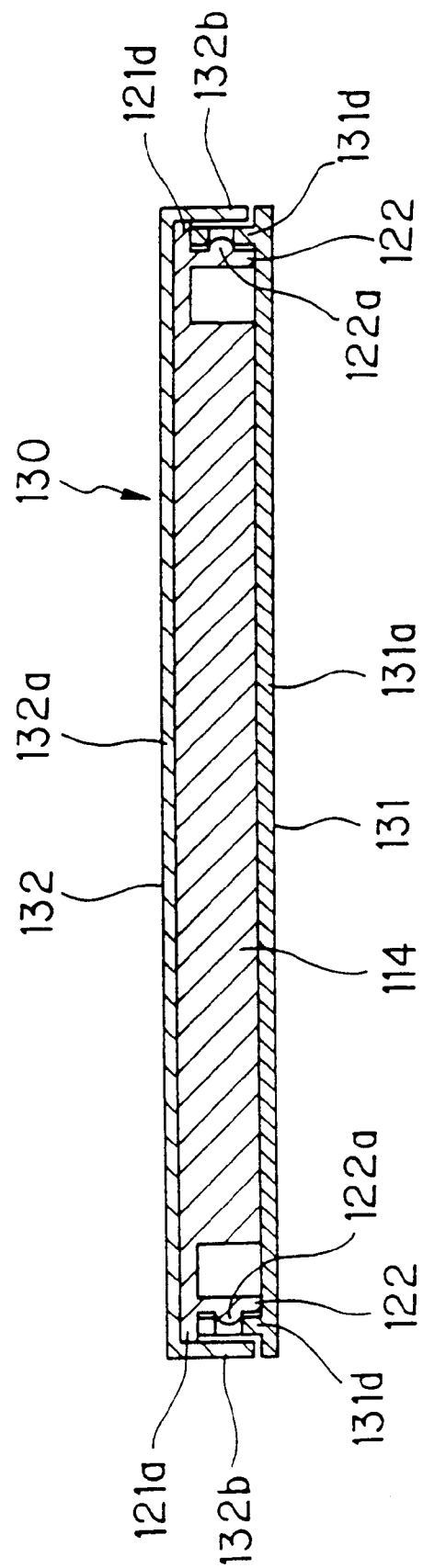
FIG. 36 is a cross sectional view showing the tray accommodating case shown in FIG. 35 and taken along line XXXVI—XXXVI.

As shown in FIG. 35, the intermediate case 134 has a top-surface member 134a for covering the upper surfaces of the hinge portions which rotatively support the cover 132 of the case body 131; a rear-surface member 134b continued from the rear portion of the top-surface member 134a and disposed opposite to the front portion of the rear plate 131c of the case body 131; a pair of right and left support portions 134c disposed apart from each other for a predetermined distance in the widthwise direction; and a disc pressing member 137 comprising a leaf spring disposed between the two support portions 134c. The disc tray 111 is detachably accommodated in the case body 131 on which the intermediate case 134 has been mounted.

The front surface of each of the right and left support portions 134c of the intermediate case 134 is formed into a tapered surface corresponding to the tapered surface 115a of the right and left holding portions 115 of the disc tray 111. Each of the tapered surfaces is provided with an elastic member 138 to which elasticity is imparted by cutting into a U-shape facing side. A projection facing forwards is formed at the leading end of the elastic member 138. When the disc tray 111 has been inserted into the case body 131, the projections of the right and left elastic members 138 are brought into contact with the tapered surfaces 115a of the right and left holding portions 115 of the disc tray 111. The force of the contact forwards urges the disc tray 111 so that longitudinal looseness with respect to the case body 131 is absorbed.

A retaining member 139 for preventing looseness of the leading end of the disc tray 111 is disposed on the outside of the two support portions 134c in the widthwise direction. The right and left retaining members 139 are engaged to the cut portions 125 formed on the outer corners of the two holding portions 115 of the disc tray 111 so that the cut portions 125 are pressed from upper positions in order to prevent looseness of the two holding portions 115.

The disc pressing member 137 of the intermediate case 134 comprises an integrally-formed umbrella-shape leaf spring having an intermediate portion continued from the rear-surface member 134b. The disc pressing member 137 is formed to correspond to the bottom opening 116 of the disc tray 111. A pair of right and left projections facing forwards are provided for the leading end of the disc pressing member 137. When the disc tray 111 is inserted into the case body 131, the pair of the right and left projections of the disc pressing member 137 are brought into contact with the outer periphery of the disc D placed on the disc tray 111. The generated urging force forwards urges the disc D so that the disc D is pressed against the inner side walls of the grip portion 114. As a result, longitudinal looseness of the disc D with respect to the disc tray 111 can be absorbed.

Although it is preferable that the disc tray 111 and the tray accommodating case 130 are made of synthetic resin, such as ABS resin or polyacetal resin, metal or another material may be employed. Although the case body 131 and the and the cover 132 of the tray accommodating case 130 are made of a material having transparency, an opaque material may, of course, be employed.

The disc tray 111 and the tray accommodating case 130 have the above-mentioned structures. Then, a state in which the disc D is held on the disc tray 111 and a state in which the disc tray 111 is mounted on the inside portion of the tray accommodating case 130 will now be described.

The state in which the disc D is held on the disc tray 111 will now be described. In this case, the outer periphery on the diameter passing through the center of the disc D and the central hole Da in the central portion are held by the fingers so that the disc D is held. In this state, the leading end of the disc D is inserted into the inside portions of the disc-separation-preventive projections 119 of the right and left holding portions 115 of the disc tray 111, as shown in FIG. 31. Moreover, the other ends of the disc D is moved toward the disc-receiving recess 112. As a result, the outer portion of the disc D adjacent to the grip portion 114 is placed on the pair of the disc-separation-preventive projections 118 because the diameter $D_1$ of the disc D is larger than the diameter Ea of the circumscribed circle E which is in contact with the leading ends of the four disc-separation-preventive projections 118 and 119.

Then, the outer portion of the grip portion 114 of the disc D is pressed from an upper position in the foregoing state so that both of the two disc-separation-preventive projections 118 are elastically deformed into the downward direction. Thus, the edge of the disc D passes through the disc-separation-preventive projections 118.

As a result, the disc D is introduced into the disc-receiving recess 112 of the disc tray 111 so that the disc D is held with an appropriate gap from the disc tray 111 in the direction perpendicular to the surface of the disc D. Moreover, the four disc-separation-preventive projections 118 and 119 prevent separation of the disc D.

Moreover, the diameter C of the disc-receiving recess 112 is larger than the diameter $D_1$ of the disc D so that somewhat movement of the disc D in the radial direction of the disc D is permitted. Therefore, the disc D is held within the disc-receiving recess 112 in such a manner that somewhat play is permitted in both radial direction and vertical direction.

Figure 32A:
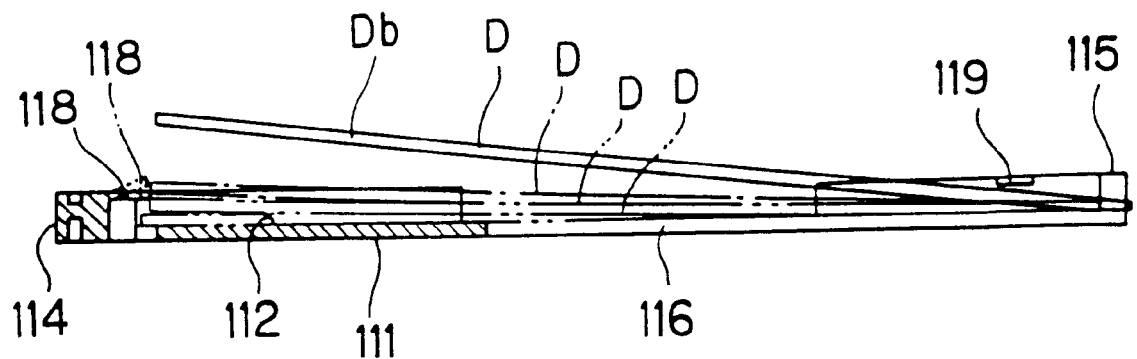
FIGS. 32A and 32B are cross sectional views showing an enlarged essential portion of the operation for loading/unloading the disc to and from the disc shown in FIG. 29.
Figure 32B:
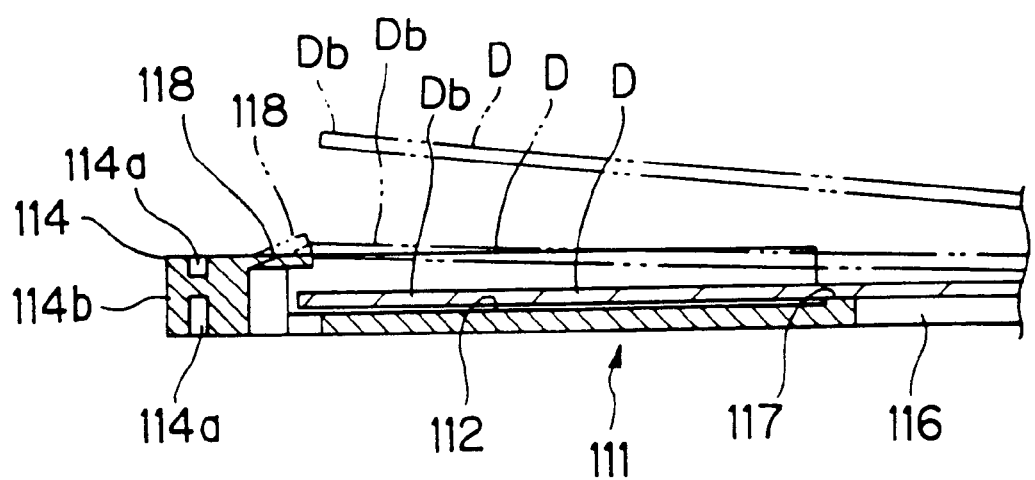

When the disc D is removed from the disc tray 111, the outer periphery of the disc D on the central line of the disc D and the central hole disc D in the central portion of the disc D are held by the fingers to raise the grip portion 114 of the disc D. As a result, the outer periphery of the disc D elastically deforms the pair of the right and left disc-separation-preventive projections 118 in the upward direction, as shown in FIGS. 32A and 32B in an enlarged manner. Thus, the edge of the disc D is allowed to pass through the disc-separation-preventive projections 118 and moved to the outside. Then, the leading end of the disc D is pulled out so as to suspend the engagement with the disc-separation-preventive projections 119 adjacent to the holding portions 115. Thus, the disc D can be extracted from the disc tray 111.

In this embodiment, the disc-separation-preventive projections 118 of the disc tray 111 have sufficiently great elasticity so as to easily be deflected and deformed even with the force for raising the central portion of the disc D. Therefore, the operation for causing the disc-separation-preventive projections 118 to pass through the edge of the disc D can considerably be performed.

Since the width $B_1$ of the disc tray 111 in the widthwise direction is smaller than the diameter $D_1$ of the disc D, the two ends of the disc D project to the outside at an intermediate position in the lengthwise direction. Therefore, the disc D can easily be held.

A state in which the disc tray 111 on which the disc D is held is loaded into the tray accommodating case 130 will now be described. In this case, the cover 132 of the tray accommodating case 130 is opened to open the upper portion of the case body 131, as shown in FIG. 33. Then, the grip portion 114 of the disc tray 111 is held to deeply insert the right and left holding portions 115 at the leading end of the disc tray 111 into the case body 131. Then, the tapered surfaces 115*a* at the leading ends of the two holding portions 115 are brought into contact with the right and left support portions 134*c* of the intermediate case 134. As a result, the grip portion 114 of the disc tray 111 can be inserted.

In the foregoing state, the grip portion 114 of the disc tray 111 is pushed downwards so that the grip portion 114 is pushed into the case body 131. Since the elastic member 122 having the engagement projection 122*a* is provided for each of the side surfaces of the grip portion 114, resistance having a certain level is generated when the engagement projection 122*a* is introduced into the case body 131. If the engagement projection 122*a* is pushed into a predetermined position, the engagement projection 122*a* is introduced into the engagement hole in the case body 131. Therefore, the engagement projection 122*a* attains proper clicking feeling when the insertion operation is performed. Moreover, a locking effect can be obtained after the insertion has been completed.

In this case, the elastic members 138 provided for the support portions 134*c* of the intermediate case 134 are brought into contact with the tapered surfaces 115*a* of the two holding portions 115 of the disc tray 111. The urging force of the elastic members 138 forwards urges the disc tray 111 so that the disc tray 111 is pressed against the front plate 131*b*. Therefore, looseness of the disc tray 111 with respect to the tray accommodating case 130 can be absorbed.

Moreover, the disc pressing member 137 which is the leaf spring of the intermediate case 134 is brought into contact with the disc D held on the disc tray 111. The urging force of the disc pressing member 137 forwards urges the disc D so as to be pressed against the side walls of the grip portion 114. Therefore, also looseness of the disc D with respect to the disc tray 111 can be absorbed.

Then, the cover 132 is superimposed on the case body 131 so that the tray accommodating case 130 is closed. Thus, the disc tray 111 is accommodated in the tray accommodating case 130. When the cover 132 is closed, the hook portions 135 provided for the cover 132 are introduced and engaged between the recess 124 of the disc tray 111 and a cut portion 136 of the case body 131. Moreover, the top plate 132*a* of the cover 132 is moved to an opposite position so as to cover the upper surface of the grip portion 114.

Since a projection (not shown) provided for the cover 132 is engaged to a recess formed in the case body 131, the case body 131 locks the cover 132. Thus, the closed state is maintained.

A state in which the disc tray 111 is unloaded from the tray accommodating case 130 will now be described. The operation for unloading the disc tray 111 is, as shown in FIG. 33, performed in such a manner that the case body 131 of the tray accommodating case 130 is opened to open the upper portion of the case body 131. Then, the two side surfaces of the grip portion 114 of the disc tray 111 are held and raised. As described above, the unloading operation can easily be performed. That is, the flange portions 121*a* project over the two side surfaces of the grip portion 114, the flange portions 121*a* being placed on the top end portions of the two side plates 131*a* of the case body 131. Therefore, when the right and left flange portions 121*a* are held from the two sides, the disc tray 111 even in a state in which the disc tray 111 is completely inserted into the case body 131 can be held and easily pulled out.

As described above, the two flange portions 121*a* of the disc tray 111 are held, and then the grip portion 114 is pulled out of the case body 131. Then, the disc tray 111 is pulled forwards to suspend the engagement between the cut portions 125 formed on the leading end corners of the holding portions 115 and the retaining members 139 of the intermediate case 134. As a result, the operation for unloading the disc tray 111 from the case body 131 is completed.

A fifth embodiment of the disc tray and the disc accommodating apparatus according to the present invention will now be described with reference to FIGS. 37 and 38.

Figure 37:
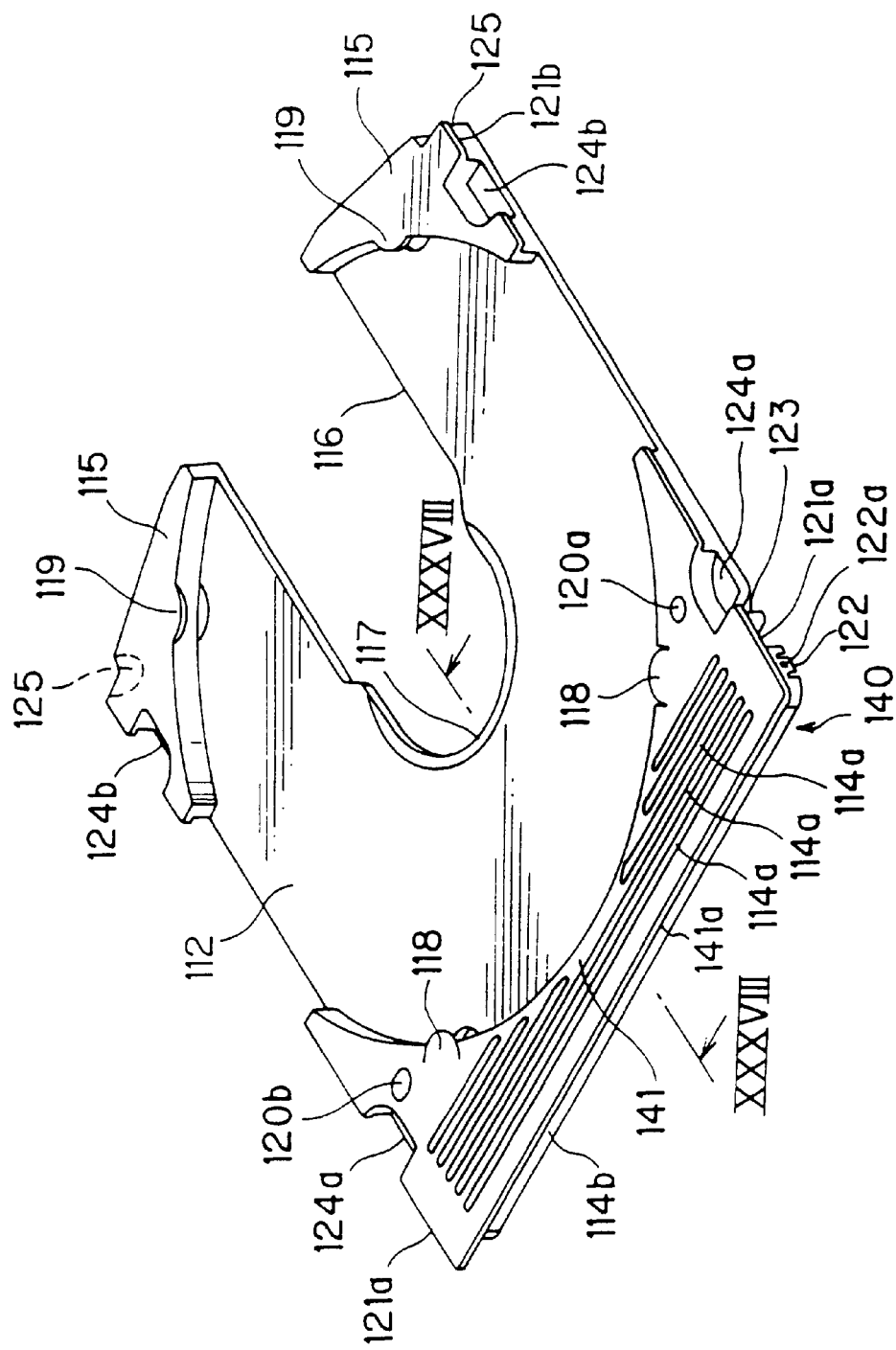
FIG. 37 is a perspective view showing a disc tray according to a fifth embodiment of the disc tray and the tray accommodating case according to the present invention.

As shown in FIG. 37, a disc tray 140 according to the fifth embodiment has a front flange portion 141*a* projecting toward a position opposite to the disc-receiving recess 112 of the grip portion 114. The other structures are the same as those according to the fourth embodiment.

Figure 38:
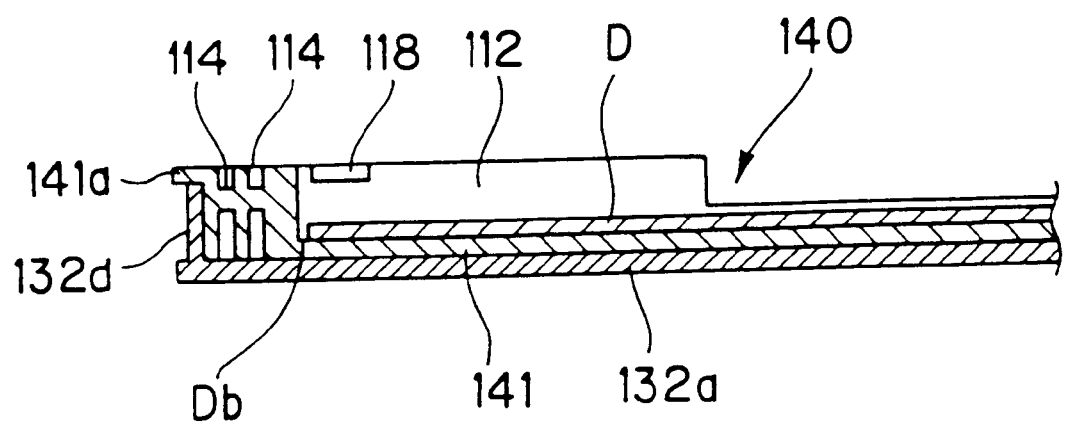
FIG. 38 is a cross sectional view showing an enlarged essential portion of the disc tray shown in FIG. 37 and taken along line XXXVIII—XXXVIII.

The front flange portion 141*a* of the disc tray 140 is, as shown in FIG. 38, arranged in such a manner that the front flange portion 141*a* is placed on the front plate 132*d* of a case body 132. Moreover, the leading end of the front flange portion 141*a* projects over the front plate 132*d*. Therefore, the finger is brought into contact with the front flange portion 141*a* so that the front flange portion 141*a* is raised. Thus, the disc tray 140 can easily be unloaded from the case body 131.

A sixth embodiment of the disc tray and the disc accommodating apparatus according to the present invention will now be described with reference to FIGS. 39 to 44.

Figure 39:
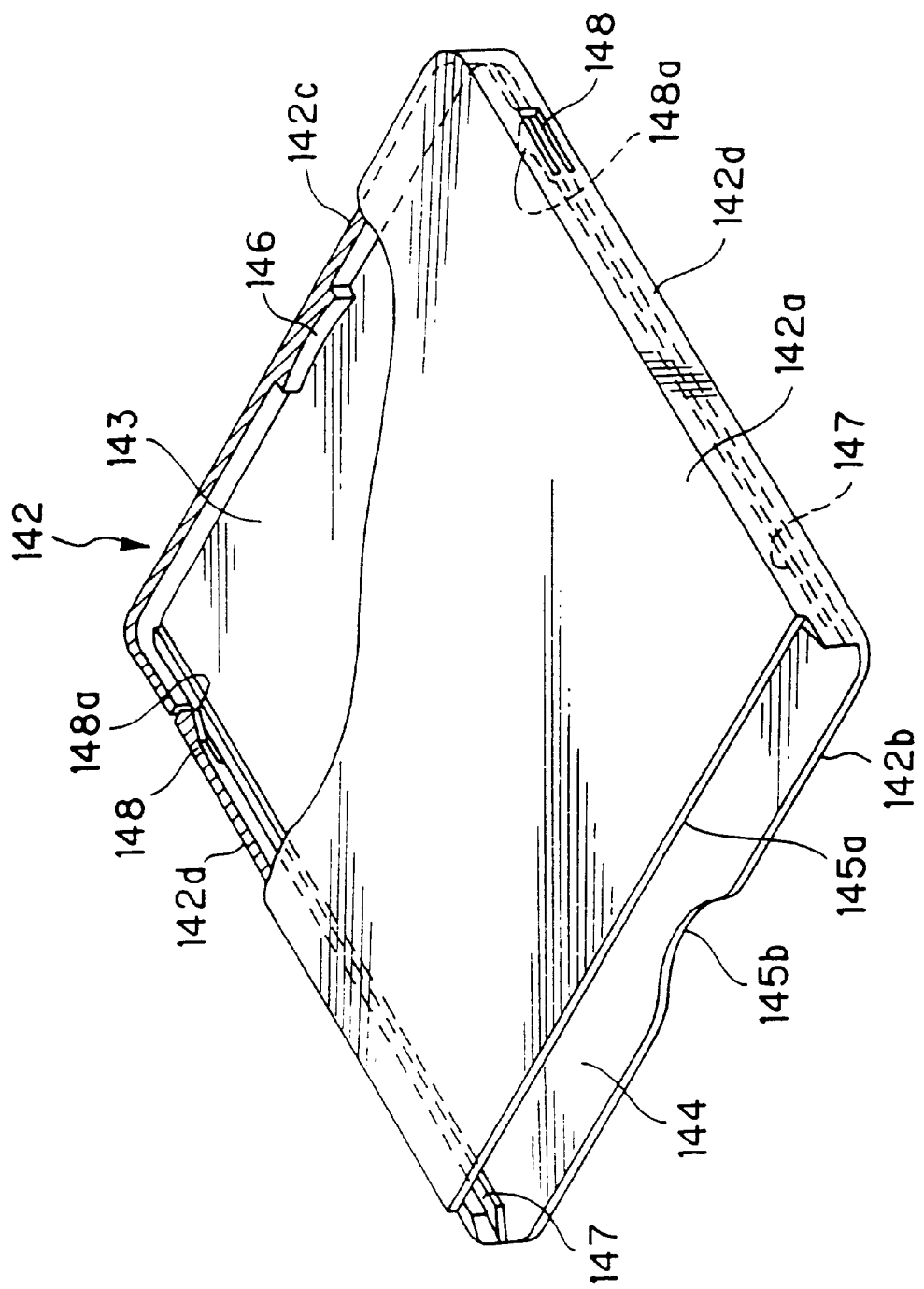
FIG. 39 is a partially-cut perspective view showing a tray accommodating case according to a sixth embodiment of the disc tray and the tray accommodating case according to the present invention.

A tray accommodating case 142 according to the sixth embodiment is formed into a substantially flat rectangular shape having a slit-shape opening 144 which is a horizontal opening formed in the front surface thereof, the tray accommodating case 142 being formed into a sleeve shape. That is, the tray accommodating case 142, as shown in FIG. 39, has a structure that a top plate 142*a* and a lower plate 142*b* are connected to each other by a rear plate 142*c* and right and left side plates 142*d*. Moreover, the slit-shape opening 144 is formed in the front surface of the tray accommodating case 142 so that a tray accommodating portion 143 is formed in the tray accommodating case 142.

It is preferable that the material of the tray accommodating case 142 be synthetic resin, such as ABS resin. In particular, it is preferable that the either of the main surfaces is made of a material having transparency which permits the accommodated disc D to be visually recognized. Moreover, a label display region, to which an indication label for indicating the contents recorded on the disc D which is accommodated is applied, is formed on the other main surface of the tray accommodating case 142.

Figure 40:
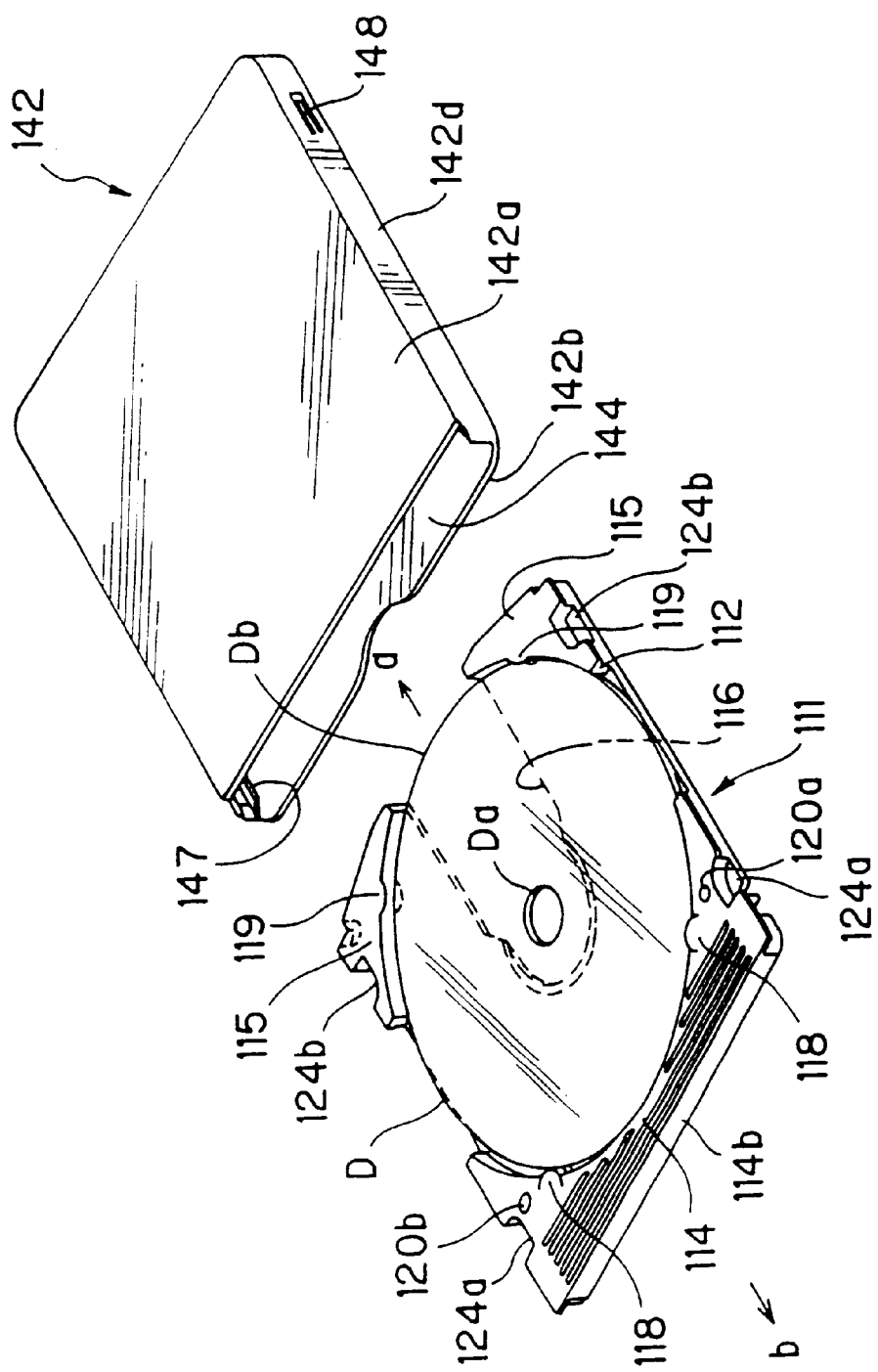
FIG. 40 is a perspective view showing the tray accommodating case shown in FIG. 39 and the disc tray shown in FIG. 29.

The opening 144 of the tray accommodating case 142 is structured to have the opening which is somewhat larger than the size of the cross sectional area of the disc tray 111, as shown in FIG. 40. When the disc tray 111 has been inserted into the tray accommodating case 142, the opening 144 is closed by the grip portion 114 of the disc tray 111. Therefore, introduction of dust or the like from outside into the tray accommodating portion 143 can reliably be prevented by dint of the disc tray 111.

Moreover, the top plate 142*a* is provided with an extracting cut portion 145*a* having a straight-line shape extending in the widthwise direction and formed by, inwards and in a biased manner, cutting an end portion of the opening from the lower plate 142*b*. On the other hand, the lower plate 142*b* has an extracting circular-arc cut portion 145*b* recessed into a circular arc shape in the central portion in the widthwise direction of the lower plate 142*b*. Since the above-mentioned cut portions 145*a* and 145*b* are formed, a portion of the grip portion 114 is exposed even if the disc tray 111 is completely inserted into the tray accommodating case 142. Therefore, the grip portion 114 can reliably be held and extracted.

Figure 41:
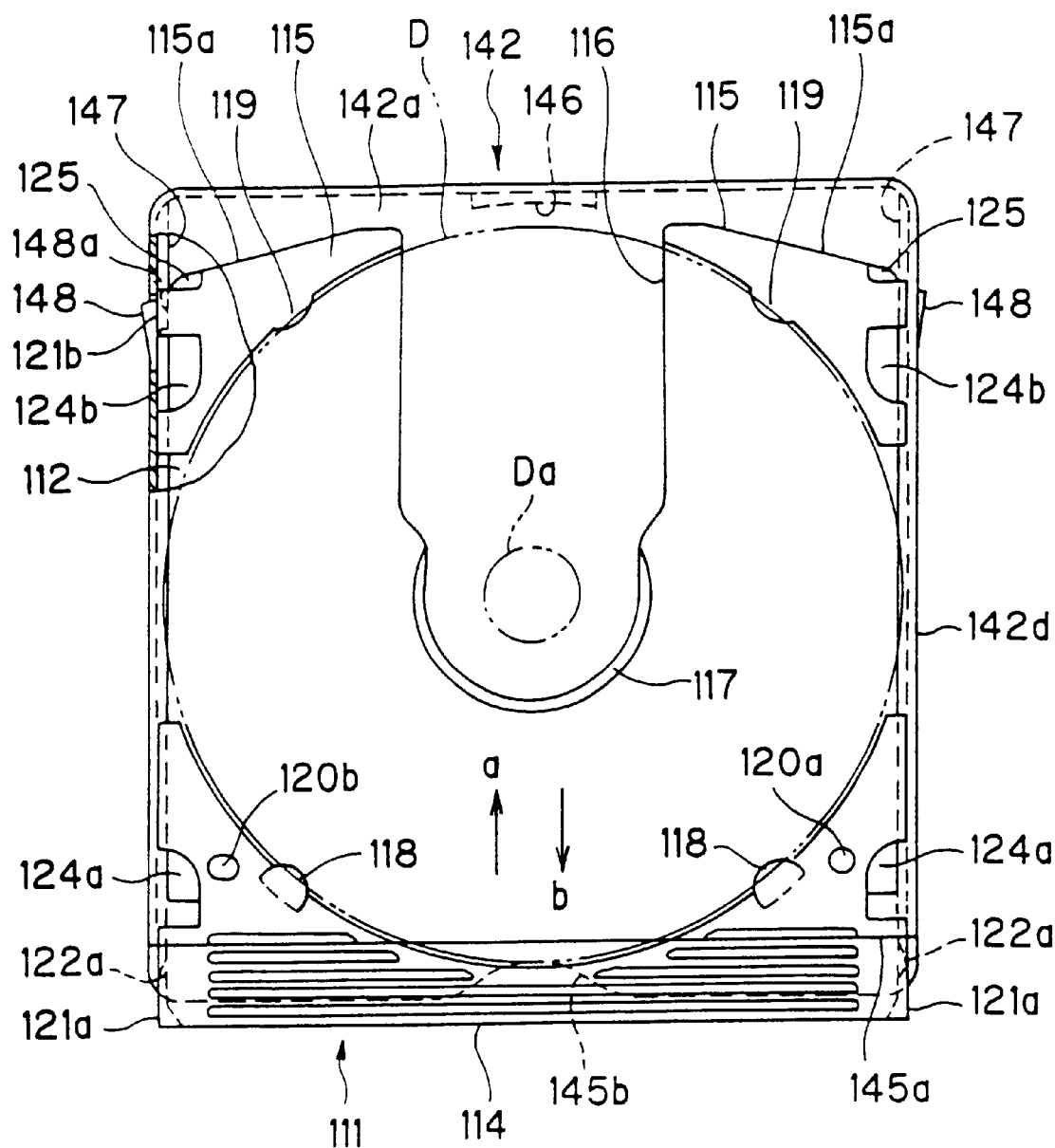
FIG. 41 is a partially-cut plan view showing an intermediate moment of the operation for inserting the disc tray shown in FIG. 29 into the tray accommodating case shown in FIG. 39.
Figure 42:
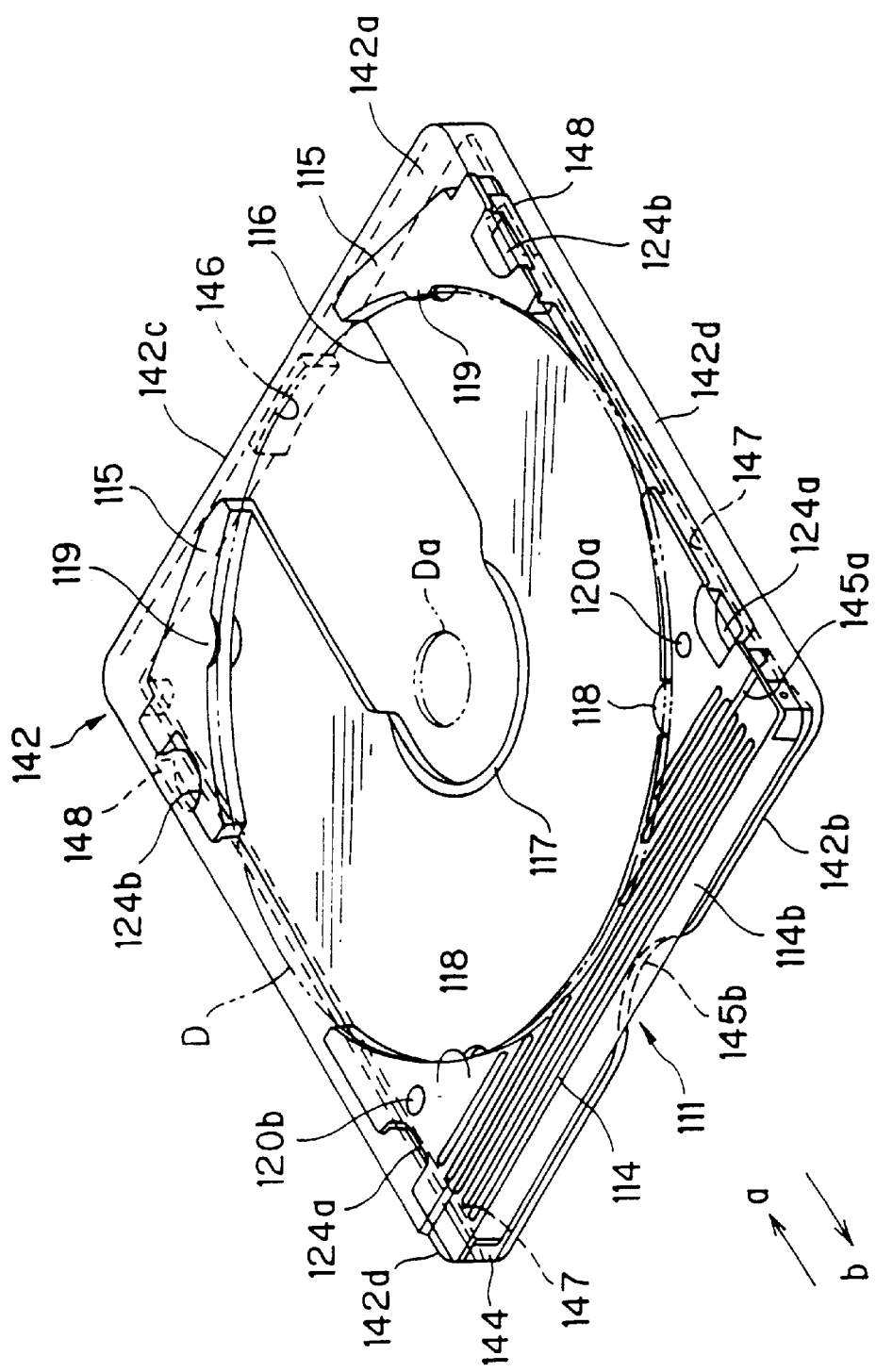
FIG. 42 is a perspective view showing the tray accommodating case and the disc tray shown in FIG. 41.

Moreover, the central portion of the inner surface of the rear plate 142c of the tray accommodating case 142 is, as shown in FIGS. 41 and 42, provided with a thick disc pressing member 146 with which the disc D held in the disc tray 111 which is accommodated in the tray accommodating portion 143 is brought into contact, the disc pressing member 146 being formed integrally with the rear plate 142c. The disc pressing member 146 prevents collision of the disc D held on the disc tray 111 with the inner wall of the tray accommodating case 142 so that breakage of the disc D is prevented.

Moreover, guide rails 147 for preventing incorrect insertion of the disc tray 111 are provided on the widthwise directional two side portions of the lower plate 142b of the tray accommodating case 142. The guide rails 147 are formed to correspond to the flange portions 121a and 121b of the disc tray 111. Therefore, when the flange portions 121a and 121b are caused to face the guide rails 147, the disc tray 111 cannot be inserted into the tray accommodating case 142. Only when the foregoing elements are caused to alternately face one another, the disc tray 111 can be inserted into the tray accommodating case 142.

Each of the two side plates 142d of the tray accommodating case 142, as shown in FIG. 41, has a disc engagement portion 148 having an engagement claw 148a for establishing the engagement and holding the disc tray 111 inserted into the tray accommodating portion 143. The disc engagement portion 148 is formed by cutting the portion around the engagement claw 148a into a U-shape facing side. When the disc tray 111 is completely inserted into the tray accommodating case 142, the engagement claw 148a is engaged to the engagement recess of the disc tray 111. As a result, separation of the disc tray 111 from the tray accommodating case 142 can be prevented.

The operation for loading/unloading the disc tray 111 to and from the tray accommodating case 142 having the above-mentioned structure is performed as follows: in a state where the disc-receiving recess 112 holding the disc D is caused to face upwards as shown in FIG. 40, the disc tray 111 is inserted into the opening 144 of the tray accommodating case 142 in such a manner that the holding portions 115 of the disc tray 111 is inserted first. As a result, the flange portions 121a and 121b of the disc tray 111 are positioned opposite to the guide rails 147 of the tray accommodating case 142. Therefore, the disc tray 111 can be inserted into the opening 144. Thus, an incorrect insertion that the disc tray 111 is turned upside down can be prevented When the disc tray 111 has been inserted to a certain extent as shown in FIG. 41, the front corners of the two holding portions 115 of the disc tray 111 are brought into contact with the disc engagement portions 148 of the two side plates 142d of the tray accommodating case 142. When the disc tray 111 is furthermore inserted, the front corners deflect and deform the disc engagement portion 148 toward outside. Thus, the engagement claws 148a pass through the front corners so as to be engaged to the engagement recesses of the disc tray 111. As a result, the disc tray 111 is completely accommodated in the tray accommodating case 142, as shown in FIG. 42. At this time, the leading end of the disc tray 111 is not brought into contact with the rear plate 142c of the tray accommodating case 142. That is, a somewhat large gap is maintained.

Figure 43:
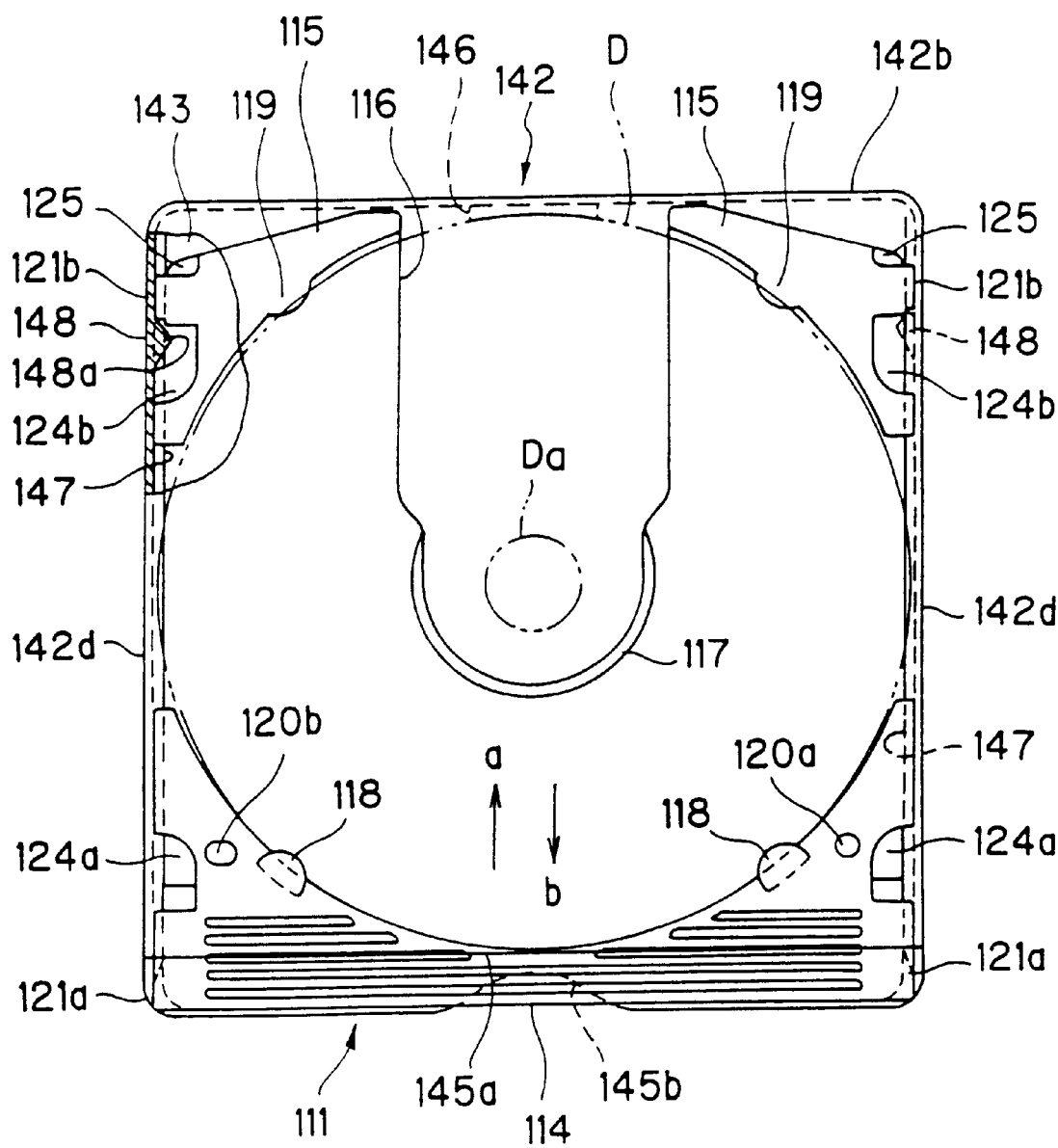
FIG. 43 is a partially-cut plan view showing a state in which the operation for inserting the disc tray shown in FIG. 29 into the tray accommodating case shown in FIG. 39 has been completed.

At this time, the disc D held on the disc tray 111 is brought into contact with the disc pressing member 146 of the tray accommodating case 142, as shown in FIG. 43. The disc D can be fixedly held without any looseness. Since the looseness of the disc tray 111 is absorbed by the disc engagement portion 148, separation of the disc tray 111 from the tray accommodating case 142 can be prevented.

When the disc tray 111 is extracted from the tray accommodating case 142, the grip portion 114 of the disc tray 111 is extracted. Thus, the extraction can easily be performed. In this case, the central portion of the grip portion 114 is exposed by dint of the straight cut portion 145a of the top plate 142a and the circular-arc cut portion 145b of the lower plate 142b. Therefore, the grip portion 114 can easily be held from upper and lower positions thanks to the exposed portion. When the disc tray 111 is pulled by certain force, the disc tray 111 is caused to pass through the two side disc engagement portions 148. Thus, the disc tray 111 can easily be extracted from the tray accommodating case 142.

Figure 44:
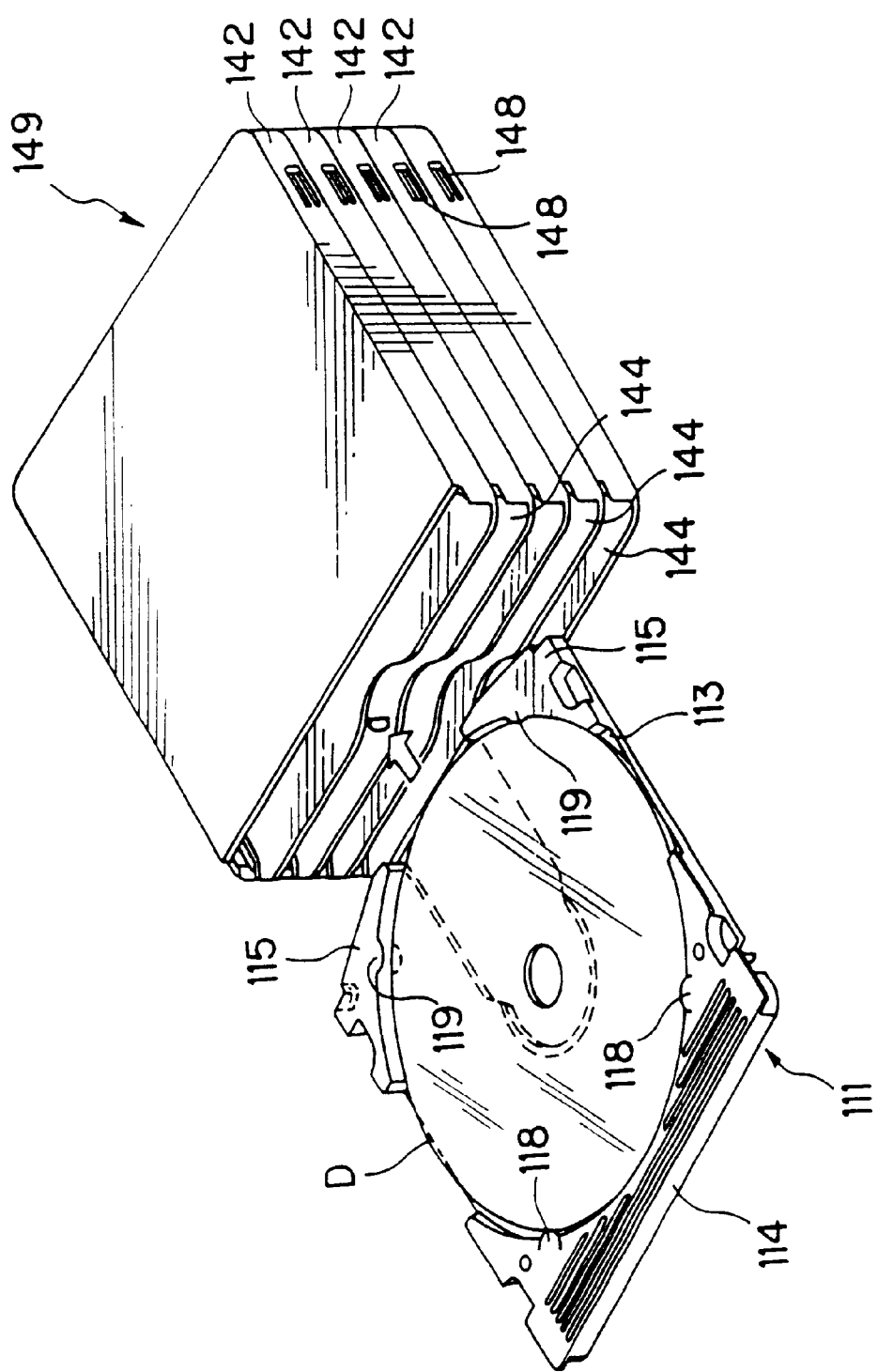
FIG. 44 is a perspective view showing a magazine rack for an auto-changer having a structure in which a plurality of the tray accommodating cases shown in FIG. 39 are vertically stacked.

The tray accommodating case 142 arranged to be inserted/removed as described above is applied to, for example, a magazine rack 149 formed by stacking a plurality of the tray accommodating cases 142 as shown in FIG. 44. Since the foregoing magazine rack 149 is able to accommodate a plurality of the disc trays 111, the disc D held in the disc trays 111 can automatically be changed by an auto-changer means.

A disc drive apparatus with which the disc D held on the disc tray 111 according to the fourth embodiment of the present invention is loaded/unloaded will now be described with reference to FIGS. 45 to 47.

In a case where the disc tray 111 having the disc D has been accommodated in the tray accommodating case 130 according to the fourth embodiment, the case body 132 is opened to open the upper portion of the case body 131. Then, the two flange portions 121a and 121b of the grip portion 114 of the disc tray 111 are held and raised so that the disc tray 111 is removed from the case body 131.

In a case where the disc tray 111 has been accommodated in the tray accommodating case 142 according to the sixth embodiment of the present invention, the tray accommodating case 142 is held by one hand. Moreover, the grip portion 114 of the disc tray 111 is held by the other hand, and then extracting force is added so that the disc tray 111 can be removed from the tray accommodating case 142.

When the disc D held on the disc tray 111 extracted from the tray accommodating case 130 or 142 is used with a disc drive apparatus of a type which has a usual drive mechanism and into which only disc D is mounted on a receiving portion, the disc D is removed from the disc tray 111 and only the disc D is mounted on the receiving portion. When the disc drive apparatus is the above-mentioned apparatus, the loading operation is similar to that of the conventional case. Therefore, the description of the operation is omitted.

Figure 45:
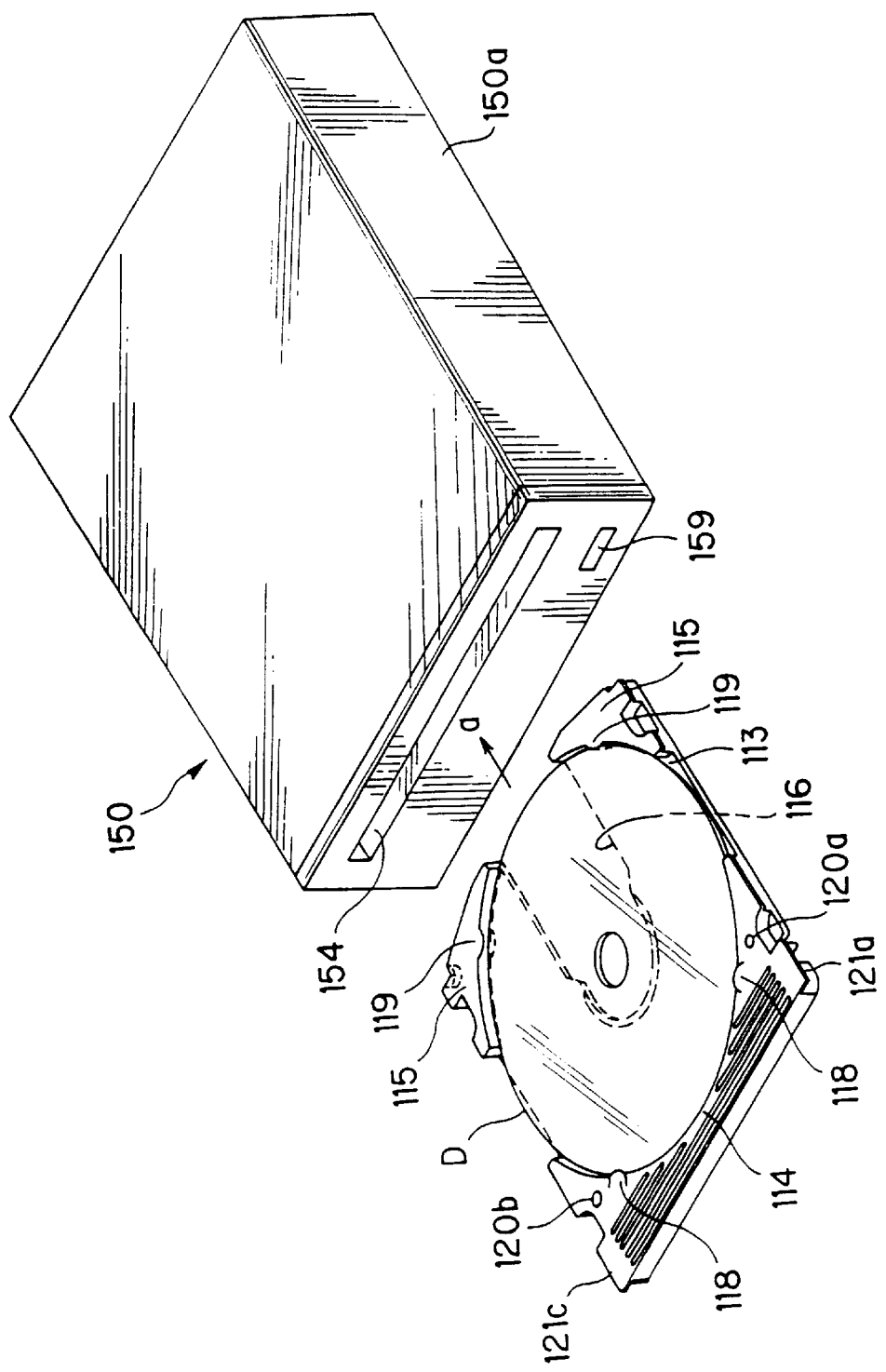
FIG. 45 is a perspective view showing a disc drive apparatus adaptable to the disc tray according to the fourth and fifth embodiments.

In a case of the disc drive apparatus 150 shown in FIG. 45, the disc tray 111 on the disc D has been placed can be loaded as it is on the receiving portion. The disc drive apparatus 150 shown in FIG. 45 is a so-called slot-in type disc drive apparatus in which the disc D is inserted into the receiving portion. In this case, the grip portion 114 is held by a user, and then the disc D is inserted into the receiving portion through the tray insertion opening 154 of the disc drive apparatus 150.

Figure 46A:
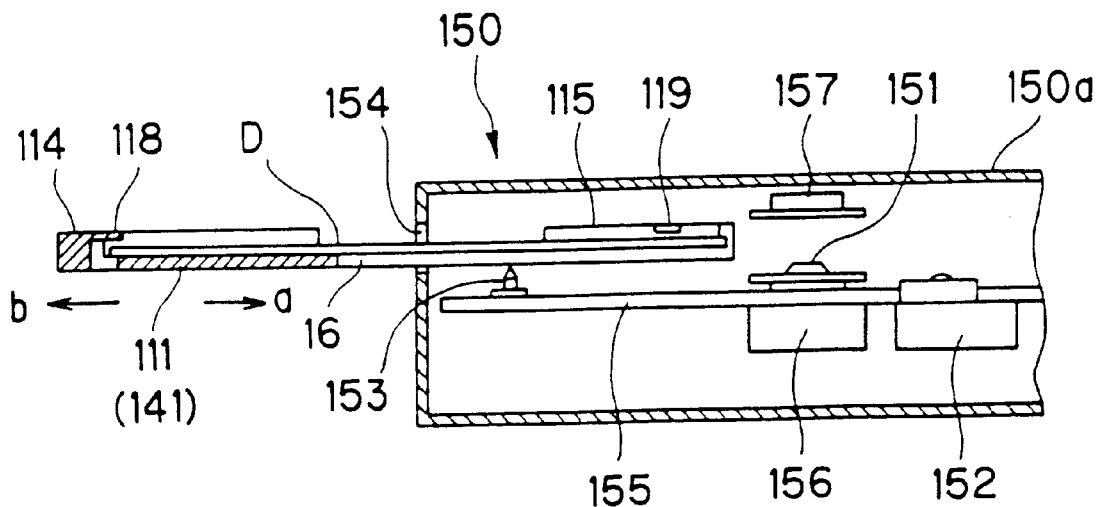
FIGS. 46A and 46B are cross sectional views of the side surface of the disc drive apparatus shown in FIG. 45 for illustrating the disc loading operation.
Figure 46B:
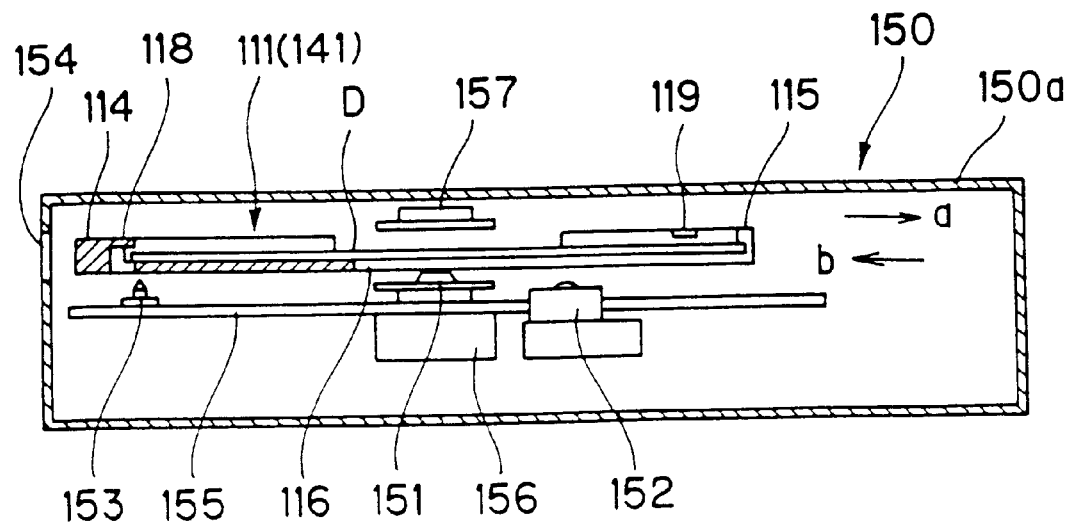
Figure 47:
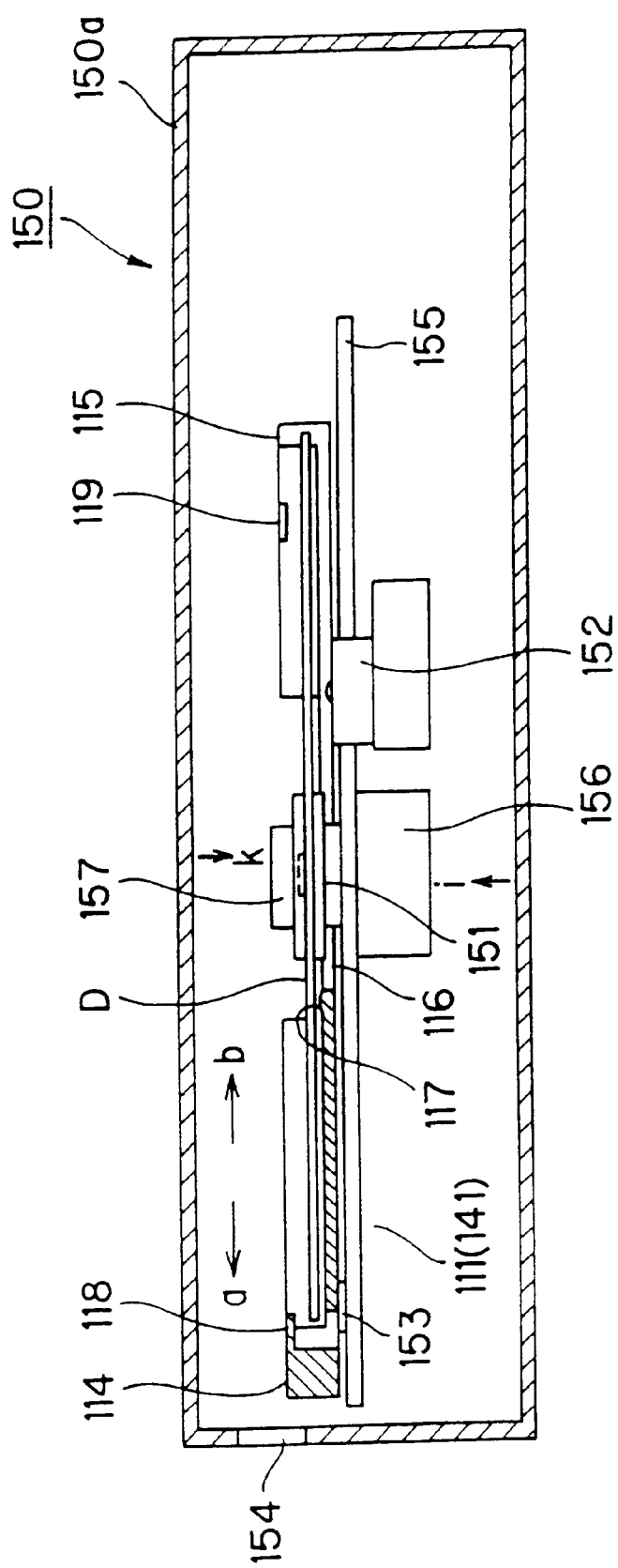
FIG. 47 is a cross sectional view showing a state in which the operation for loading the disc into the disc drive apparatus shown in FIG. 45 has been completed.

The disc drive apparatus 150 has, for example, as shown in FIGS. 46A, 46B and 47, has a case 150a which constitutes the apparatus body and which includes a base 155 mounted thereon. A spindle motor 156 forming a disc rotation mechanism for rotating the disc D is mounted on the base 155. A disc table 151 is secured to the rotational shaft of the spindle motor 156. The disc D is mounted on the disc table 151. Moreover, the case 150a of the disc drive apparatus 150 has a disc damper 157 disposed at a position opposite to the disc table 151 and arranged to rotatively hold the disc D. The disc damper 157 and the disc table 151 clamp the disc D so that the disc D is rotated.

An optical pickup 152 which is an example of a pickup for recording and/or reproducing data to and from the disc D is provided for the base 155. The optical pickup 152 is able to move in the radial direction of the loaded disc D so as to irradiate the signal recording surface of the disc D with light beams so as to record and/or reproduce information.

Moreover, a disc-tray receiving portion 155a is formed on the base 155. A pair of reference pins 153 for locating the position on which the disc tray 111 is mounted are joined to the disc-tray receiving portion 155a. The reference pins 153 are stood erect at positions corresponding to the pair of reference holes 120 of the disc tray 111. The leading end of each of the reference pins 153 is formed into a conical shape to facilitate the insertion operation.

The disc tray 111 is inserted into the disc drive apparatus 150 having the above-mentioned structure, as shown in FIGS. 46A and 46B. In the foregoing state, the disc D is held within the disc-receiving recess 112 of the disc tray 111 in such a manner that a certain play is imparted in both radial direction and the vertical direction. When the disc tray 111 has been inserted into a predetermined position, a loading mechanism (not shown) is operated so that the disc tray 111 is introduced into a predetermined position, as shown in FIG. 47.

As shown in FIG. 47, the loading mechanism downwards moves the disc tray 111 to a predetermined position. Then, the disc table 151 and the optical pickup 152 are introduced into the bottom opening 116 of the disc tray 111. Then, the tapered portion of the disc table 151 is introduced into the central hole d of the disc D. Moreover, the disc damper 157 is moved downwards so that the disc D is clamped between the disc damper 157 and the disc table 151. Thus, the operation for chucking the disc D is completed. The reference holes 120a and 120b of the disc tray 111 are received by the reference pins 153 so that the disc tray 111 is located.

In the foregoing case, the signal recording surface of the disc D has been raised by a small amount from the surface of the disc-receiving recess 112 for receiving the disc D. Thus, an appropriate gap is formed from each of the upper and lower surfaces of the disc D. Since an appropriate gap is formed in the radial direction of the disc D, the disc D can be rotated without any contact with the disc tray 111.

When the disc tray 111 is unloaded from the disc drive apparatus 150, the eject button 159 provided adjacent to the tray insertion opening 154 of the case 150a is depressed as shown in FIG. 45 to cause the loading mechanism to perform the discharge operation. The operation for discharging the disc tray 111 is performed in a retrograde order of the operation for loading the inserted disc D. When the grip portion 114 has been exposed from the tray insertion opening 154 of the disc drive apparatus 150, the grip portion 114 is held and pulled out. Thus, the disc tray 111 is removed from the disc drive apparatus 150.

A seventh embodiment of the disc tray and the disc accommodating apparatus according to the present invention will now be described with reference to FIGS. 48 to 51.

Since disc tray 161 according to this embodiment is a partial modification of the disc tray 111 according to the fourth embodiment, common elements are given the same reference numerals and the common elements are omitted from the description.

Figure 48:
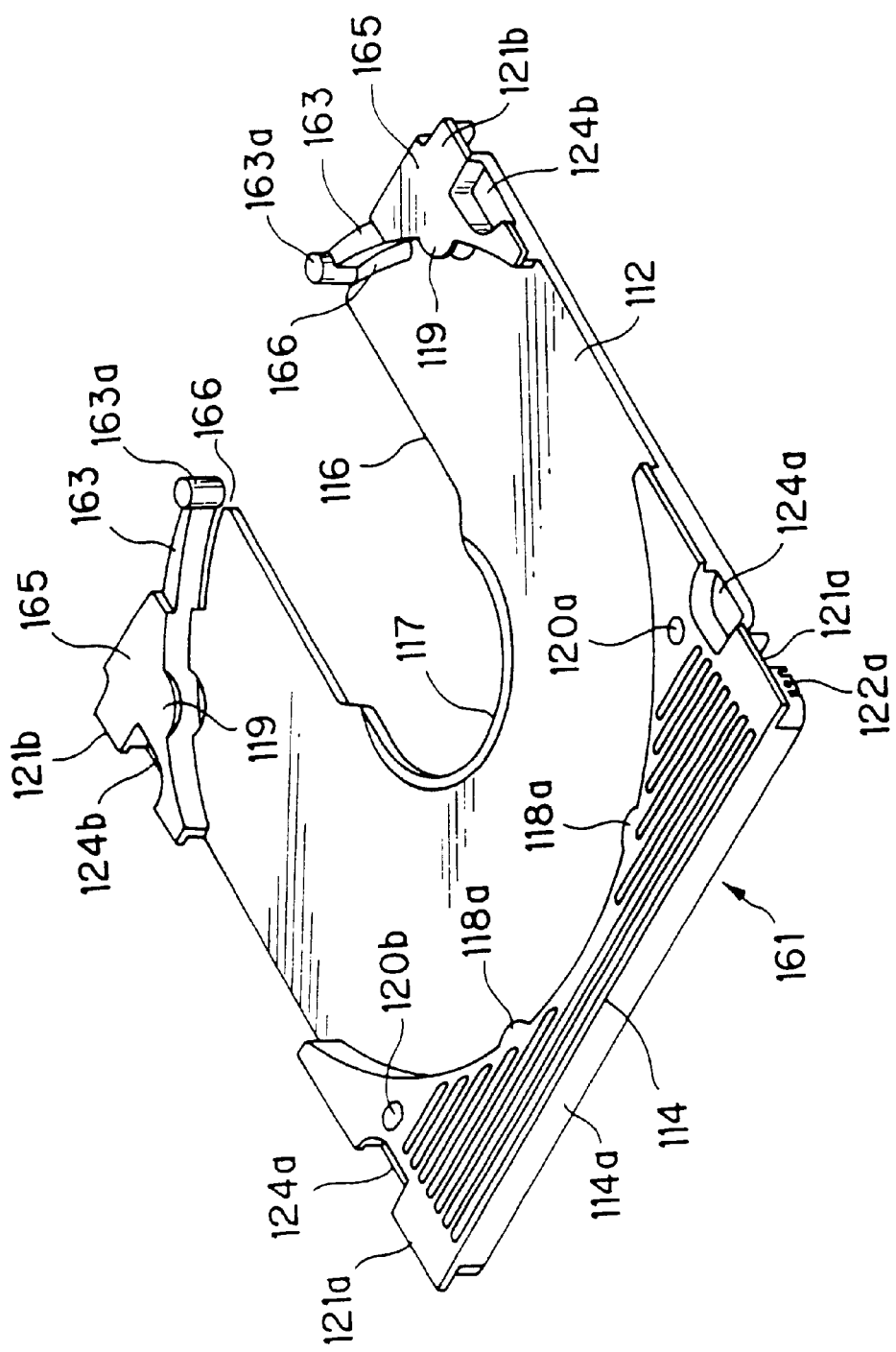
FIG. 48 is a perspective view showing a disc tray according to a seventh embodiment of the disc tray and the tray accommodating case according to the present invention.
Figure 49:
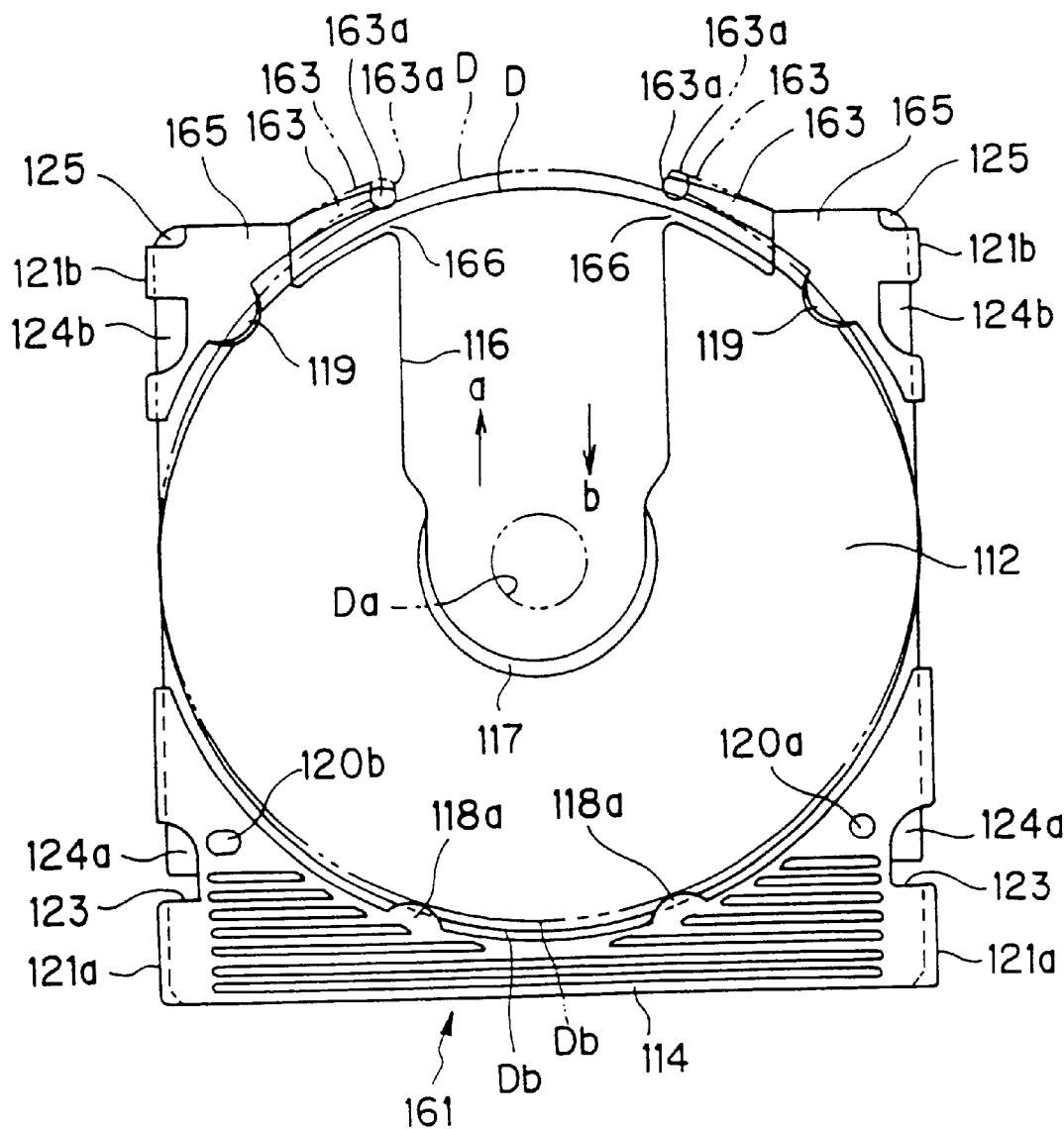
FIG. 49 is a plan view showing the disc tray shown in FIG. 48.

The disc tray 161 according to this embodiment has a pair of holding portions 115 each of which is provided with an elastic arm 163 which is a portion for pressing the front portion of a disc D. The elastic arms 163 is, as shown in FIGS. 48 and 49, formed in such a manner that slits 166 extend in the circumferential direction along the disc-receiving recess 112. Moreover, the thickness of the elastic arms 163 is reduced. Thus, elasticity is imparted to the elastic arms 163. Contact portions 163a which are brought into contact with the outer surface of the disc D are formed at the leading ends of the elastic arms 163.

On the other hand, the disc tray 161 having the elastic arms; 163 arranged to elastically be deformed enables the disc D to be removed. Therefore, the pair of the disc-separation-preventive projections 118 adjacent to the grip portion 114 are structured to have strong rigidity similarly to the pair of the disc-separation-preventive projections 119 adjacent to the holding portions 115.

The operation for mounting/removing the disc D to and from the disc tray 161 can be performed as follows. When the disc D is mounted on the disc tray 161, the longest-diameter portion and the central hole d of the disc D are held by the fingers so that the disc D is held. Then, the leading end of the disc D is inserted into a portion below the pair of the right and left disc-separation-preventive projections 119 of the disc-receiving recess 112 to bring the leading end of the disc D into contact with the right and left elastic arms 163. Then, the leading end of the disc D presses the contact portions 163a formed at the leading ends of the elastic arms 163, as shown in FIG. 49. Thus, the disc D is moved from a state indicated by a solid line to a state indicated by an alternate long and two short dashes line so as to outwards and elastically deform the right and left elastic arms 163.

Since the pair of the right and left disc-separation-preventive projections 118a provided for the grip portion 114 of the disc tray 161 have strong rigidity, insertion of the disc D is inhibited by the disc-separation-preventive projections 118a when the disc D is positioned at the position indicated by the solid line shown in FIG. 49. Therefore, the disc D cannot be introduced into the disc-receiving recess 112.

When the disc D has been moved to the position indicated by the alternate long and two short dashes line and thus the elastic arms 163 have been elastically deformed, the rear end of the disc D is moved to the position on the inside of the disc-separation-preventive projections 18a. Therefore, the disc D is able to pass through the disc-separation-preventive projections 118a. Thus, the rear end of the disc D is caused to pass through the disc-separation-preventive projections 118 so that the disc D is held within the disc-receiving recess 112.

When the disc D has been accommodated in the disc-receiving recess 112, gaps each having a certain size in the radial direction of the disc D are formed as indicated with the solid line shown in FIG. 49. Moreover, gaps each having a certain size are as well as formed in the vertical direction of the surfaces of the disc D. Therefore, even after the disc tray 161 has been loaded into the disc drive apparatus 150, the disc D can freely be rotated at the loaded position without the elastic deformation of the elastic arms 163. That is, the disc D is not brought into contact with the contact portions 163a of the elastic arms 163 and the disc-separation-preventive projections 118a and 119.

When the disc D is unloaded from the disc tray 161, an operation in a retrograde order of the above-mentioned inserting operation is performed. That is, the disc D is held and moved toward the elastic arms 163 so as to be brought into contact with the contact portions 163a. Thus, the elastic arms 163 are elastically deformed. Moreover, the rear end of the disc D is allowed to pass through the disc-separation-preventive projections 118a. Then, the disc D is returned toward the grip portion 114 and extracted so that the disc D is unloaded from the disc tray 161.

When the disc tray 161 is accommodated in the foregoing tray accommodating case 130, an operation similar to the foregoing operation for accommodating the disc tray 111 is performed. That is, the grip portion 114 of the disc tray 161 is held and the leading holding portion 165 is inserted into the case body 131 of the tray accommodating case 130. Then, the grip portion 114 is inserted into the case body 131. As a result, the disc tray 161 can be accommodated in the tray accommodating case 130.

Figure 50:
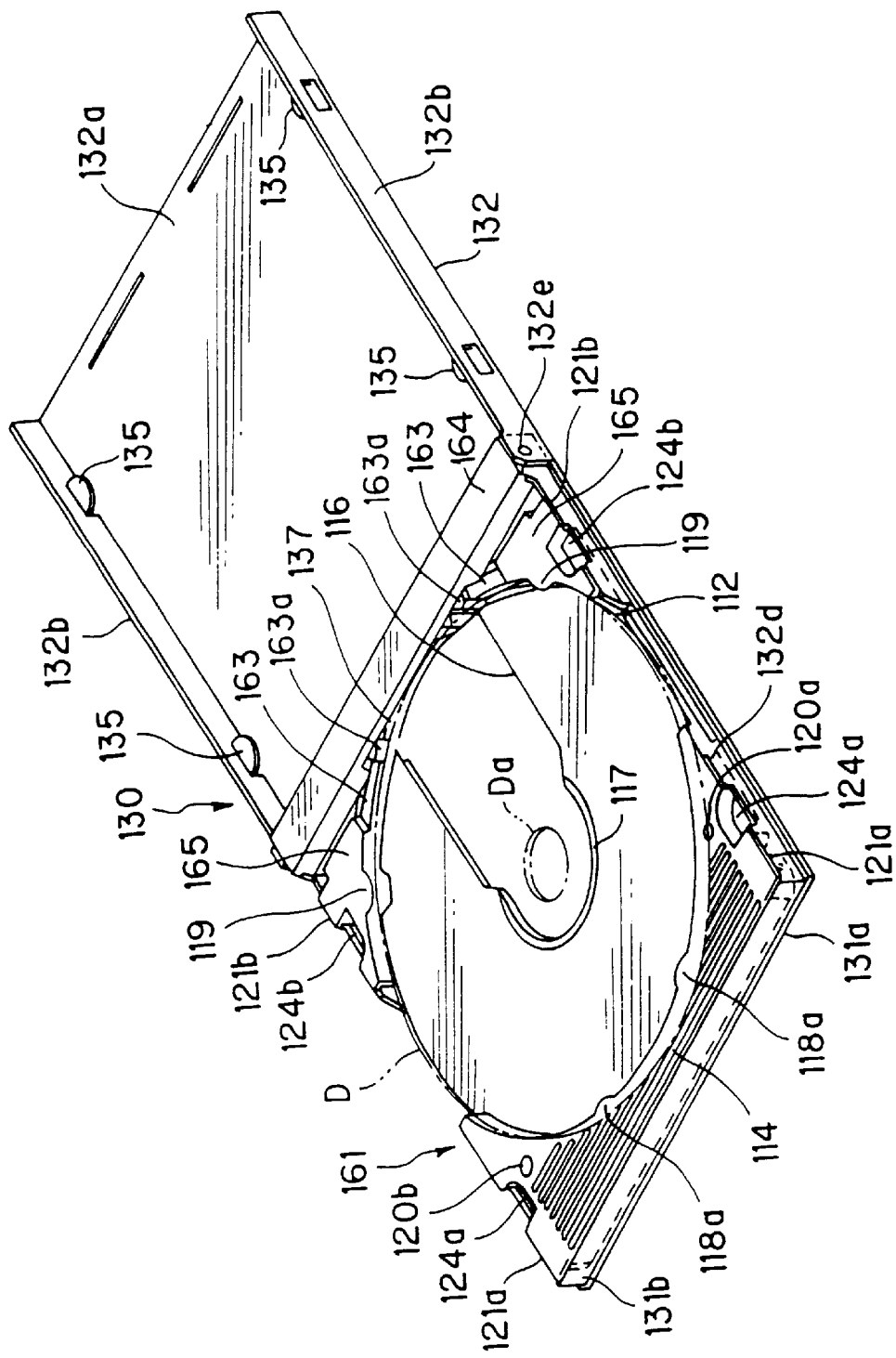
FIG. 50 is a perspective view showing a tray accommodating case according to the seventh embodiment of the disc tray and the tray accommodating case according to the present invention.
Figure 51:
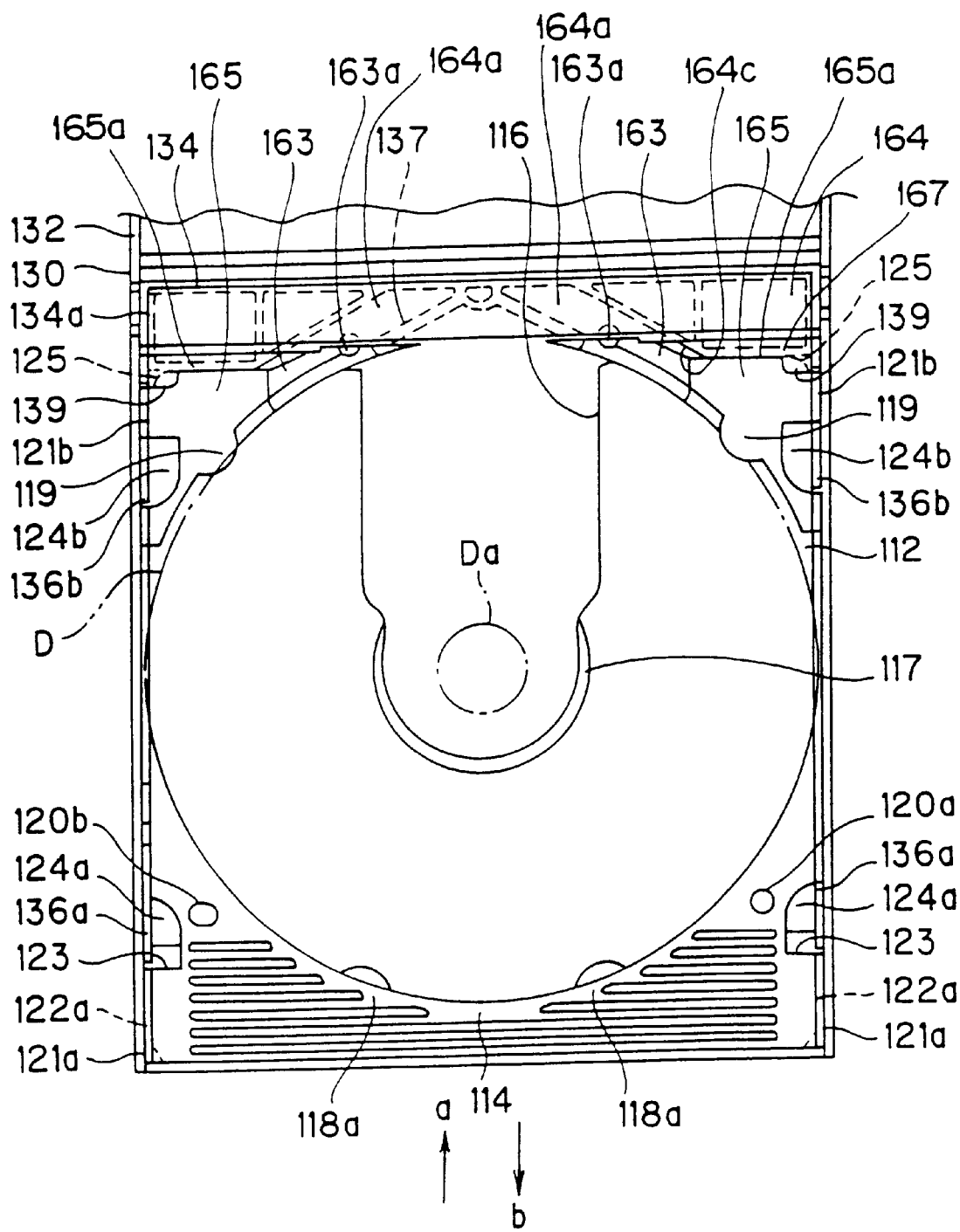
FIG. 51 is a plan view showing an essential portion of the tray accommodating case shown in FIG. 50.

In this case, similarly to the fourth embodiment, the leading end of the disc pressing member 137 is brought into contact with the outer surface of the disc D, as shown in FIGS. 50 and 51. The urging force of the disc pressing member 137 causes the other outer end of the disc D to be pressed against the inner surface of the grip portion 114. As a result, the disc D can be held in the tray accommodating case 130 in a state in which looseness of the disc D in the radial direction can be absorbed.

The pair of the elastic arms 163 provided for the leading end of the disc tray 161 are inserted into the recesses 164a formed on the outsides of the disc pressing member 137 in the central portion of the intermediate case 164. Thus, contact of the leading end contact portions 163a with the intermediate case 164 is prevented.

The front surface of each of the holding portions 165 of the disc tray 161 is formed into a parallel surface 165a extending in the widthwise direction of the disc tray 161. The support portions 164c of the intermediate case 164 have elastic members 167 at positions corresponding to the parallel surfaces 165a. Each of the elastic members 167 has a projection 167a. The projection 167a is brought into contact with the parallel surface 165a of the holding portion 165 of the disc tray 161. The urging force of the elastic members 167 absorbs looseness of the disc tray 161 with respect to the tray accommodating case 130.

The operation for unloading the disc tray 161 from the tray accommodating case 130 is performed similarly to that for the disc tray 111. Moreover, the disc tray 161 can be accommodated in the foregoing tray accommodating case 142 similarly to the disc tray 111. In addition, the operation for unloading the disc tray 161 can be performed similarly. A loading operation into the disc drive apparatus 150 can be performed similarly and unloading from the disc drive apparatus 150 can easily be performed.

An eighth embodiment of the disc tray and the disc accommodating apparatus according to the present invention will now be described with reference to FIGS. 52 and 53.

A tray accommodating case 170 according to this embodiment is a partial modification of the tray accommodating case 130 according to the fourth embodiment. Common elements are given the same reference numerals and common elements are omitted from description.

Figure 52:
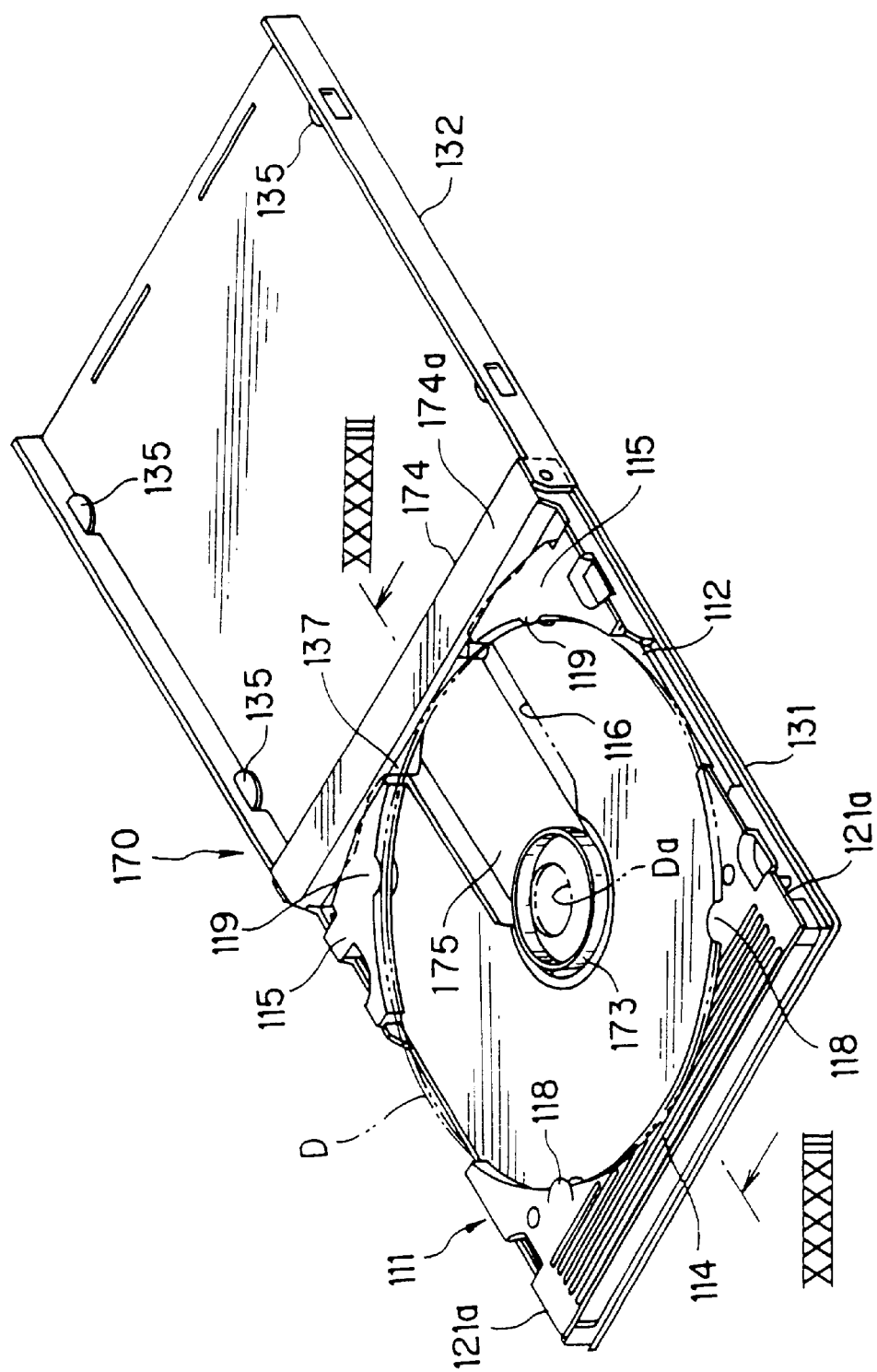
FIG. 52 is a perspective view showing an eighth embodiment of the tray accommodating case according to the present invention.
Figure 53:
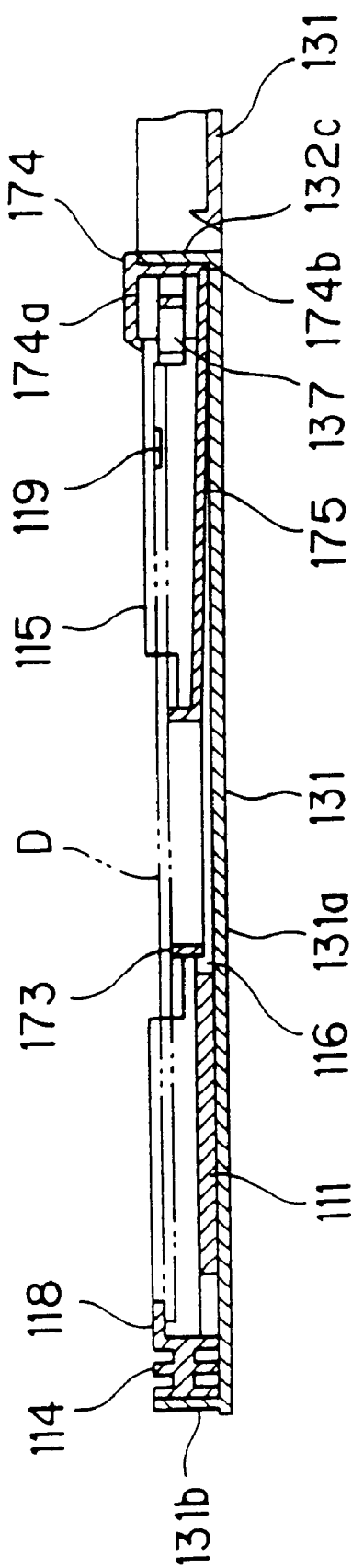
FIG. 53 is a cross sectional view showing the tray accommodating case shown in FIG. 52 and taken along line XXXXXIII—XXXXXIII.

The tray accommodating case 170 according to this embodiment, as show in FIGS. 52 and 53, comprises a cylindrical support member 173 on which the disc D is mounted. The cylindrical support member 173 is formed integrally with an intermediate case 174 of the tray accommodating case 170. The cylindrical support member 173 is composed of an annular member for supporting the disc D from a lower position, the cylindrical support member 173 being connected to the intermediate case 174 by dint of a plate-like connection member 175.

An end of the plate-like connection member 175 is connected to the lower end of a rear member 174b continued from an upper member 174a of the intermediate case 174, as shown in FIG. 53. The cylindrical support member 173 is connected to another end of the plate-like connection member 175 in the central portion of the case body 131. The cylindrical support member 173 is arranged to slightly float above the receiving surface of the case body 131 in a free state. As a result, upward urging force can be generated in a state in which the case is closed so that the placed disc D is urged toward the case body 132. Thus, vertical looseness can be absorbed.

A ninth embodiment of the disc tray and the disc accommodating apparatus according to the present invention will now be described with reference to FIGS. 54 to 58.

Figure 54:
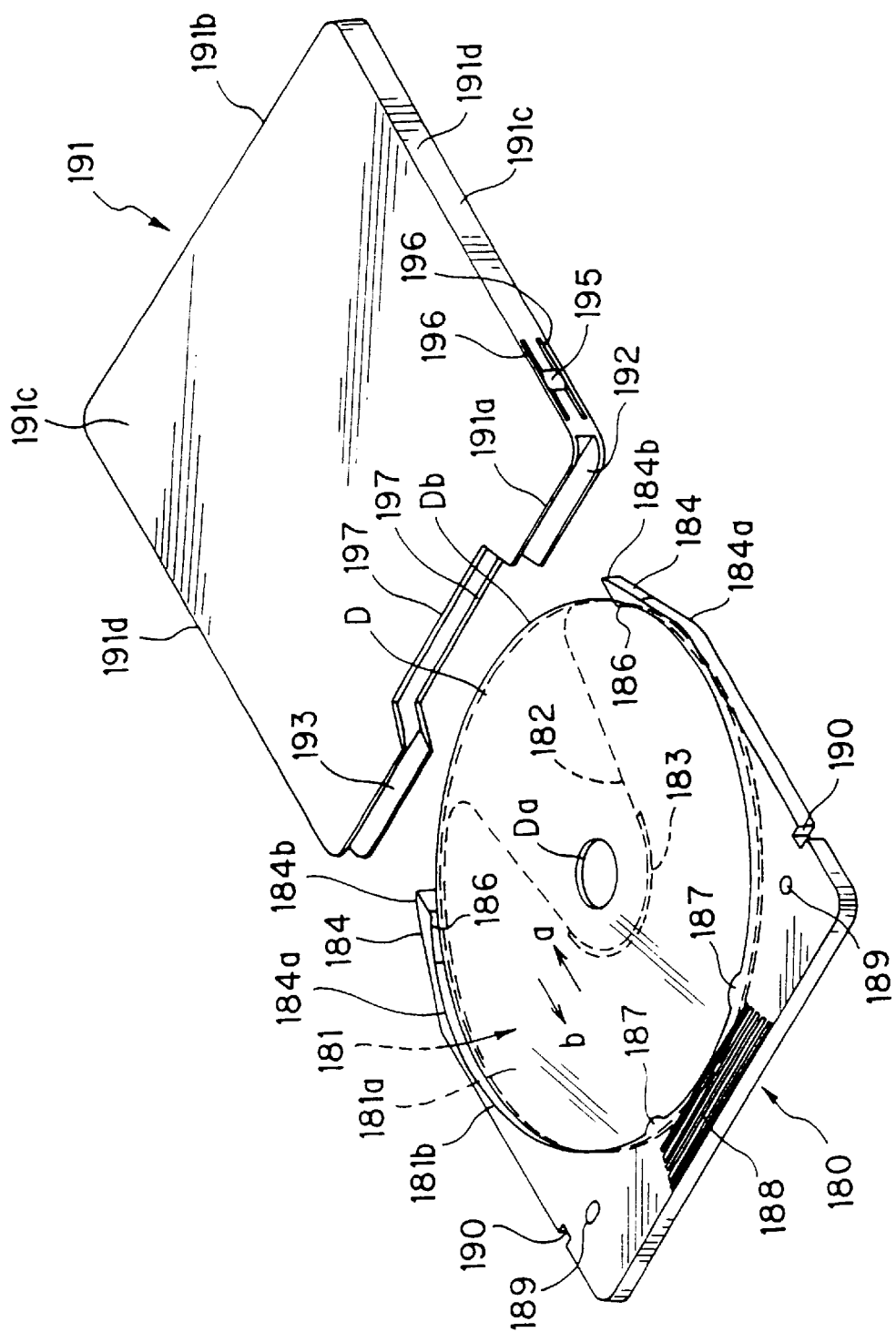
FIG. 54 is a perspective view showing a ninth embodiment of the disc tray and the tray accommodating case according to the present invention.
Figure 55:
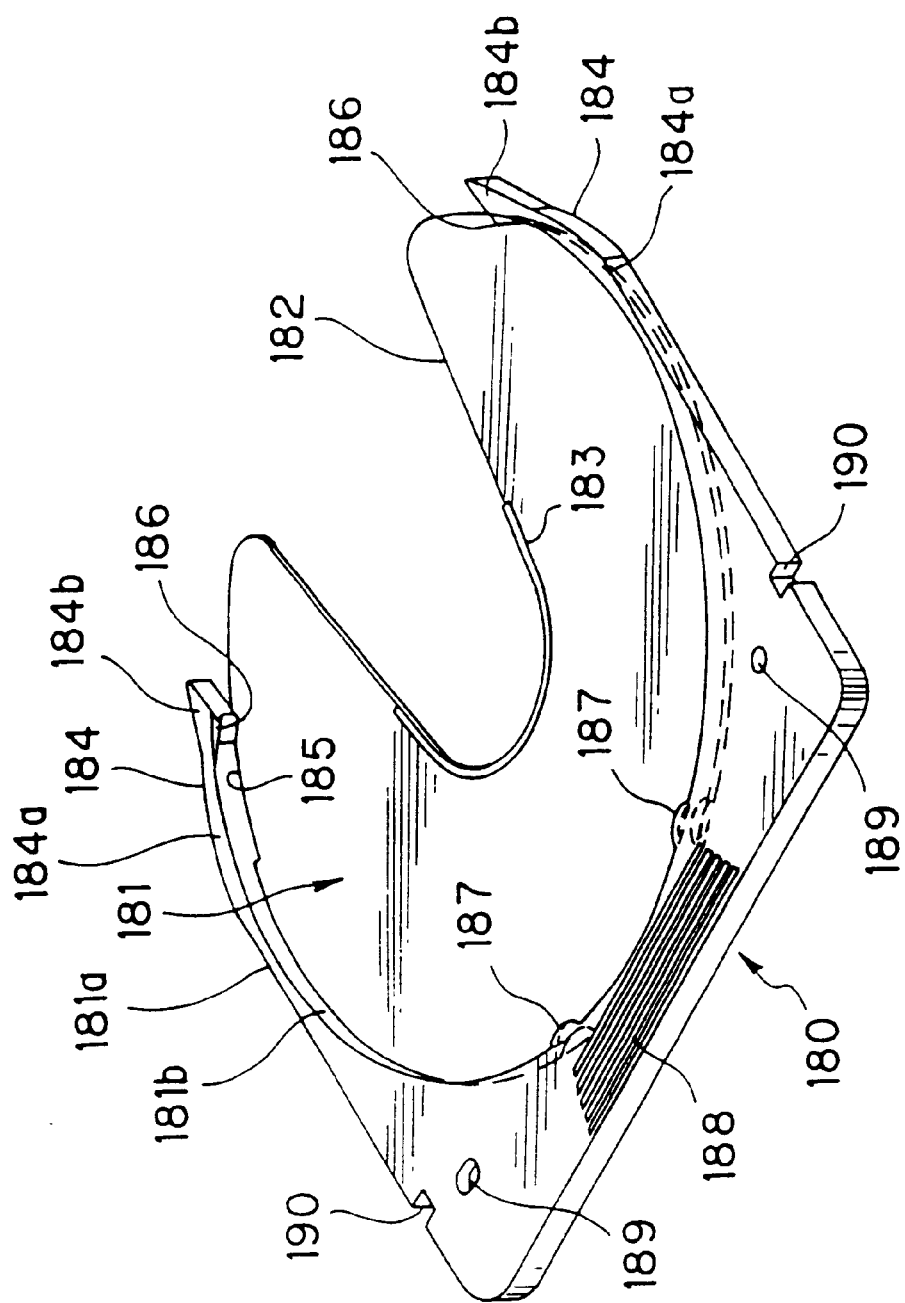
FIG. 55 is a perspective view showing the disc tray shown in FIG. 54.

The disc tray 180 according to this embodiment is, as shown in FIGS. 54 and 55, formed into a thin plate-like shape. In the central portion of the disc tray 180, a disc-receiving recess 181 is formed into a substantially circular shape having an opened upper portion. A bottom opening 182 is formed in a range from substantially the central portion of a bottom portion 181a to a front end 180a which is first inserted into the disc drive apparatus, the button opening 182 being formed along central line $P_1$ in the widthwise direction which is the horizontal direction of FIG. 56. Moreover, a disc support portion 183 in the form of s semicircular rib is formed integrally with substantially the central portion of the upper surface of the bottom portion 181a, the disc support portion 183 being formed along the button opening 182. Note that the diameter and depth of the disc-receiving recess 181 are made to be somewhat larger than the diameter and thickness of the disc D.

Figure 56:
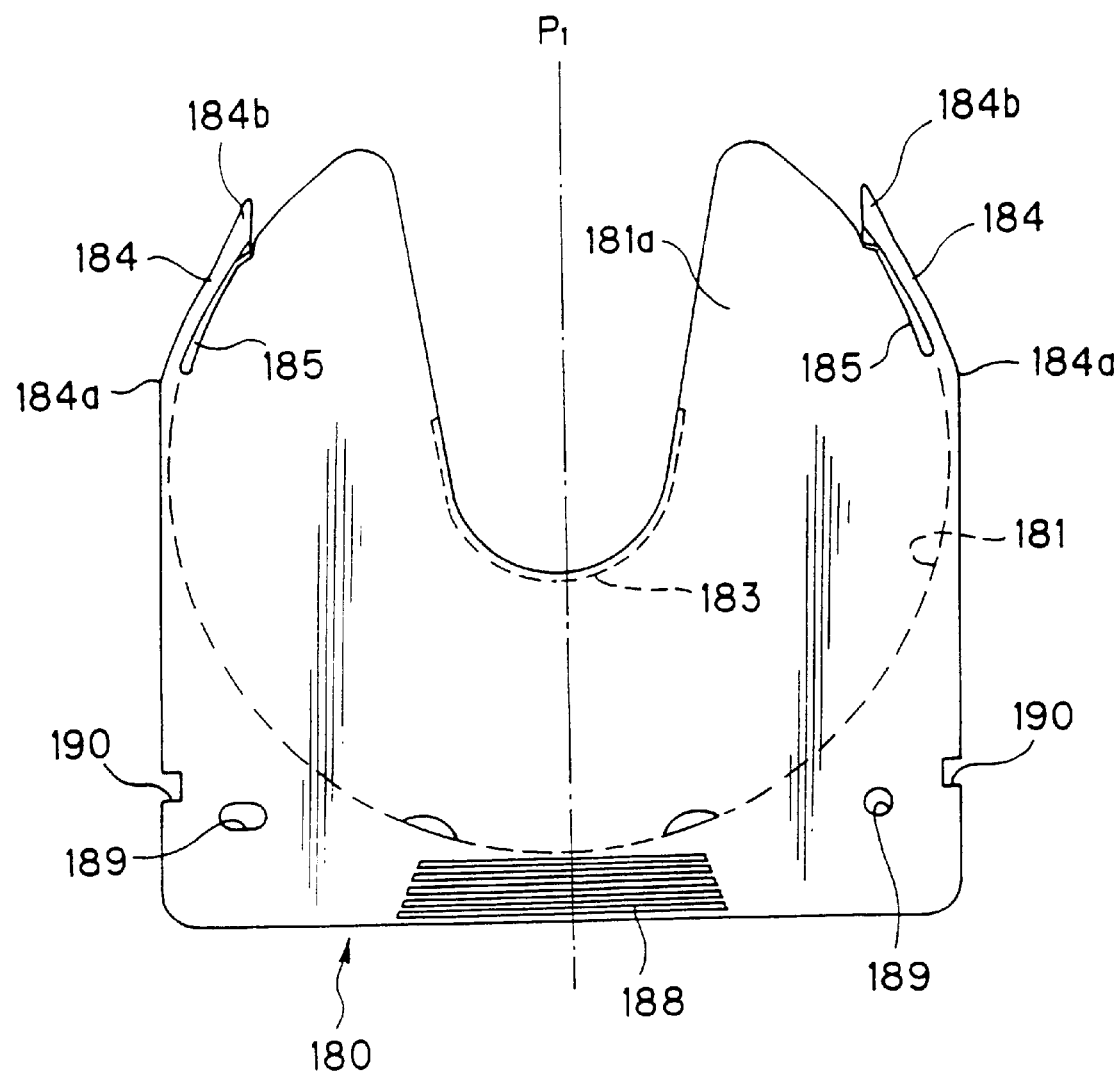
FIG. 56 is a bottom view showing the disc tray shown in FIG. 54.

As shown in FIGS. 55 and 56, a pair of right and left symmetrical and circular-arc elastic holding portions 184 are formed integrally with the right and left portions of the disc-receiving recess 181 in the front portion of the disc tray 180, the elastic holding portions 184 being formed along the disc-receiving recess 181. The pair of the right and left elastic holding portions 184 are, as shown in FIG. 56, separated from the bottom portion 181a by symmetrical and circular-arc slits 185. Bases 184a in the rear of the pair of the right and left elastic holding portions 184 are connected integrally with the disc tray 180. Each of the leading ends 184b of the pair of the right and left elastic holding portions 184 is formed into substantially a triangular shape. The inside portions of the leading ends 184b are introduced into the inside portion of the inner surface 181b of the disc-receiving recess 181.

Two pairs of right and left, that is, four thin disc-separation-preventive projections 186 and 187 are formed in the two inner portions of the disc-receiving recess 181 and in the inner portions of the leading ends 184a of the pair of the right and left elastic holding portions 184, the disc-separation-preventive projections 186 and 187 being formed at the upper edges of the disc-receiving recess 181 and the elastic holding portions 184 to be flush with the upper surface of the disc tray 180. The diameter of an inscribed circle which is in contact with the inner portions of the four disc-separation-preventive projections 186 and 187 is smaller than the diameter of the disc D. Also the gap from the lower surfaces of the four disc-separation-preventive projections 186 and 187 and the bottom portion 181*a* is larger than the thickness of the disc D.

A grip portion 188 having non-slip knurls is formed in the central portion of the upper and lower surfaces of the rear portion of the disc tray 180. A pair of right and left reference holes 189 consisting of a complete round hole and an oblong hole are formed in the rear ends 180*b* of the disc tray 180, the reference holes 189 being formed to vertically penetrate the disc tray 180. A pair of right and left engagement recesses 190 are formed in the right and left portions of the rear portion of the disc tray 180.

Figure 57:
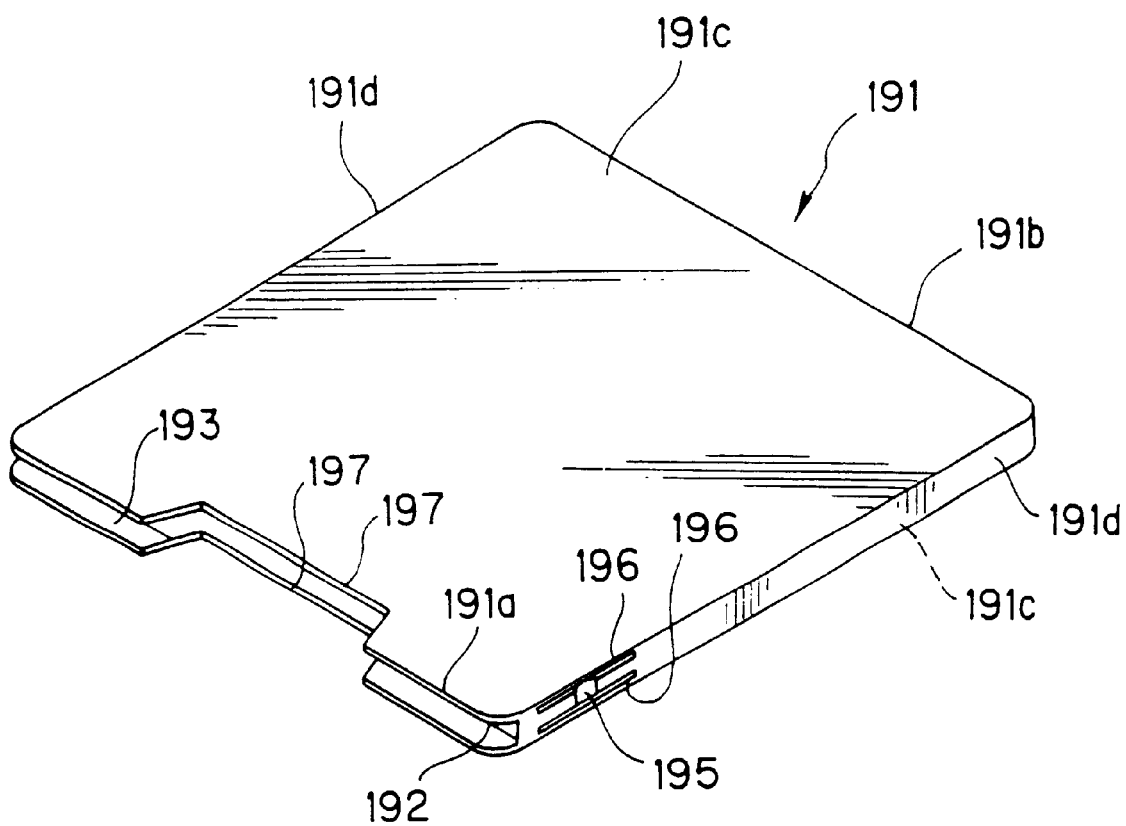
FIG. 57 is a perspective view showing the tray accommodating case shown in FIG. 54.
Figure 58:
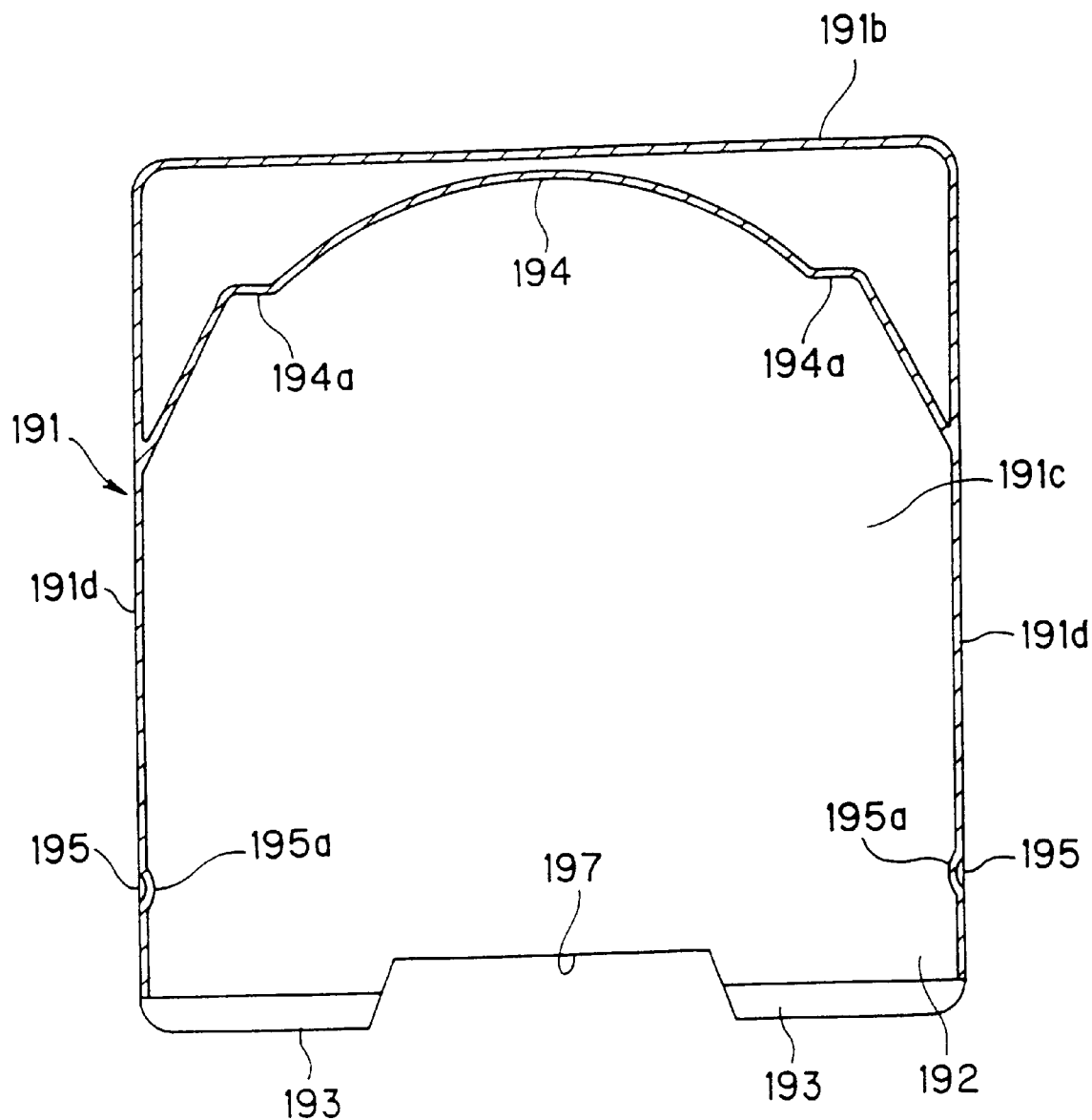
FIG. 58 is a partially-cut plan view showing the tray accommodating case shown in FIG. 57.

As shown in FIGS. 57 and 58, the flat tray accommodating case 191 according to the ninth embodiment and having rectangular-like shape has a slit-like opening 192 elongated horizontally in the widthwise direction of the tray accommodating case 191, the opening 192 being formed in a front surface 191*a* thereof. A rear surface 191*b*, upper and lower surfaces 191*c* and right and left surfaces 191*d* are closed so that a cylindrical shape is formed. Tapered surfaces 193 are provided for the upper and lower inner surfaces of the opening 192 of the tray accommodating case 191. A substantially circular-arc inner wall 194 having elasticity is integrally formed at a position deviated to the rear end in the inside portion the tray accommodating case 191. Contact portions 194*a*, with which the leading ends 184*b* of the pair of the right and left elastic holding portions 184 of the disc tray 180 are brought into contact, are formed on the right and left sides of the inner wall 194.

A pair of right and left tray engagement members 195 having elasticity are integrally provided for the right and left surfaces 191*d* of the tray accommodating case 191. Moreover, slits 196 are formed above and below the tray engagement members 195. A circular-arc engagement projection 195*a* formed in the central portion of each of the tray engagement members 195 is allowed to project into the inside portion of the tray accommodating case 191. Moreover, a cut portion 197 is formed in the central portion of the front end of the upper and lower surfaces 191*c* of the tray accommodating case 191.

The ninth embodiment is structured as described above. When the disc D is detachably placed within the disc-receiving recess 181 of the disc tray 180, the index finger is inserted into the central hole Da of the disc D. Moreover, a portion of the outer portion Db of the disc D is held by the thumb. Then, the leading end of the disc D opposite to the held portion of the outer portion Db of the disc D is diagonally inserted into a position below the pair of the right and left disc-separation-preventive projections 187. Thus, the leading ends 184*b* of the pair of the right and left elastic holding portions 184 are elastically deformed to be expanded outwards by the portion of the disc D. Then, the inside portion of the disc-separation-preventive projections 186 opposite to the outer portion Db of the disc D inserted into the elastic holding portions 184 is horizontally inserted into the disc-receiving recess 181. Then, the non-signal-recording region on the outside of the central hole Da of the disc D is horizontally placed on the disc support portion 183. Then, the fingers are released from the inserted disc D.

As a result, the pair of the right and left elastic holding portions 184 expanded toward the outside are elastically restored toward the inside portion. The leading ends 184*b* of the elastic holding portions 184 press the outer portion Db of the disc D in the direction indicated by an arrow b shown in FIG. 54. Thus, the outer portion Db of the disc D is elastically pressed by the rear end (the rear end 180*b* of the disc tray 180) of the inner portion of the disc-receiving recess 181. As a result, the disc D can elastically and horizontally be held from both front portion and the rear portion by dint of the elastic force of the pair of the right and left elastic holding portions 184. At this time, the disc D has been placed on the disc support portion 183 and the signal recording surface which is the lower surface of the disc D is allowed to slightly float from the bottom portion 181*a* of the disc-receiving recess 181. Therefore, the signal recording surface can completely be protected from score marks.

When the disc D is elastically held in the disc-receiving recess 181 by the pair of the right and left elastic holding portions 184, separation of the disc D attributable to the deadweight can be prevented even if the disc tray 180 is turned upside down. Thus, the disc tray 180 can significantly easily be handled in the following operations.

If the force of the pair of the right and left elastic holding portions 184 for holding the disc D is unsatisfactorily weak, separation of the disc D from the disc-receiving recess 181 can be prevented by the disc-separation-preventive projections 186 and 187. The reason for this lies in that the four disc-separation-preventive projections 186 and 187 overlap the four portions of the outer portion Db of the disc D inserted into the disc-receiving recess 181 as shown in FIG. 55.

When the disc D is unloaded from the disc-receiving recess 181 of the disc tray 180, the index finger is inserted into the central hole Da of the disc D. Then, a retrograde-order operation to the operation for inserting the disc D is performed. That is, the outer portion Db of the disc D is removed from the inside portion of the pair of the right and left disc-separation-preventive projections 186 while the pair of the right and left elastic holding portions 184 are expanded toward the outside by the outer portion Db of the disc D. Then, the outer portion disc D of the disc D is required to diagonally be pulled out of the lower portion of the pair of the right and left disc-separation-preventive projections 187. As described above, the disc D can easily be loaded/unloaded with respect to the disc tray 180.

When the disc tray 180 is horizontally inserted into the tray accommodating case. 191 while the disc D is horizontally held in the disc-receiving recess 181 of the disc tray 180, the grip portion 188 of the rear end 180*b* of the disc tray 180 is held. Then, the disc tray 180 is horizontally inserted into the opening 192 of the tray accommodating case 191 through the pair of the right and left elastic holding portions 184 in a direction indicated by the arrow a shown in FIG. 54.

At this time, the tapered surfaces 193 formed on both the upper and lower inside surfaces in the opening 192 enables the disc tray 180 to smoothly be inserted into the tray accommodating case 191 through the opening 192 in the direction indicated by the arrow a shown in FIG. 54.

When the disc tray 180 has completely be inserted into the tray accommodating case 191 in the direction indicated by the arrow a shown in FIG. 54, the outer portion Db of the disc D is brought into contact with the central portion of the inner wall 194 in the tray accommodating case 191. Moreover, the leading ends 184*b* of the pair of the right and left elastic holding portions 184 are brought into contact with the pair of the right and left contact portions 194*a*. Moreover, the engagement projections 195*a* of the pair of the right and left tray engagement members 195 are engaged to the pair of the right and left engagement recesses 190 of the disc tray 180 against the elasticity. Thus, both of the disc tray 180 and the disc D are located and accommodated within the tray accommodating case 191 without any looseness. Then, the opening 192 of the tray accommodating case 191 is closed by the rear end 180*b* of the disc tray 180.

When the disc tray 180 is removed from the tray accommodating case 191, the finger is inserted into the cut portion 197 of the tray accommodating case 191 to hold the grip portion 188 of the disc tray 180. Then, the disc tray 180 is removed to the outside portion of the tray accommodating case 191 through the opening 192. Therefore, the operation for removing the disc tray 180 from the tray accommodating case 191 can easily be performed.

A disc drive apparatus 201 using the disc tray 180 according to the ninth embodiment when the disc D, such as an optical disc or a magneto-optical disc, is loaded will now be described with reference to FIGS. 59 to 63B.

Figure 59:
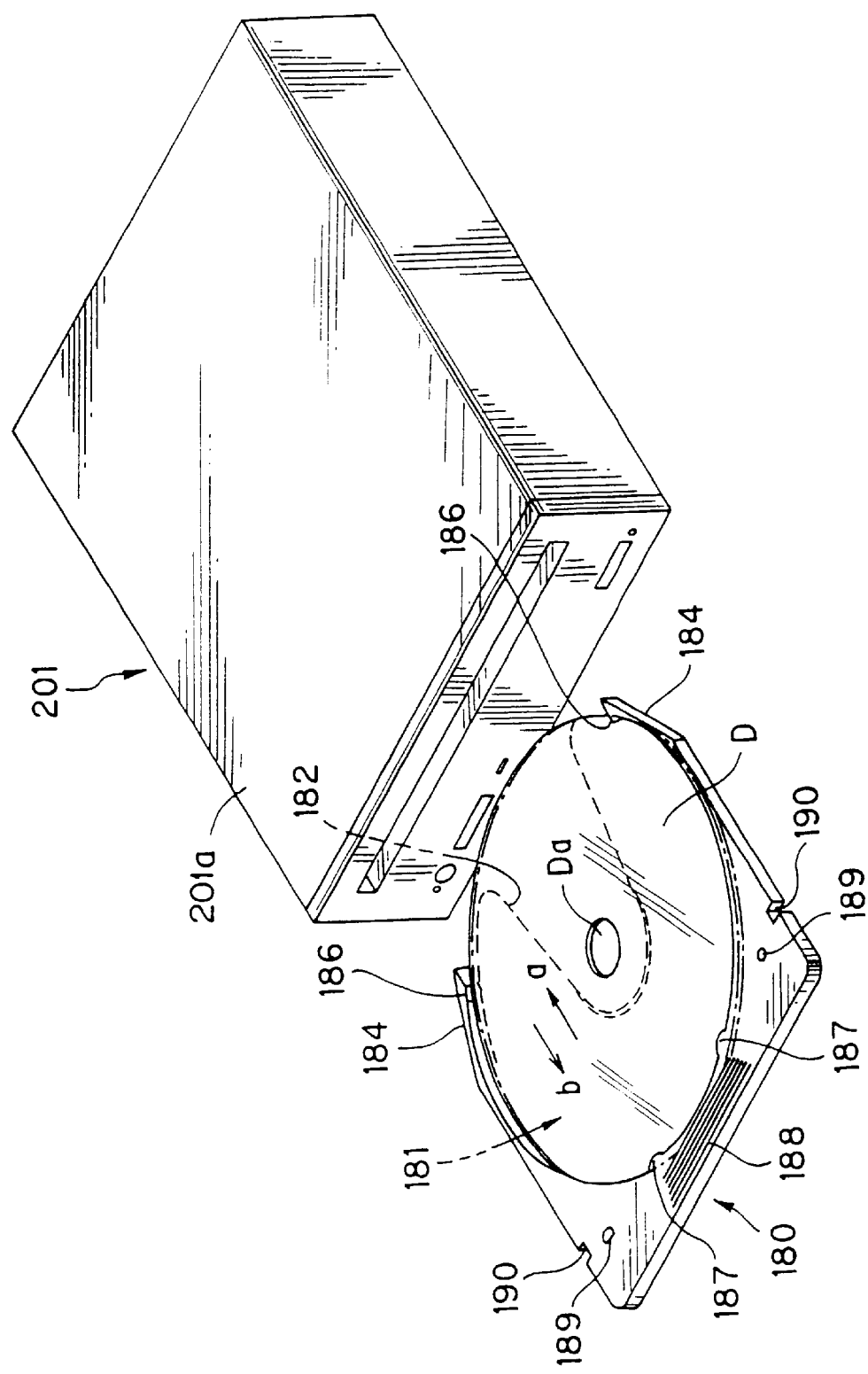
FIG. 59 is a perspective view showing a disc drive apparatus adaptable to the disc tray according to a ninth embodiment.
Figure 60:
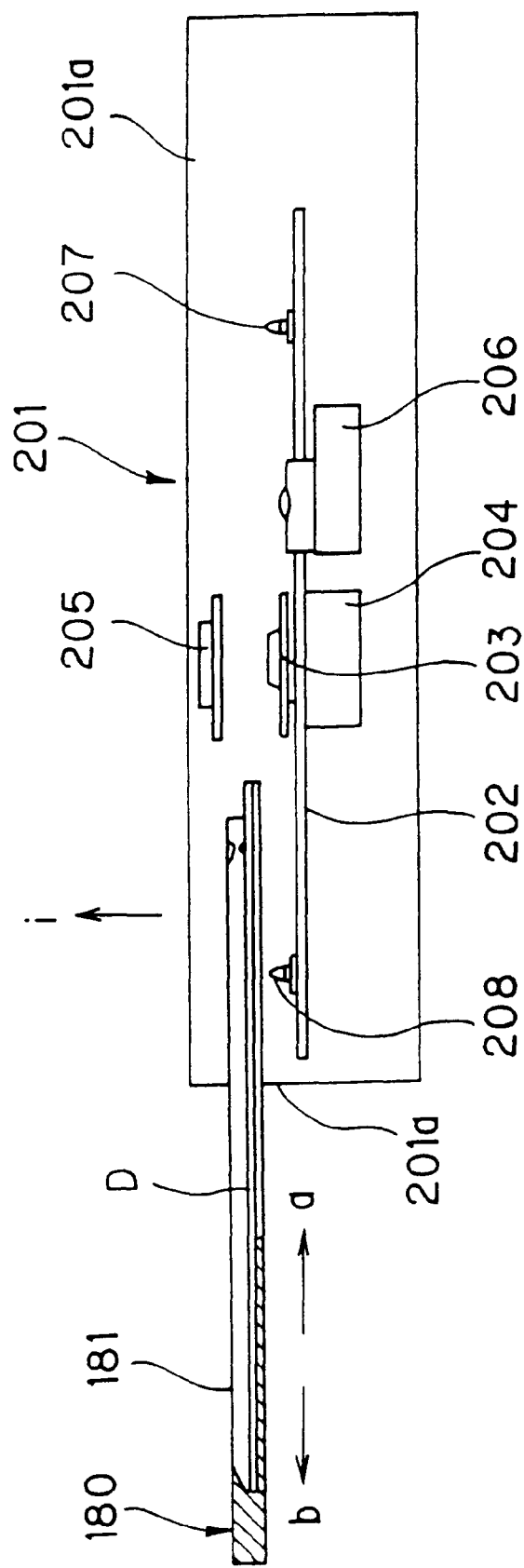
FIG. 60 is a schematic vertical cross sectional view showing start of the operation for loading a disc into the disc drive apparatus shown in FIG. 59.

As shown in FIG. 59, the disc drive apparatus 201 has a case 201 forming the apparatus body. As shown in FIG. 60, the case 201 has a structure that a base 202 is accommodated in a case 201 a forming the apparatus body. The base 202 is provided with a disc table 203 for rotating the disc D, a spindle motor 204 forming a disc rotating mechanism for rotating the disc table 203 and the like. Moreover, the case 201a accommodates a disc damper 205 for rotatively holding the disc D, the disc damper 205 being disposed at a position opposite to the disc table 203. Moreover, an optical pickup 206 for recording/reproducing data is provided.

Figure 61A:
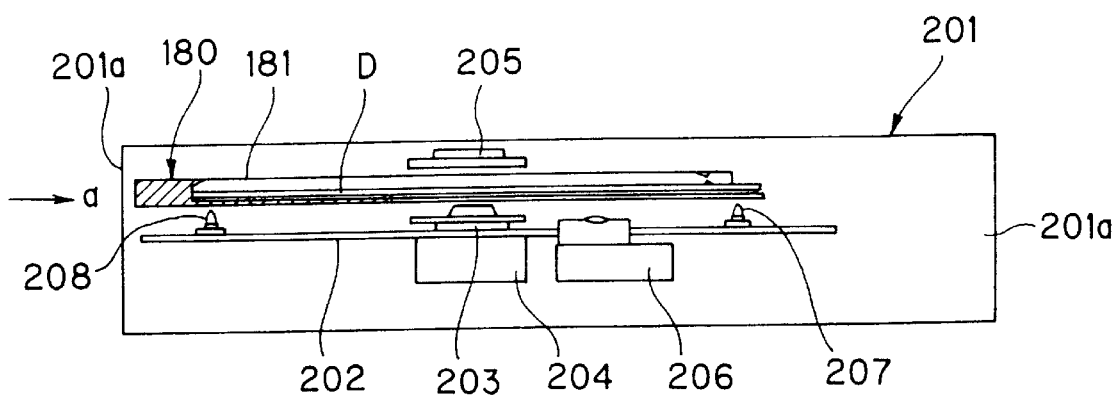
FIGS. 61A and 61B are schematic vertical cross sectional views showing the sequential order of the operation for loading a disc into the disc drive apparatus shown in FIG. 59.
Figure 61B:
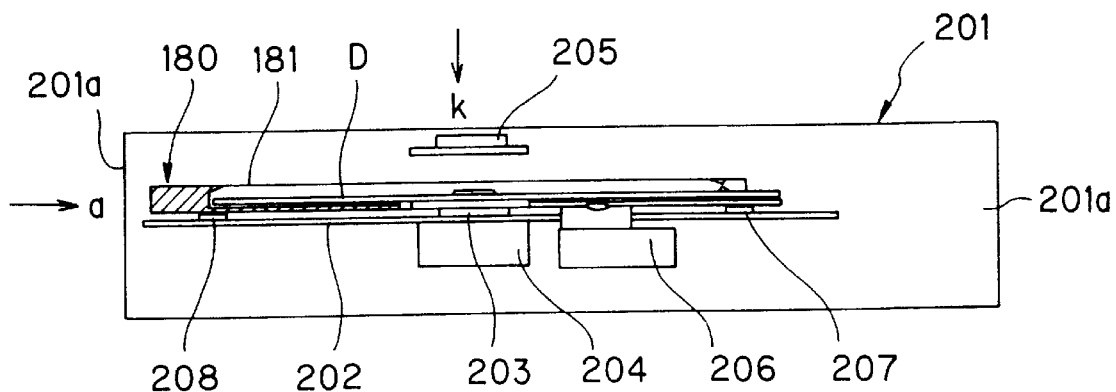

As shown in FIGS. 60, 61A and 61B, the disc drive apparatus 201 has a structure that a pair of right and left disc release pins 207 for opening the disc D held on the disc tray 180 are stood erect on the surface of the base 202 at positions corresponding to the pair of the right and left elastic holding portions 184. Moreover, the disc drive apparatus 201 has a structure that a pair of right and left reference pins 208 for locating the disc tray 180 are stood erect over the surface of the base 202 at positions corresponding to the pair of the right and left reference holes 189 of the disc tray 180. Each of the disc release pins 207 and reference pins 208 is formed into a conical shape.

As shown in FIGS. 60, 61A and 61B, when the disc tray 180 has been inserted into the case 201a of the disc drive apparatus 201, the pair of the right and left reference pins 208 are received by the pair of the right and left reference holes 189. Thus, the disc tray 180 can easily and reliably be located to a predetermined position. Moreover, the pair of the right and left disc release pins 207 open the disc D held on the disc tray 180 so that rotations of the disc D in the disc-receiving recess 181 are permitted.

Figure 62:
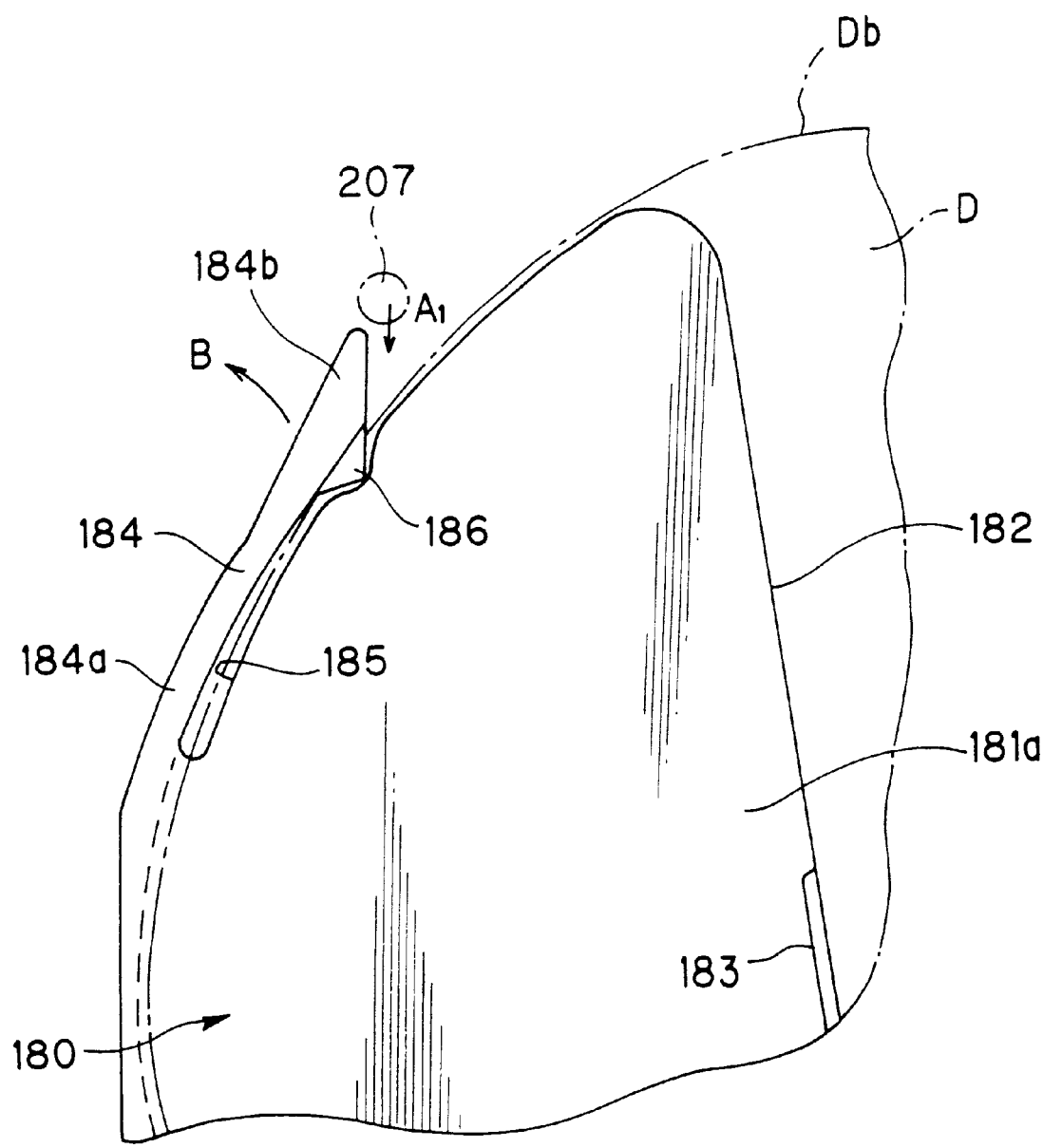
FIG. 62 is an enlarged bottom view showing an elastically-holding portion of the disc tray of the disc drive apparatus shown in FIG. 59.
Figure 63A:
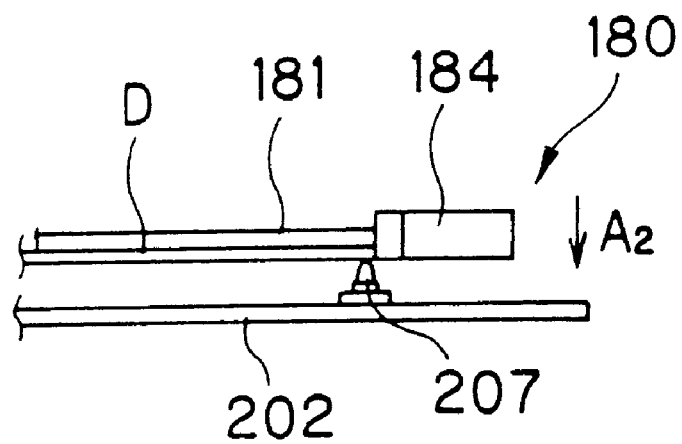
FIGS. 63A and 63B are schematic side views showing an essential portion of the operation for opening the elastically-holding portion.
Figure 63B:
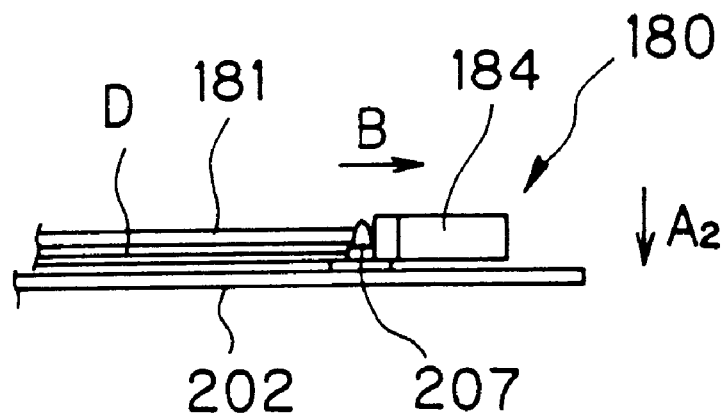

That is, as shown in FIG. 62, when the disc tray 180 has been loaded into the case 201a of the disc drive apparatus 201, the pair of the right and left disc release pins 207 are relatively introduced in a direction indicated by an arrow $A_1$ shown in FIG. 62 so as to be located at a portion below the leading ends 184b of the pair of the right and left elastic holding portions 184. Then, the disc tray 180 is moved in a direction indicated by an arrow $A_2$ shown in FIGS. 63A and 63B. Thus, loading into the tray receiving portion is completed. In synchronization with the movement of the disc tray 180 in the direction indicated by the arrow $A_2$ shown in FIGS. 63A and 63B, the leading ends of the pair of the right and left disc release pins 207 are brought into contact with the side surfaces on the inside of the leading ends 184b of the pair of the right and left elastic holding portions 184.

Thus, the leading ends 184b of the pair of the right and left elastic holding portions 184 are expanded into the direction indicated by the arrow B shown in FIG. 63, that is, in the outward direction. Thus, the state in which the disc D is held is suspended. As a result, rotations of the disc D in the disc-receiving recess 181 are permitted. Substantially simultaneously with this, the disc D is chucked on the disc table 203 by the disc damper 205.

Another embodiment of the disc accommodating apparatus according to the present invention will now be described with reference to FIGS. 64 to 66.

Figure 64:
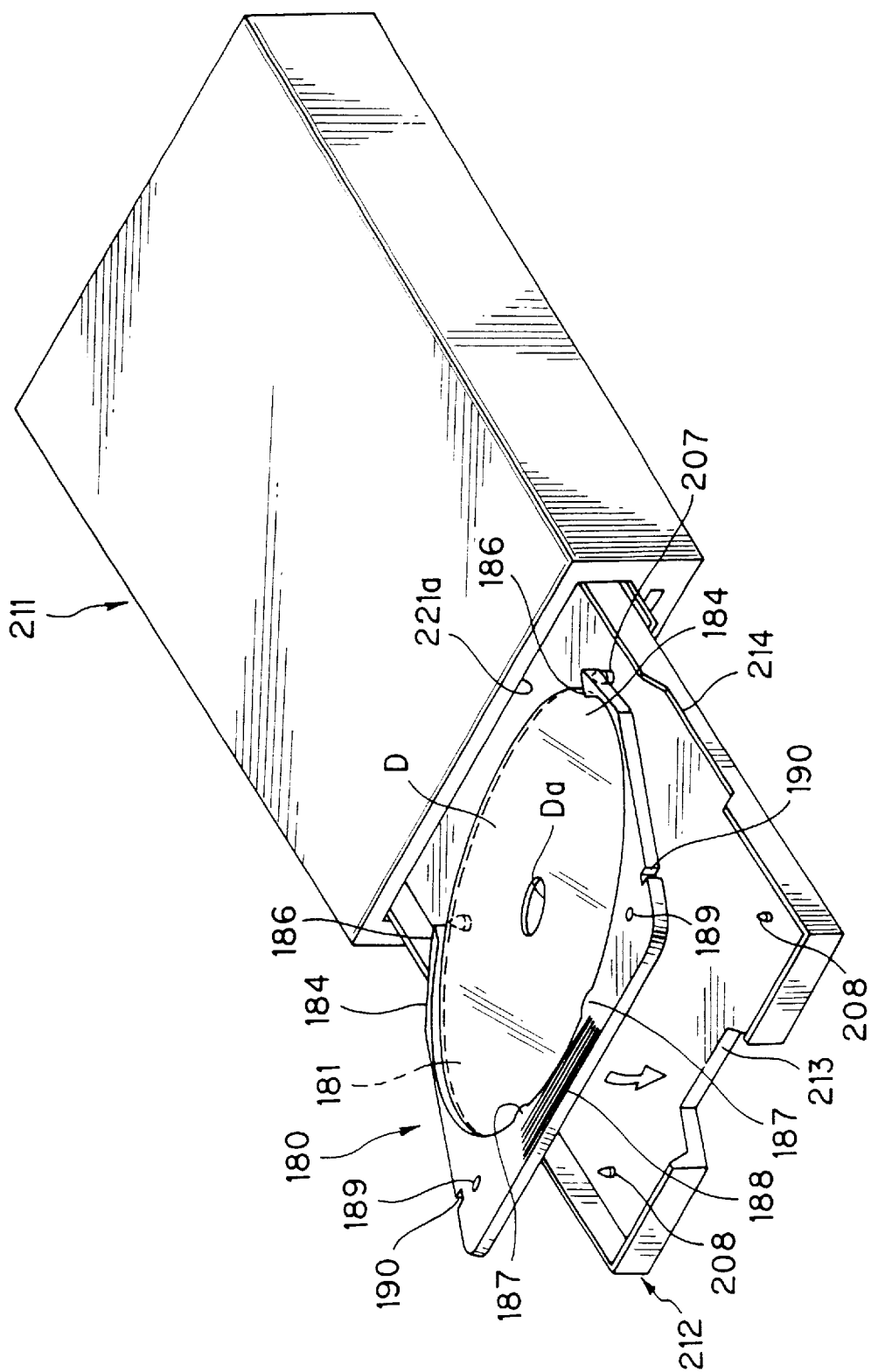
FIG. 64 is a perspective view showing a method of loading the disc tray into the disc drive apparatus shown in FIG. 59.

A disc drive apparatus 211 according to this embodiment, as shown in FIG. 64, has a disc loading tray 212. The disc tray 180 according to the ninth embodiment is placed on the disc loading tray 212 so as to be loaded into the disc drive apparatus 211.

The disc loading tray 212 has a pair of right and left disc release pins 207 and reference pins 208 stood erect thereon. As shown in FIGS. 64 and 65, when the disc tray 180 is mounted on the disc loading tray 212, the leading ends 184b of the pair of the right and left elastic holding portions 184 are pressed against the outer portions of a pair of right and left disc release pins 207 to outwards expand the leading ends 184b of the pair of the right and left elastic holding portions 184. Simultaneously, the pair of the right and left reference holes 189 of the disc tray 180 are engaged to a pair of right and left reference pins 208. Thus, the disc tray 180 is horizontally located and placed on the disc loading tray 212. Thus, when the disc tray 180 has been horizontally placed on the disc loading tray 212, the structure in which the disc D is held is suspended so that the disc D is horizontally and rotatively placed within the disc-receiving recess 181.

Then, the disc loading tray 212 is introduced into the disc drive apparatus 211 so that the disc D is chucked on the disc table 203 in the disc drive apparatus 211 by the disc clamper 205.

Figure 65:
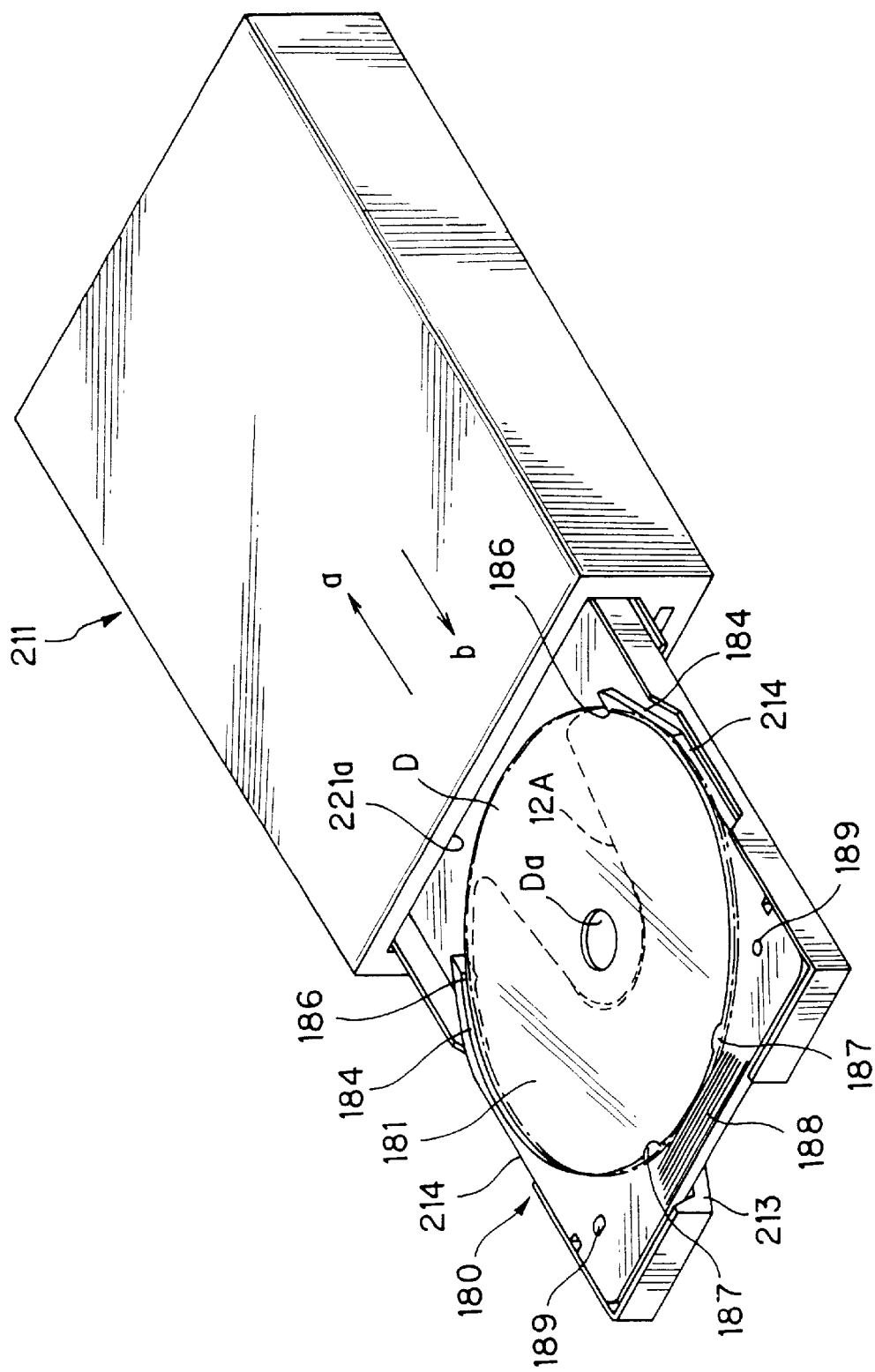
FIG. 65 is a perspective view showing a state in which the disc tray has been loaded into the disc drive apparatus shown in FIG. 64.

Cut portions 214 and 215 for permitting insertion of the fingers are formed in the periphery of the disc loading tray 212 as shown in FIGS. 64 and 65. Thus, the operation for loading/unloading the disc tray 180 to and from the disc loading tray 212 can easily be performed.

The relationship of the dimensions of the disc tray 180 and those of the disc D will now be described with reference to FIGS. 66 and 67.

Figure 66:
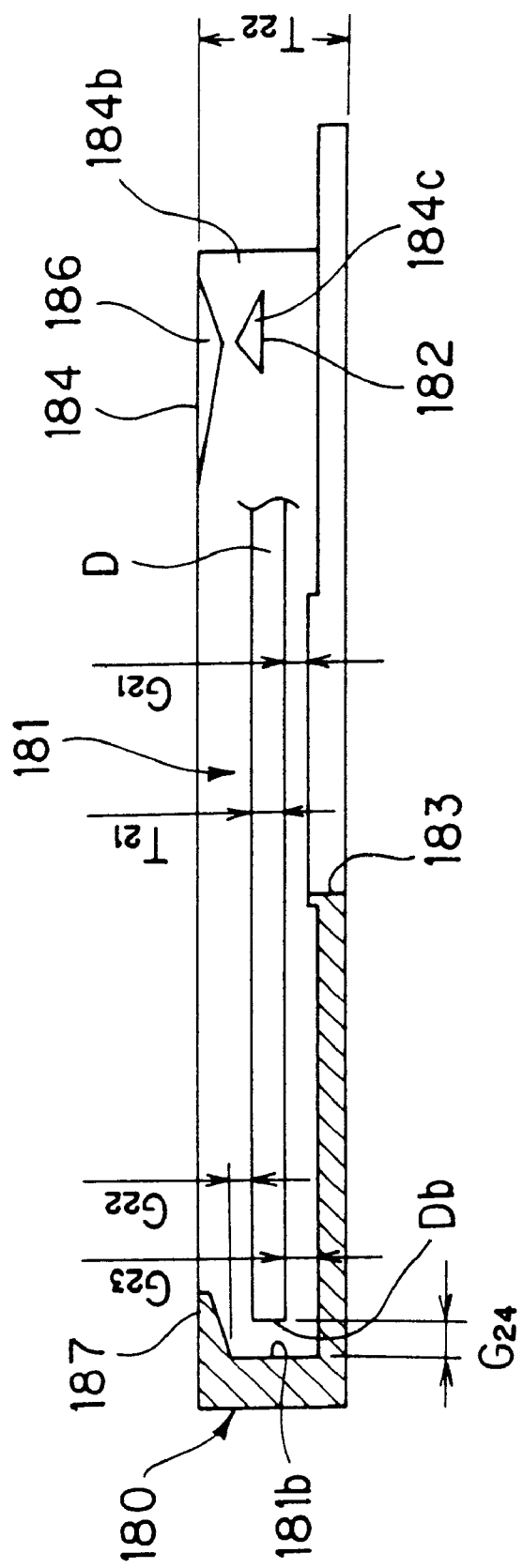
FIG. 66 is a vertical cross sectional view showing the dimensions of a disc-receiving recess and the like of the disc tray shown in FIG. 59.

As shown in FIG. 66, the thickness $T_{21}$ of the disc D is, for example, 1.2 mm and the disc D sometimes encounters a warp or distortion of, for example, about 0.5 mm. If the warp and distortion of the disc D are considered, it is preferable that the vertical gap $G_{22}$ between the bottom portion 181a in the disc-receiving recess 181 of the disc tray 180 and the disc-separation-preventive projections 186 and 187 is 0.5 mm or larger. Therefore, the thickness $T_{22}$ of the disc tray 180 is made to be about 4.4 mm. Thus, when the disc tray 180 in a state in which the disc D having the thickness of 1.2 mm is placed is loaded into the disc drive apparatus 201 or 211, the disc release pins 207 release the disc D, as shown in FIG. 66. As a result, gaps $G_{22}$, $G_{23}$ and $G_{24}$ each having a size of 0.8 mm are, in the disc-receiving recess 181, formed among the bottom portion 181a, the disc-separation-preventive projections 186 and 187 and the inner surface 181b. Therefore, when the disc tray 180 has been loaded into the disc drive apparatus 201 or 211, the held disc D can rotatively and reliably be released.

Figure 67:
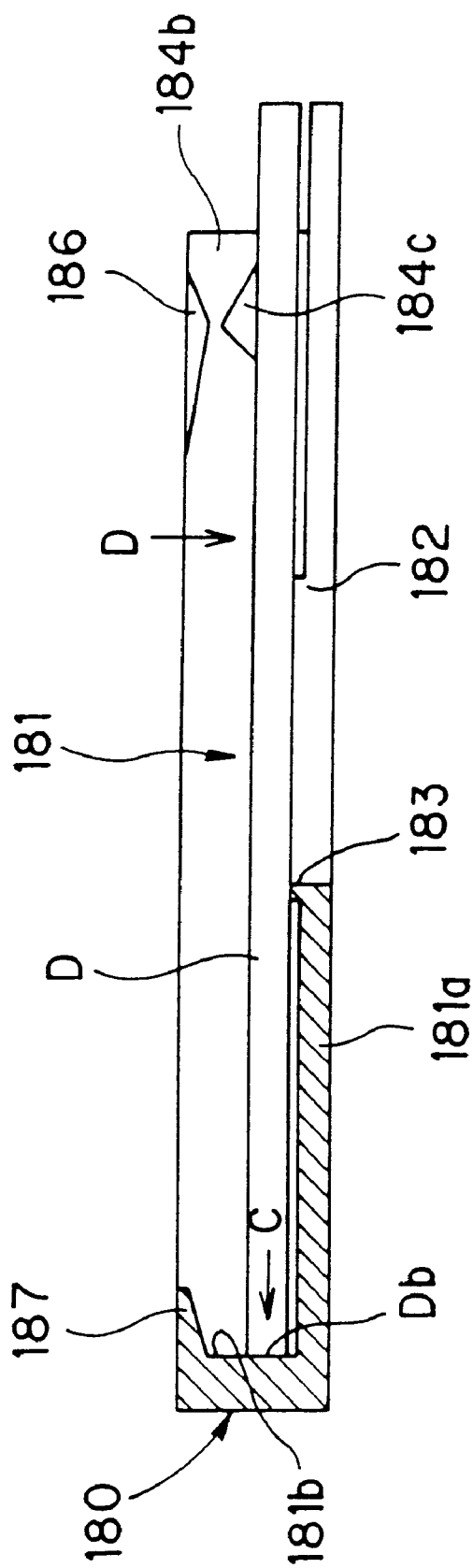
FIG. 67 is a vertical cross sectional view similar to FIG. 66.

When the disc tray 180 has been discharged from the disc drive apparatus 201 or 211, or when the disc tray 180 has been accommodated in the tray accommodating case 191, the disc D is urged in the direction indicated by the arrow C shown in FIG. 67 by the pair of the right and left elastic holding portions 184. When the disc tray 180 has been discharged from the disc drive apparatus 201 or 211 or when the disc tray 180 has been accommodated in the tray accommodating case 191, the tapered surfaces 184c formed in the lower half portions on the inside of the leading ends 184*b* of the pair of the right and left elastic holding portions 184 urge the disc D in the direction indicated by the arrow D shown in FIG. 67. Thus, the disc D can stably be placed on the disc support portion 183.

As described above, the disc tray 180, the tray accommodating case 191 and the disc drive apparatus 201 and 211 shown in FIGS. 54 to 67 enable the disc D placed in the disc tray 180 to reliably be held by the pair of the right and left elastic holding portions 184. Since the held disc D can reliably be released by the disc release pins 207, reservation and carry of the disc D can safely be performed. Moreover, the disc D can safely and easily be loaded into the disc drive apparatus 201 or 211.

Since the disc D can be loaded/unloaded to and from the disc tray 180 without the necessity of touching the signal recording surface of the disc D, the signal recording surface of the disc D can be protected from contamination, such as fingerprints, and score marks. Moreover, careless drop of the disc D onto the floor or the like can be prevented. Therefore, data can always accurately be recorded and/or reproduced to and from the disc D by the disc drive apparatus 201 or 211. As a result, satisfactory reliability can be maintained.

The disc tray 180 according to this embodiment is able to shorten the distance required for the optical pickup 206 and the disc damper 205 for clamping the disc D to be retracted when the disc tray 180 is loaded into the disc drive apparatus 201 or 211. As a result, the size and thickness of each of the disc drive apparatuses 201 and 211 can be reduced. Note that the necessity of providing the pair of the elastic holding portions 184 of the disc tray 180 can be eliminated. Only one elastic holding portion 184 is able to hold the disc D.

A tenth embodiment of the present invention will now be described with reference to FIG. 68.

Figure 68:
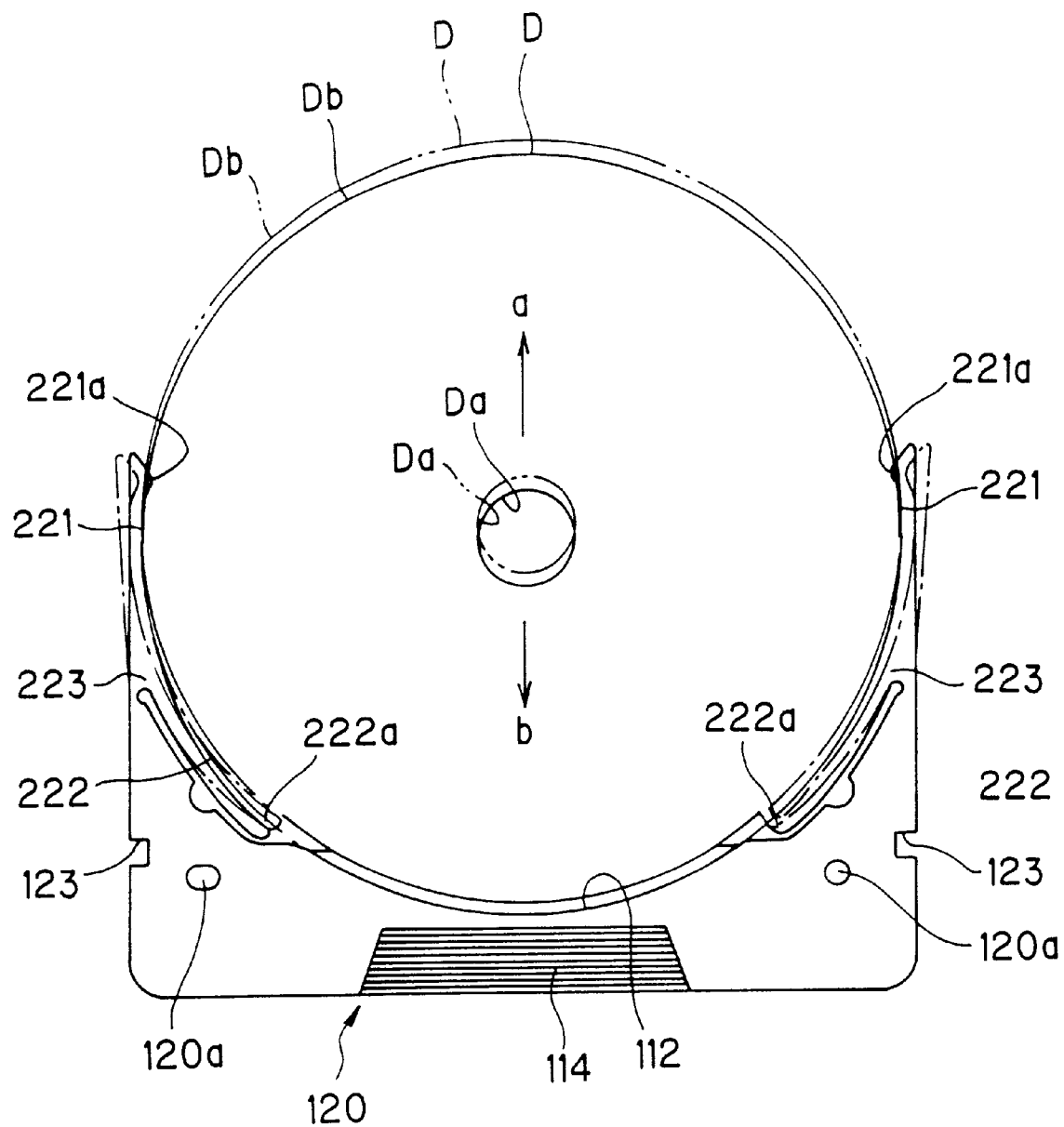
FIG. 68 is a plan view showing a disc tray according to a tenth embodiment of the disc tray and the tray accommodating case according to the present invention.

A disc tray 120 according to the tenth embodiment, as shown in FIG. 68, has two pairs of right and left, that is, four elastic holding portions 221 and 222 for holding four portions of the outer portion Db of the disc D. The intermediate portions of the two pairs of the right and left elastic holding portions 221 and 222 are integrally formed with a pair of right and left holding portions 223. Moreover, engagement portions 221*a* and 222*a* are integrally formed with the leading ends of the elastic holding portions 221 and 222. The engagement portions 221*a* at the leading ends of the front pair of the right and left elastic holding portions 221 are structured to hold the outer portion Db of the disc D from upper and lower positions.

The disc tray 120 requires only the disc D to be inserted into the four elastic holding portions 221 and 222 from the direction indicated by an arrow b shown in FIG. 68 to cause the engagement portions 221*a* and 222*a* of the four elastic holding portions 221 and 222 to elastically hold the four portions of the outer portion Db of the disc D. When the front pair of the right and left elastic holding portions 221 are expanded to the outside, the rear pair of the right and left elastic holding portions 222 are rotated in a direction indicated by an arrow a shown in FIG. 68 because of seesaw movement. Thus, the disc D is pushed forwards in the direction indicated by the arrow a shown in FIG. 68. As a result, the disc D is released.

As described above, the disc tray 120 according to this embodiment enables the disc D to easily be loaded/unloaded. Since the disc-receiving recess can be omitted from the structure. As a result, the synthetic resin material can be saved and thus the cost can be reduced.

Figure 69:
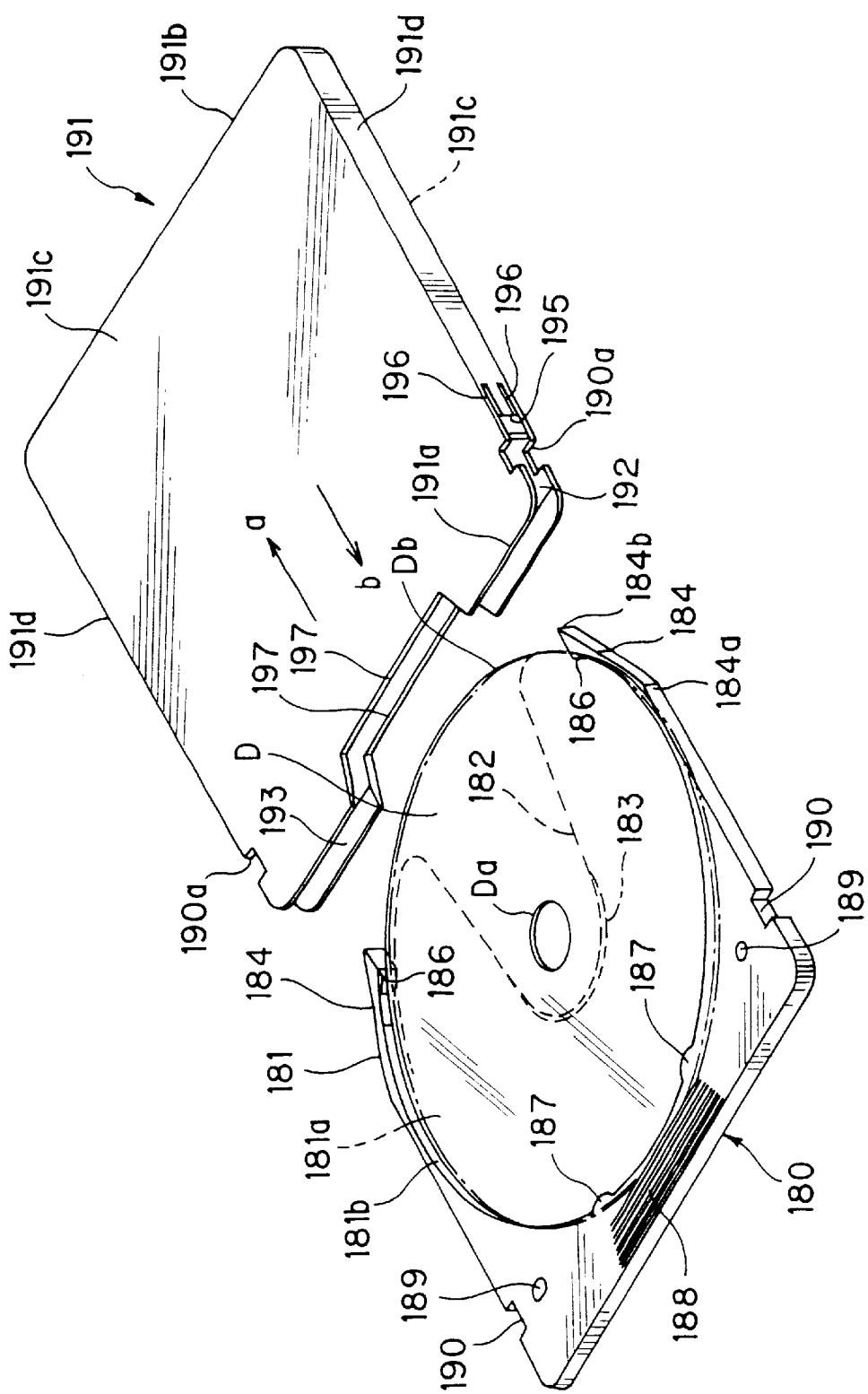
FIG. 69 is a perspective view showing an eleventh embodiment of the disc tray and the tray accommodating case according to the present invention.

An eleventh embodiment of the disc and tray accommodating case according to the present invention will now be described with reference to FIG. 69.

A tray accommodating case 191 according to the eleventh embodiment has a structure that a pair of right and left cut portions 190*a* opposite to a pair of right and left engagement recesses 190 of the disc tray 180 are formed in the leading ends of the right and left side surfaces 191*d*. The pair of the right and left cut portions 190*a* are connected to the right and left sides of a front opening 192 of the tray accommodating case 191, that is, the cut portions 190*a* are opened.

Therefore, in a state where a pair of the right and left tray loading/unloading means of, for example, an auto-changer are engaged to the pair of the right and left engagement recesses 190 of the disc tray 180, the pair of the right and left tray loading/unloading means are inserted from the two sides of the opening 192 of the tray accommodating case 191 into the pair of the right and left cut portions 190*a* from the direction indicated by the arrow a. Thus, the disc tray 180 is automatically inserted into the tray accommodating case 191. Then, the pair of the right and left tray loading/unloading means are separated from the pair of the right and left cut portions 190*a* in the upward and downward directions.

In a converse case, the pair of the right and left tray loading/unloading means are inserted into the pair of the right and left cut portions 190*a* from the upward and downward directions so that the pair of the right and left tray loading/unloading means are engaged to the pair of the right and left engagement recesses 190 of the disc tray 180. Then, the pair of the right and left tray loading/unloading means are extracted from the right and left sides of the opening 192 of the tray accommodating case 191 in the direction indicated by the arrow b shown in FIG. 69. Thus, the disc tray 180 can automatically be removed from the tray accommodating case 191.

Figure 70:
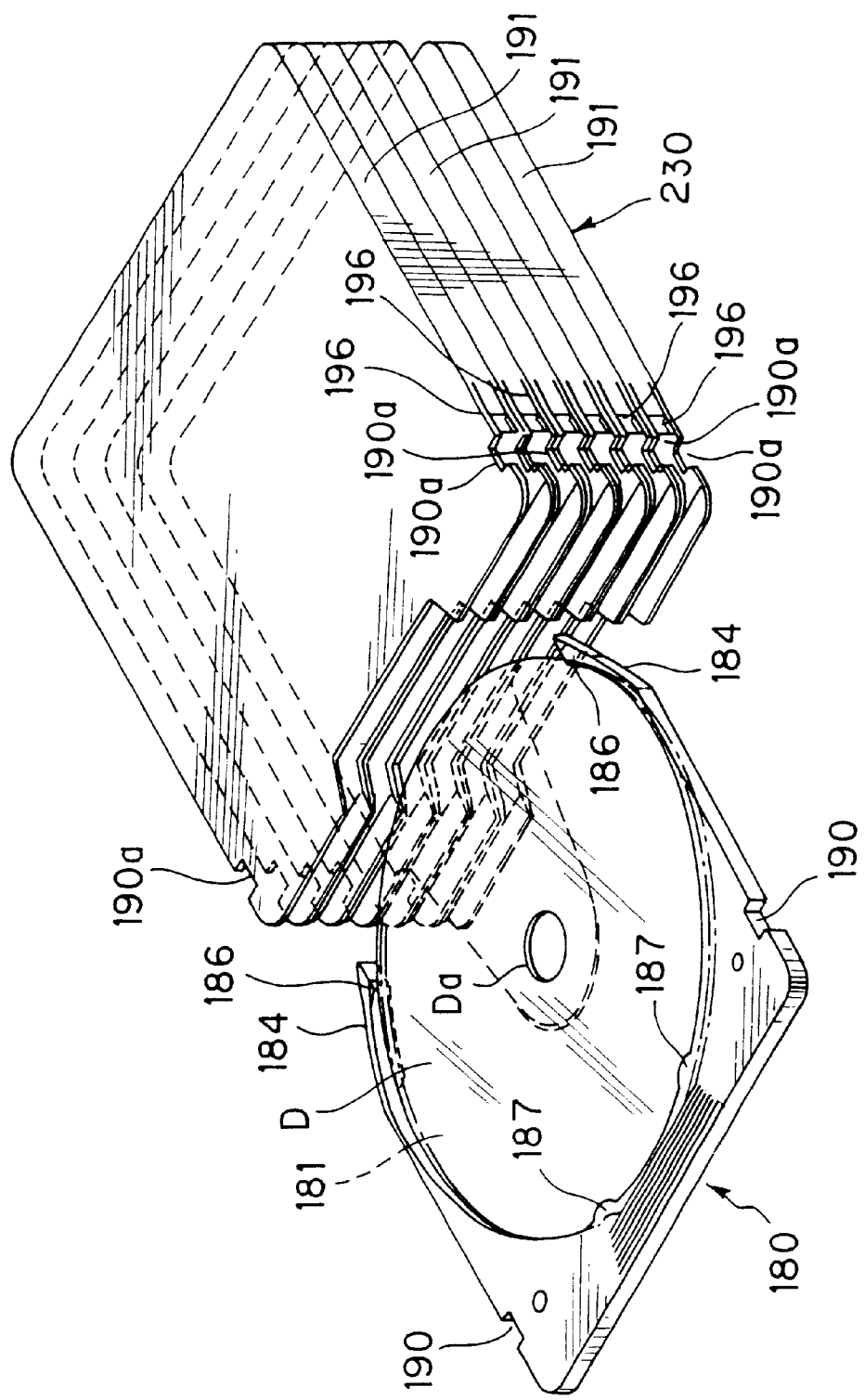
FIG. 70 is a perspective view showing a magazine rack for an auto-change in which a plurality of the tray accommodating cases shown in FIG. 69 are vertically stacked.

When a plurality of the tray accommodating cases 191 are vertically stacked to constitute a magazine rack 230 as shown in FIG. 70, application to an auto-changer can easily be established.

Although the invention has been described in its preferred form, it is understood that the present disclosure of the preferred form can be changed in the details of construction and in the combination and arrangement of parts without departing from the spirit and the scope of the invention.

Industrial Applicability

As described above, the disc tray according to the present invention is able to hold a disc on a disc-receiving recess in such a manner that separation is prevented. Therefore, the disc tray in a state in which the disc is held can be loaded into the disc drive apparatus. Thus, the loading operation can easily be performed and the disc can reliably be protected.

Since the disc accommodating apparatus according to the present invention is able to accommodate a disc tray in such a manner that the disc tray is engaged, the disc tray and a disc held on the disc tray can reliably be protected.

Since the disc drive apparatus according to the present invention enables the disc tray having a disc to be loaded. the operation for loading the disc can safely and reliably be performed.

What is claimed is:

1. A disc tray having an overall body formed in into a thin plate-like shape, said disc tray comprising:
   a disc-receiving recess having an inner diameter larger than the diameter of a recording and/or reproducing disc and a depth larger than the thickness of the disc and arranged to removably hold the disc while having gaps in a direction in parallel with the surfaces of the disc and in a direction of the thickness of the disc;

a bottom opening formed along the widthwise directional center of said disc tray in a range from substantially the central portion of the bottom portion of said disc-receiving recess to an end of the bottom portion and having a shape that said end of the bottom is opened;

a plurality of moveable disc retainer elements formed to project over said disc-receiving recess from outside of said disc-receiving recess in such a manner that gaps, at least permitting insertion of the disc and deeper than the thickness of the disc, are formed between the bottom portion of said disc-receiving recess and the plurality of moveable disc retainer elements, wherein each of the plurality of moveable disc retainer elements projects radially toward a center of said disc; and a disk support located on the bottom portion of the disc-receiving recess and configured to support the disc in the disc-receiving recess so that the disc is supported without contacting the moveable disc retainer elements so that the disc is free to rotate in said disc-receiving recess, wherein a pair of location reference holes to which locating pins for locating the loading position in a disc drive apparatus after said disc tray has been loaded into said disc drive apparatus are formed on the outside of said disc-receiving recess.

2. A disc tray according to claim 1, wherein at least one of the plural disc-separation-preventive portions is formed to be capable of elastically deforming in the direction of the depth of said disc-receiving recess.

3. A disc tray according to claim 2, wherein a disc support portion for supporting a non-signal-recording region formed on the inside of the disc held in said disc-receiving recess is formed in the bottom portion of said disc-receiving recess.

4. A disc tray according to claim 1, wherein a label receiving portion is formed on a side surface adjacent to the other end opposite to the opened end of said bottom opening.

5. A disc tray having an overall body formed into a thin plate-like shape, said disc tray comprising:

a disc-receiving recess having an inner diameter larger than the diameter of a recording and/or reproducing disc and a depth larger than the thickness of the disc and arranged to removably hold the disc while having gaps in a direction in parallel with the surfaces of the disc and in a direction of the thickness of the disc;

a bottom opening formed along the widthwise directional center of said disc tray in a range from substantially the central portion of the bottom portion of said disc-receiving recess to an end of the bottom portion and having a shape that said end of the bottom is opened;

a plurality of moveable disc retainer elements formed to project over said disc-receiving recess from outside of said disc-receiving recess in such a manner that gaps, at least permitting insertion of the disc and deeper than the thickness of the disc, are formed between the bottom portion of said disc-receiving recess and the plurality of moveable disc retainer elements, wherein each of the plurality of moveable disc retainer elements projects radially toward a center of said disc;

an engagement portion arranged to be engaged to a tray accommodating case; and a disk support located on the bottom portion of the disc-receiving recess and configured to support the disc in the disc-receiving recess so that the disc is supported without contacting the moveable disc retainer elements so that the disc is free to rotate in said disc-receiving recess, wherein said engagement portion is formed in each of cut recesses formed on two opposite sides which are in parallel with a direction in which the disc tray is inserted.

6. A disc tray having an overall body formed into a thin plate-like shape, said disc tray comprising:

a disc-receiving recess having an inner diameter larger than the diameter of a recording and/or reproducing disc and a depth larger than the thickness of the disc and arranged to removably hold the disc while having gaps in a direction in parallel with the surfaces of the disc and in a direction of the thickness of the disc;

a bottom opening formed along the widthwise directional center of said disc tray in a range from substantially the central portion of the bottom portion of said disc-receiving recess to an end of the bottom portion and having a shape that said end of the bottom is opened;

a plurality of moveable disc retainer elements formed to project over said disc-receiving recess from outside of said disc-receiving recess in such a manner that gaps, at least permitting insertion of the disc and deeper than the thickness of the disc, are formed between the bottom portion of said disc-receiving recess and the plurality of moveable disc retainer elements, wherein each of the plurality of moveable disc retainer elements projects radially toward a center of said disc; and a disk support located on the bottom portion of the disc-receiving recess and configured to support the disc in the disc-receiving recess so that the disc is supported without contacting the moveable disc retainer elements so that the disc is free to rotate in said disc-receiving recess, wherein a grip portion is formed at another end opposite to the opened end of said bottom opening.

* * * * *